(12) United States Patent
Urbach et al.

(10) Patent No.: US 10,477,168 B2
(45) Date of Patent: Nov. 12, 2019

(54) HEADPHONE BASED MODULAR VR/AR PLATFORM WITH VAPOR DISPLAY

(71) Applicant: OTOY, INC., Los Angeles, CA (US)

(72) Inventors: Julian Michael Urbach, Los Angeles, CA (US); Clayton C. Sparks, Los Angeles, CA (US); Charles Wallace, Northridge, CA (US)

(73) Assignee: OTOY, INC., Los Angeles, CA (US)

( * ) Notice: Subject to any disclaimer, the term of this patent is extended or adjusted under 35 U.S.C. 154(b) by 29 days.

(21) Appl. No.: 15/879,685

(22) Filed: Jan. 25, 2018

(65) Prior Publication Data

US 2018/0220110 A1    Aug. 2, 2018

Related U.S. Application Data

(63) Continuation of application No. 15/877,569, filed on Jan. 23, 2018.
(Continued)

(51) Int. Cl.
*H04N 9/31* (2006.01)
*B05B 17/06* (2006.01)
(Continued)

(52) U.S. Cl.
CPC ......... *H04N 9/3141* (2013.01); *B05B 7/0012* (2013.01); *B05B 7/0884* (2013.01);
(Continued)

(58) Field of Classification Search
CPC ....... G03H 1/2294; G09F 13/30; G09F 19/98; G02B 27/017; G03B 21/608;
(Continued)

(56) References Cited

U.S. PATENT DOCUMENTS 3,334,816 A * 8/1967 Mizuno ................... B05B 17/08
                                                    239/18
5,067,653 A * 11/1991 Araki .................... G03B 21/608
                                                    239/18
(Continued)

FOREIGN PATENT DOCUMENTS

CN          1986079 A     6/2007
CN        104898365 A     9/2015
(Continued)

OTHER PUBLICATIONS

International Search Report and Written Opinion to corresponding International Application No. PCT/US2018/015379 dated Apr. 9, 2018 (10 pages).
(Continued)

*Primary Examiner* — Liliana Cerullo
(74) *Attorney, Agent, or Firm* — James J. DeCarlo; Greenberg Traurig, LLP

(57) ABSTRACT

Disclosed is a VR/AR projection device. A device is disclosed comprising a housing comprising a processor disposed within the housing; a vapor projection component disposed within the center of the housing and communicatively coupled to the processor, the vapor projection component comprising: a water tank situated on the interior side of the vapor projection component, a set of tubes position on the exterior side of the vapor projection component, a transducer configured to nebulize water in the water tank, a movable belt comprising a plurality of apertures movable respective to the set of tubes, a variable speed fan configured to exert positive pressure on the nebulized water while the transducer nebulizes the water in the water tank and force the nebulized water through the apertures and the set of tubes, generating a set of nebulized vapor jets extending outward from the surface of the vapor projection compo-
(Continued)

nent; and a projection device configured to display an image on the nebulized vapor jets.

21 Claims, 74 Drawing Sheets

Related U.S. Application Data

(60) Provisional application No. 62/620,082, filed on Jan. 22, 2018, provisional application No. 62/454,716, filed on Feb. 3, 2017, provisional application No. 62/451,656, filed on Jan. 27, 2017.

(51) Int. Cl.

| | |
|---|---|
| *G06T 19/00* | (2011.01) |
| *B05B 7/00* | (2006.01) |
| *B05B 7/08* | (2006.01) |
| *B05B 12/04* | (2006.01) |
| *G03B 21/608* | (2014.01) |
| *G03H 1/22* | (2006.01) |
| *G09F 13/30* | (2006.01) |
| *G09F 19/18* | (2006.01) |
| *G02B 27/01* | (2006.01) |

(52) U.S. Cl.
CPC .......... *B05B 12/04* (2013.01); *B05B 17/0615* (2013.01); *B05B 17/0653* (2013.01); *G02B 27/017* (2013.01); *G03B 21/608* (2013.01); *G03H 1/2294* (2013.01); *G06T 19/006* (2013.01); *G09F 13/30* (2013.01); *G09F 19/18* (2013.01); *H04N 9/3179* (2013.01)

(58) Field of Classification Search
CPC . B05B 7/0012; B05B 7/0884; B05B 17/0615; B05B 17/0653; G06T 19/006; H04N 9/3141
See application file for complete search history.

(56) References Cited

U.S. PATENT DOCUMENTS

| | | | | |
|---|---|---|---|---|
| 2007/0019297 | A1 | 1/2007 | Stewart et al. | |
| 2009/0091634 | A1 | 4/2009 | Kennedy et al. | |
| 2009/0251661 | A1 | 10/2009 | Fuziak | |
| 2010/0321478 | A1* | 12/2010 | Sliwa ................ | G02B 27/2271 348/51 |
| 2012/0062445 | A1 | 3/2012 | Haddick et al. | |
| 2013/0237146 | A1 | 9/2013 | Serota | |
| 2013/0278631 | A1 | 10/2013 | Border et al. | |
| 2014/0036127 | A1 | 2/2014 | Pong et al. | |
| 2014/0241564 | A1 | 8/2014 | Kang et al. | |
| 2015/0092266 | A1 | 4/2015 | Yeremian | |
| 2016/0025973 | A1 | 1/2016 | Guttag et al. | |
| 2016/0334628 | A1 | 11/2016 | Lyons | |
| 2016/0349509 | A1 | 12/2016 | Lanier et al. | |
| 2016/0366502 | A1 | 12/2016 | Morris et al. | |

FOREIGN PATENT DOCUMENTS

| | | | |
|---|---|---|---|
| CN | 103901709 | B | 4/2016 |
| WO | 2010069368 | A1 | 6/2010 |

OTHER PUBLICATIONS

International Search Report and Written Opinion to corresponding International Application No. PCT/US2018/014941 dated May 15, 2018 (36 pages).

International Search Report and Written Opinion to corresponding International Application No. PCT/US18/15384 dated Apr. 13, 2018 (8 pages).

* cited by examiner

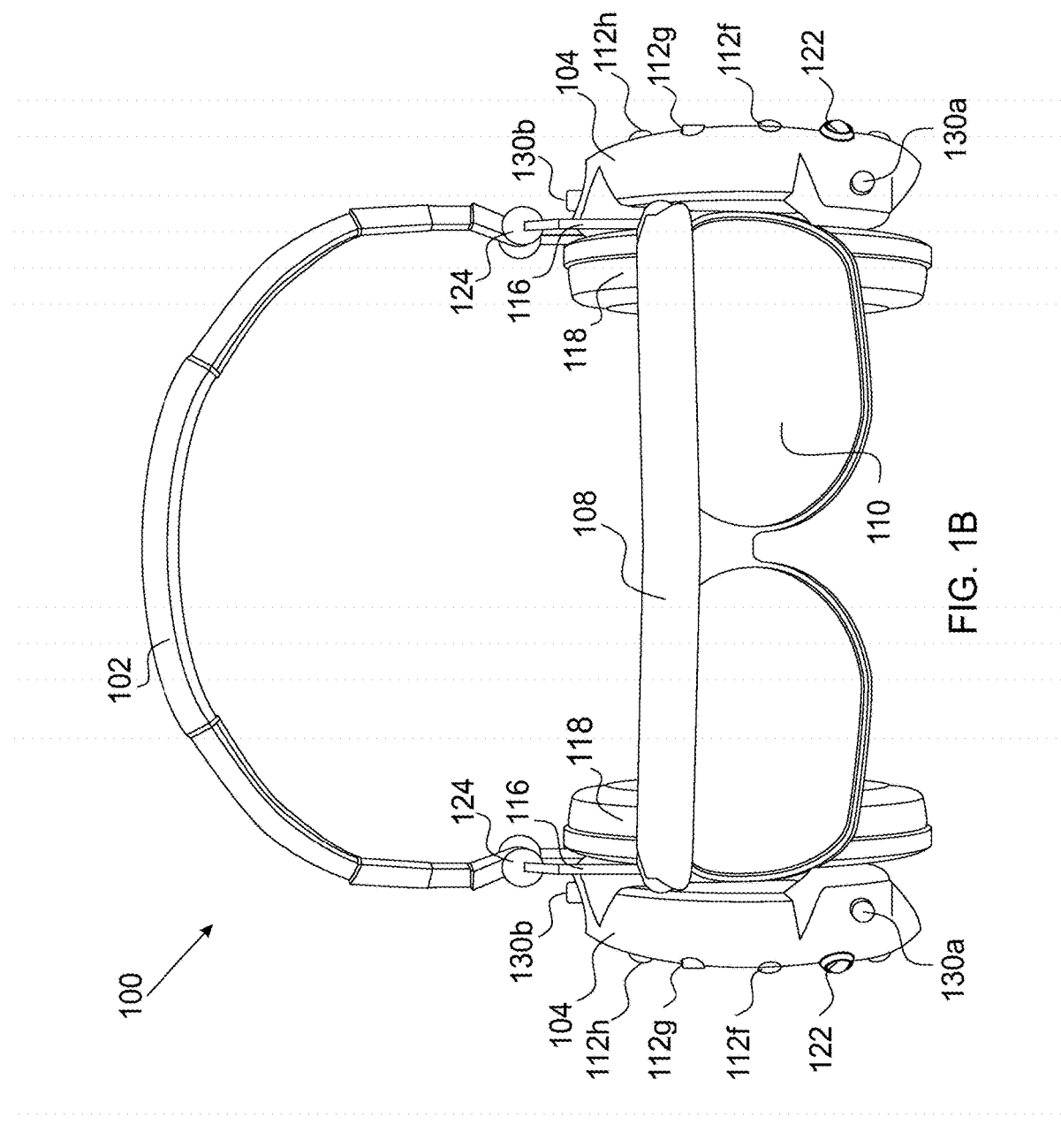

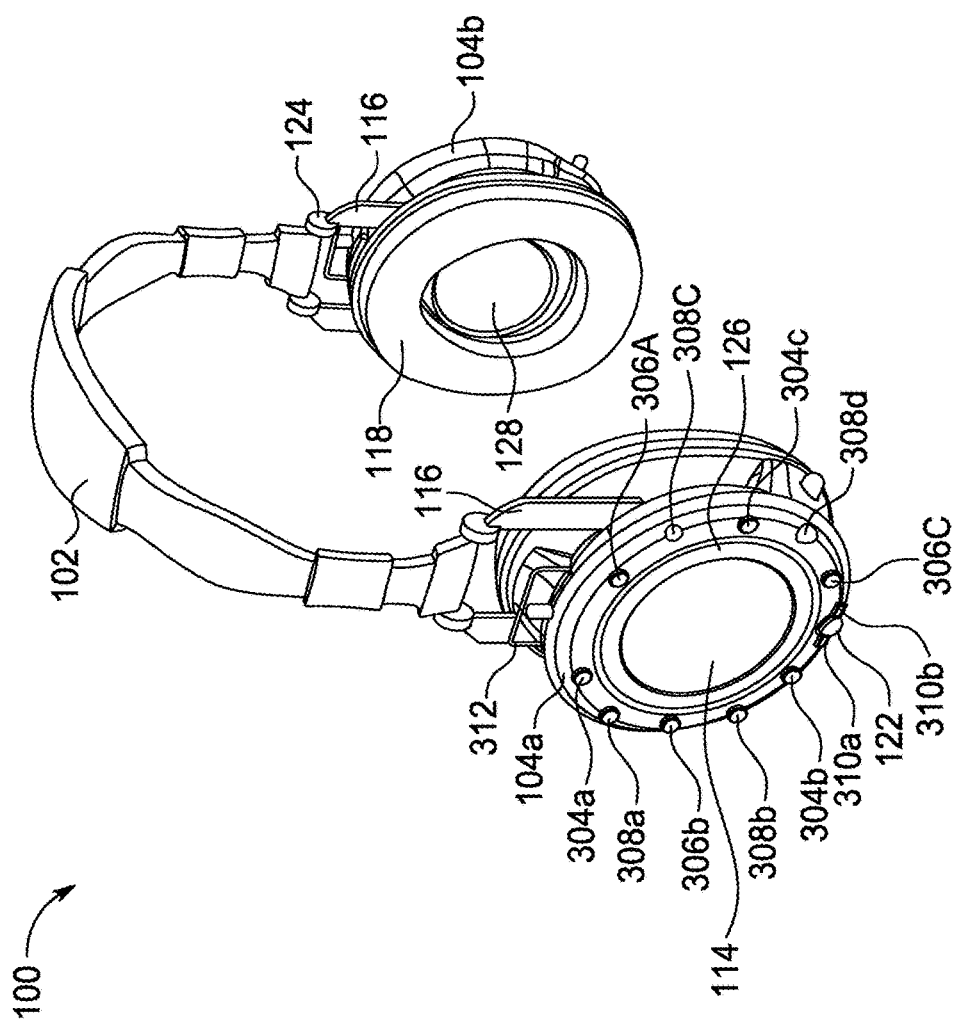

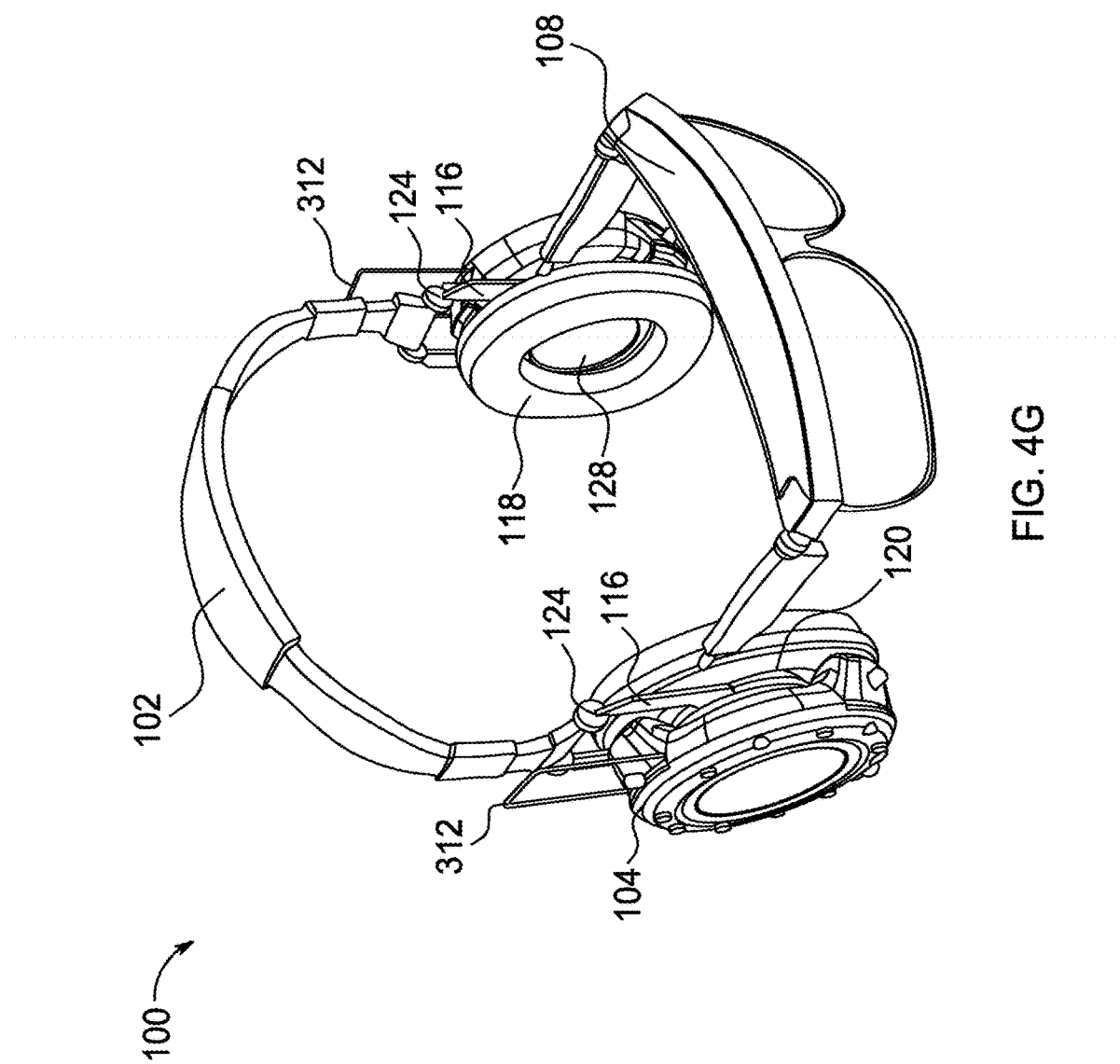

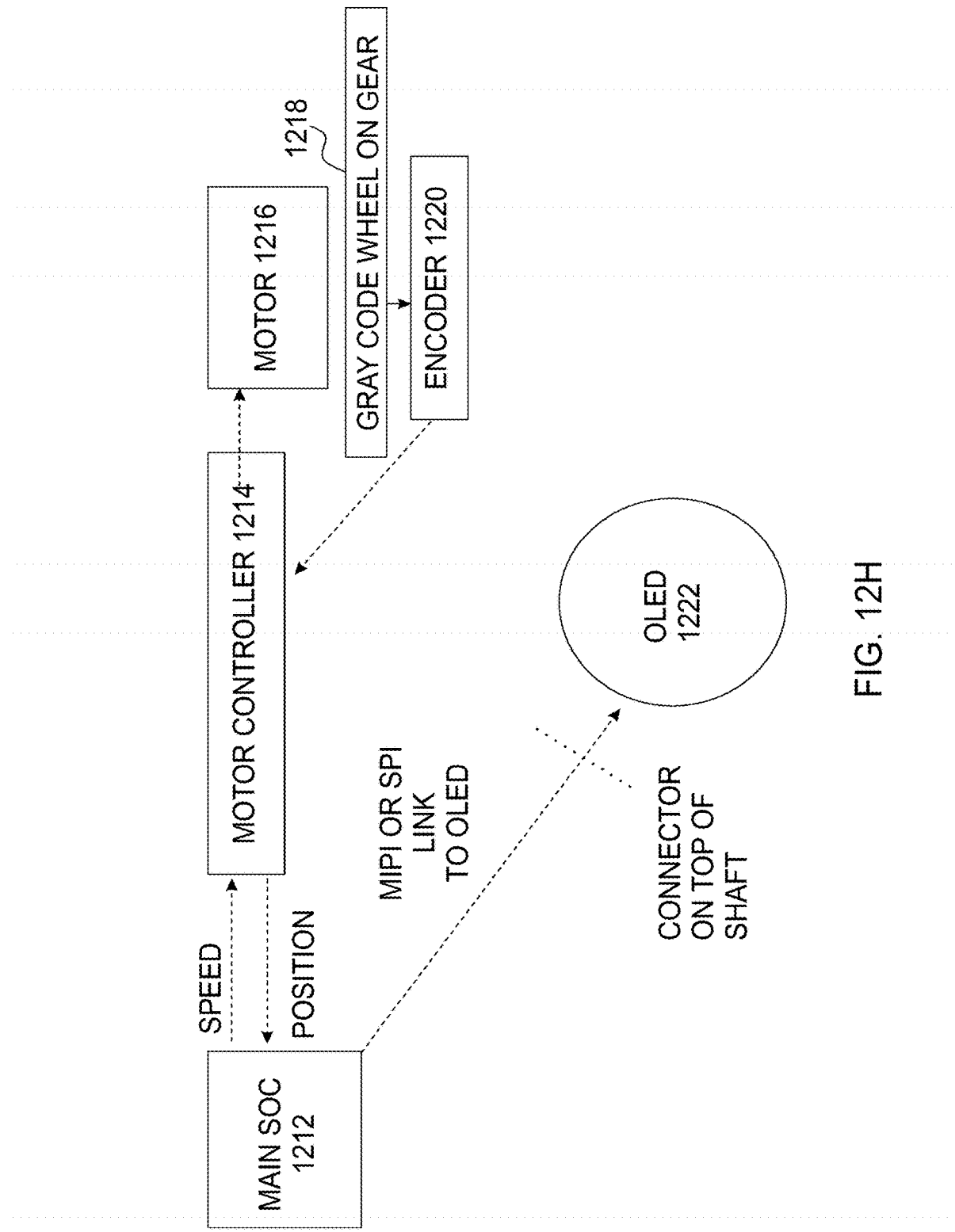

HEADPHONE BASED MODULAR VR/AR PLATFORM WITH VAPOR DISPLAY

CROSS-REFERENCE TO RELATED APPLICATIONS

This application claims priority to U.S. Provisional Utility Patent No. 62/451,656, entitled "Headphone Based Modular VR/AR Platform," filed on Jan. 27, 2017, U.S. Provisional Patent No. 62/454,716, entitled "Headphone Based Modular VR/AR Platform," filed on Feb. 3, 2017, U.S. Provisional Patent No. 62/620,082, entitled "Headphone Based Modular VR/AR Platform," filed on Jan. 22, 2018, and U.S. application Ser. No. 15/877,569, entitled "Headphone Based Modular VR/AR Platform," filed on Jan. 23, 2018, each application hereby incorporated by reference for all purposes.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

The disclosure relates to virtual reality ("VR") or augmented reality ("AR") devices and, in particular, to a headphone-based modular VR/AR platform.

VR and AR systems offer immersive and involving experiences that place a user in new worlds previously unimagined. Present technology is directed to wearable devices, such as goggles or face-mounted devices that can retain cellular phones or other imaging devices to project stereoscopic images viewable by a user wearing the goggles or phone-containing mount.

Generally, a VR or AR device includes some or all of the following subsystems.

First, VR or AR devices include a display subsystem which generally includes one or more display devices mounted near a user's eyes as a face mask or goggles. For example, the OCULUS RIFT® CV1 includes two OLED displays with a combined resolution of 2160×1200 pixels and a 90 Hz refresh rate. Generally, these displays are designed to project VR and/or AR scenes to a user. Adjacent to these displays are adjustable lenses designed to alter the projection of the display devices.

Second, some VR or AR devices include a head tracking subsystem installed in the front portion of the device (i.e., the portion including the screen) designed to monitor the position of a user's head while wearing the VR or AR device. Common head tracking subsystems include accelerometers, gyroscopes, and magnetometers. The head tracking subsystem transmits information regarding the position of a user's head (to a tethered or mobile device placed in the VR or AR device) to enable the display to be updated and thus simulate a user "looking around" a three-dimensional VR or AR space.

Third, some VR or AR devices include a positional tracking subsystem designed to monitor the user's position within a three-dimensional space. In general, these systems record the user's position and transmit positional information to enable the display device to update based on the user's calculated position within a three-dimensional space.

Various techniques have been implemented for providing positional tracking. In a first implementation, a VR or AR device is equipped with numerous infrared ("IR") light emitting diodes ("LEDs"). These IR LEDs emit infrared light which is tracked by one or more mounted cameras which translate the movement of the IR LED light to a three-dimensional coordinate representing the user's location (and thus movement) through a three-dimensional space. In a second implementation, a VR or AR device is equipped with numerous photosensors designed to detect light emitted from fixed light projection devices distributed in a space around the user. In this system, the projection devices enable the VR or AR device to detect its orientation using the projection devices as fixed reference points.

While some VR or AR devices including the subsystems discussed above are capable of providing an immersive VR/AR experience, they suffer from numerous deficiencies. Just a few such deficiencies are identified below.

As more functionality needs to be included in such devices they become heavy and cumbersome and thus limited by how much can practically be incorporated into such an apparatus that is worn on the face of a user. Such limitations as size, weight and battery life significantly impact the quality of experience a user can take away from goggle-based VR or AR experiences.

Current VR or AR devices are highly integrated. That is, the subsystems discussed above are designed to work as a single, monolithic unit. For example, photosensors or IR LEDs are integrated throughout the VR or AR device (e.g., on the outside of the display portion, in the harness, etc.). Thus, if a user wishes to upgrade portions of the VR or AR device, the user is required to replace the entire VR or AR device since the entire device is designed to work as an interdependent whole (like an obsolete cell phone for example). Additionally, current VR or AR devices are limited in functionality based on the components within the VR or AR device itself. Thus, users are limited in functionality that can be performed by the VR or AR devices.

Many current VR or AR devices are primarily designed to enable a user to view and interact with and within a three-dimensional scene. Generally, to generate scenes for use with a VR or AR device, developers are required to generate three-dimensional scenes using external equipment. For example, developers may generate virtual three-dimensional scenes using three-dimensional rendering software or may generate virtual representations of physical spaces using numerous cameras and light sources.

Mobile VR or AR devices (i.e., untethered VR or AR devices) are limited in battery life due to the demands placed on batteries powering the VR or AR device. Tethered VR or AR devices may provide unlimited power via a physical connection, but necessarily limit the mobility of the VR or AR device due to the tether. Conversely, mobile VR or AR devices allow for unrestrained movement of the user, but are necessarily limited in battery life due to the use of limited batteries.

BRIEF SUMMARY

The present disclosure describes a flexible platform based around a headphone form factor that permits modular connectivity of VR and AR support devices, such as positioning components, light field components, audio and video receptors, projectors, modular processor connectivity, novel charging technology, input devices, haptic components, and flexible connectivity options to provide a physical platform upon which high function VR and AR applications and experiences can be modularly built.

In alternative art, headphones have been a ubiquitous presence in the audio field for many years and ear encompassing headphones have been utilized by music aficionados and casual listeners since the 1960's and prior. Presently, while ear buds and small form factor earphones have become popular, full size ear encompassing headphones have also made a significant comeback and are now well accepted.

In embodiments disclosed herein, the earphones or headphones (as these terms are used interchangeably herein), and/or the removable and interchangeable "pucks" defining some or all functionality for the headphone assembly that will be described further herein, can comprise one or more of the following components: spherical light field/reflectance field image capturing elements; audio and video pickups; micro projector(s); an OLED video display (with or without touchscreen capability); trackball, toggle switch and/or hard or soft keypad input devices; positioning sensors to permit high resolution positioning of a user within the VR or AR environment; head tracking sensors; eye tracking systems; goggle mounts for receiving and intercommunicating with VR/AR goggles of differing capability; drone management capabilities; modular processor and input/output connectors; and a battery charging platform for extended use, comprising either larger physical batteries (since a headphone is more easily configured to handle a large size battery), or a rechargeable platform whereby battery carrying drone devices can interact with the headphone platform to provide continuous charging power to the device.

The flexible VR/AR platform of the present disclosure is designed to be a modular assembly, such that a wearer/user can flexibly interchange components on the headphone assembly. As disclosed herein, the headphone assembly is designed to incorporate a removable mechanically and electrically coupleable "puck" assembly that can be removed and interchanged with various different components of different capabilities. It is contemplated that the modular and removable assembly portion of the headphone is designed to be a removable "puck" which may be round, oval, hemispherical, or any other suitable shape which can be magnetically coupled, screwed, snap fit, swage fit or otherwise removeably connected in any other reliable mechanical and electrically conductive manner so as to provide interchangeable functionality for the user. These pucks can also operate independently from each other and/or from the headphone itself to provide independent functionality, such as by way of non-limiting examples as a conference module, image capture system, set-top box, image display or projector.

Such a configuration provides for the removal and connection of pucks of different capability to suit a particular user's particular application at a particular time, as well as providing the ability for puck modules to be modifiable and adaptable so as to incorporate revisions, changes and additions to capability over time without requiring the user to replace the headphone assembly. Thus a user purchasing the headphone assembly can adapt their initial investment to a low level of functionality and gradually increase to higher levels of functionality for an additional investment, or incorporate improved functionality over time as new pucks and new features become available, without having to discard the basic platform due to obsolescence.

In one embodiment, the device includes a headband portion designed to be worn atop a user's head spanning from one side of the user's head to the other. In some embodiments, the headband of the device includes standalone or interoperable processing elements such as system-on-a-chip ("SoC") devices, microprocessors, graphics processors, connectivity interfaces (e.g., Bluetooth, Wi-Fi, NFC, etc.), and various other components that can function alone or be interoperable with the pucks to augment the capabilities of the pucks and/or connected goggles or glasses. Components of the headband can include general purpose processing elements utilized in all VR/AR operations. The headband portion can additionally comprise a bi-directional bus spanning the length of the headband. In other embodiments the headphone assembly can be a simple mechanical frame for receiving pucks, glasses and modular plugins and contain little or no electronic components, or can just act as a wire bus for connecting components, as discussed further herein.

In some embodiments, the headband portion of the device can be connected to an ear piece portion on each end designed to be worn proximate, over, or adjacent to a user's ears. In some embodiments, the ear piece portion can be mechanically and communicatively or removeably coupled to the headband portion. In some embodiments, the headband can provide audio signals to the ear piece portion and the ear piece portion. The ear piece portion can additionally include a speaker for playing audio while a user experiences a VR or AR environment. Alternatively, the speaker(s) can be part of the removable puck.

The ear piece portion can additionally include an external mechanical and physical connector designed to receive a puck. In some embodiments, the puck includes additional processing elements to perform various VR/AR processing operations. In some embodiments, the ear piece portion includes a USB connection to allow for data transfer between the puck and the ear piece and further to other components via connections in the headband.

In one embodiment, the puck can include multiple photosensors to detect light from a projection device and enable positional tracking. In some embodiments, the puck can detect a user's position within a physical space and transmit the user's position to a scene renderer which can update the display of a three-dimensional scene via the glasses or projectors on the pucks, based on the user's position.

Alternatively, or in conjunction with the foregoing, the puck can include a gyroscope, accelerometer, and magnetometer to track the head movements of the VR or AR device. In some embodiments, the puck can detect a user's head position and transmit the user's head position to a scene renderer which can update the display of a three-dimensional scene via the glasses or projectors on the pucks, based on the user's position.

Alternatively, or in conjunction with the foregoing, the puck can include one or more camera devices configured to record light fields or reflectance fields of a physical space. In this embodiment, the puck can record one or more light fields or reflectance fields of a physical space and transmit the recorded images to a scene processor within or in communication with the puck. In some embodiments, the scene processor can be configured to stitch the recorded images together and generate a real-time three-dimensional scene from the recorded images. In some embodiments, the camera(s) can transmit images to a storage device located in the puck (or headband) as a two-dimensional array of two-dimensional images, forming a four-dimensional light field dataset.

Alternatively, or in conjunction with the foregoing, the puck can include one or more microphones for recording voice commands or other audible signals. In one embodiment, the microphones can be configured to record ambient noise within a physical space and adjust the volume of audio associated with the three-dimensional scene accordingly.

The puck is configured to be self-supporting and independently operable when disconnected from the headphone assembly. In some embodiments, the puck can be configured to act as a capture device to enable holographic videoconferencing. Specifically, the puck can be equipped with one or more capture devices (e.g., a camera array) configured to record images of a physical space. In some embodiments, the puck can be equipped with one or more light sources configured to illuminate a physical space (and objects within it) at multiple angles.

In some embodiments, the headband portion or pucks can be configured with additional processing elements. For example, a puck can be equipped with an EEG monitor (or alternative brain-computer interfaces) or other recording apparatus. Alternatively, or in conjunction with the foregoing, a puck or headband can be equipped with one or more haptic elements.

Alternatively, or in conjunction with the foregoing, the puck can include one or more batteries. In some embodiments, the puck can include an external charging port for recharging the one or more batteries. In some embodiments, the charging port can comprise a USB port while in other embodiments the charging port can comprise an inductive or capacitive charging surface. In some embodiments, the puck can be communicatively coupled to a flying drone device. In this embodiment, the drone device can be configured to monitor the power level of the puck and, upon detecting a low power condition, can initiate one or more rotors and disconnect from the puck. Within a physical space, one or more power sources can be connected to power outlets or other power sources. These power sources can include a USB output port and/or an inductive capacitive or other cordless electromagnetically coupled charging pad or device (for example a laser powered photovoltaic cell). In this embodiment, the drone device can, upon disconnection from the puck, detect the location of the external power source and navigate to the external power source. Upon reaching the external power source, the drone connects (e.g., via USB or wirelessly charging pad) to the external power source and charges a battery located within the drone. Upon fully charging, the drone can return to the puck, connect to the charging port of the puck, and discharge the power to the puck, thus recharging the puck. In alternative embodiments, the drone device can be configured to replace pucks with low battery levels with replacement pucks that are fully charged via a power source.

Alternatively, or in conjunction with the foregoing, the VR or AR device can be used in conjunction with a plurality of drone recording devices. In this embodiment, the drones can record images of a physical space at multiple angles and transmit the images to the puck(s) for further processing. In some embodiments, the pucks can be equipped with a scene renderer which translates the recorded images into a real-time three-dimensional scene.

BRIEF DESCRIPTION OF THE DRAWINGS

The foregoing and other objects, features, and advantages of the disclosure will be apparent from the following description of embodiments as illustrated in the accompanying drawings, in which like reference characters refer to the same parts throughout the various views. The drawings are not necessarily to scale, emphasis instead being placed upon illustrating principles of the disclosure.

FIGS. 1A through 1D depict a modular headphone assembly-structured VR/AR device according to some embodiments of the disclosure.

FIGS. 4A-4H depict a modular headphone-based VR/AR device assembly with a detachable or moveable goggle portion according to some embodiments of the disclosure.

FIGS. 12A-H illustrate a puck with a wand-mounted display configured to act as a holographic, light field display, according to some embodiments of the disclosure.

DETAILED DESCRIPTION

Figure 1A:
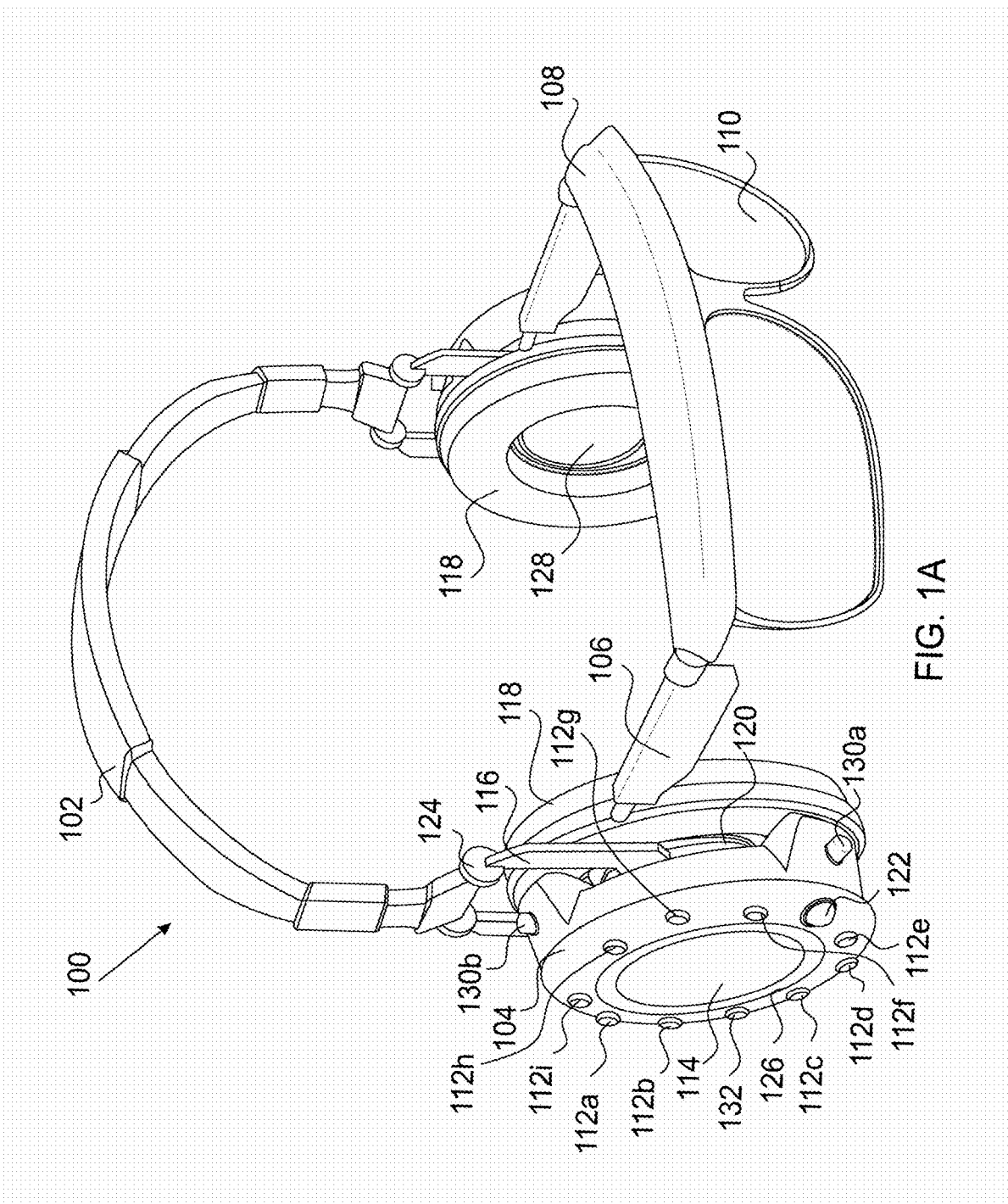
Figure 1C:
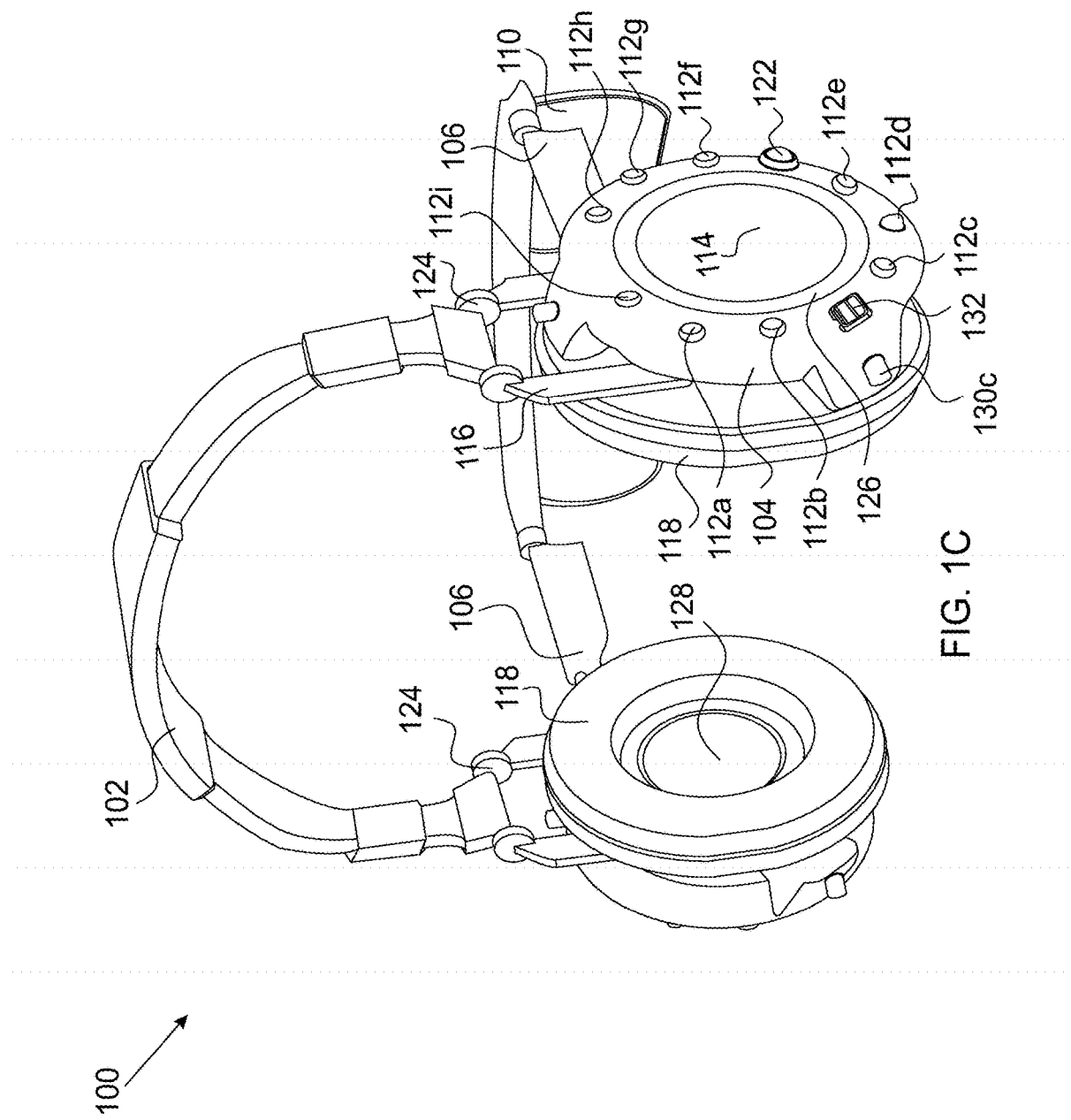
Figure 1D:
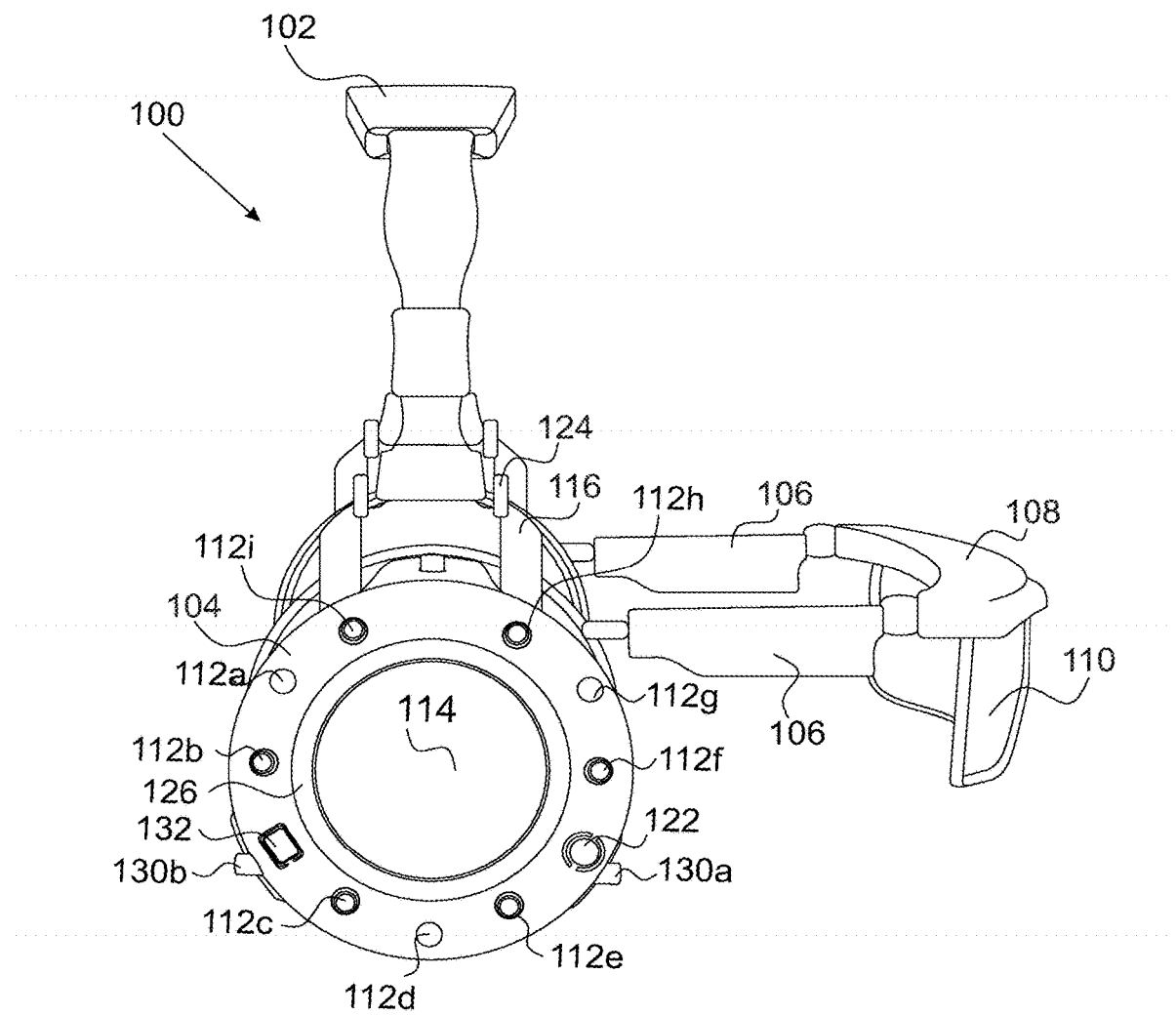

The present disclosure will now be described further hereinafter with reference to the accompanying drawings, which form a part hereof, and which show, by way of illustration, certain example embodiments which can be implemented in whole or in part or in various combinations among embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, Bluetooth Low Energy (BLE), 802.11b/g/n, near-field wireless, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

FIGS. 1A through 1D depict a modular headphone assembly-structured VR/AR device according to some embodiments of the disclosure.

As illustrated in FIGS. 1A through 1D, a VR/AR device 100 includes a headband 102. In some embodiments, headband 102 comprises a flexible or elastically deformable hemispherical strap-like element designed to be worn atop a user's head. In some embodiments, the headband 102 can comprise multiple, adjustable portions such that a user can expand or contract the headband 102 to fit snuggly against the user's head, and can be cushioned in various locations along the head-engaging span for comfort. Each end of headband 102 can be connected to an attachment member 116 which, in turn, is connected to an ear piece portion 120. In some embodiments, an air gap is present between puck 104 and ear piece portion 120. In this embodiment, the air gap can provide cooling air flow and heat dissipation from puck 104. In this embodiment, puck 104 can include one or more ventilation slots or heat sink fins or structures facing the air gap to allow for passive heat transfer.

In some embodiments, headband 102 can be connected to attachment member 116 via rotatable disc 124 which can be spring or tension loaded to allow relative retaining motion for fit and comfort proximate, around, or over the wearer's ear. In this embodiment, rotatable disc enables the inward and outward movement of ear piece portion 120. In some embodiments, arms 106a, b, crossbar 108, and goggle portion 110 can be removed from the device 100. Thus, rotatable disc 124 allows for movement of ear piece portion 120 (and puck 104) akin to the movement of traditional headphones. In one embodiment, headband 102 can include all necessary components to render VR or AR scenes to goggle portion 110. In this embodiment, puck 104 can be removed (either permanently or temporarily). In some embodiments, headband 102 can include a USB or similar connector to allow for the connection of additional processing devices. For example, a user can connect a device containing one or more processing elements (e.g., additional VR/AR processing elements described herein) having a male USB-C® connection into a female USB-C® connection port present on the top of headband 102 as more fully illustrated in FIG. 2H.

In some embodiments, ear piece portion 120 can include a speaker 128 directed inward toward a user's ear. Ear piece portion 120 can in turn be connected to a foam ear cushion 118 designed to cushion the assembly against the wearer's head. The outer surface of ear piece portion 120 is illustrated more fully in FIGS. 2A-I and the accompanying description. In some embodiments, ear piece portion 120 may not include additional processing elements and can be used primarily to route communications between the active devices forming other parts of the assembly, such as pucks or components removeably mounted to the headband 102. In alternative embodiments, additional processing elements can be placed within ear piece portion 120. For example, ear piece portion 120 can be equipped with additional haptic or audio devices to enhance a VR or AR experience (e.g., an electromechanical vibrator or bone-conduction sub-woofer).

In one embodiment, headband 102 can be equipped with one or more permanent or replaceable processing elements. In one embodiment, headband 102 can include one or more SoC devices, microprocessors, graphic processing units (GPU), and other processing devices such as networking devices, EEG sensors, brain-computer interface ("BCI") devices, haptic devices, etc. Each of the processing elements within the headband 102 can be connected to a bus that spans the length of the headband. In some embodiments, the bus can be routed to the ear piece portion 120 and to arm 106 and crossbar 108. Thus, as illustrated, a bi-directional communications bus forms a circular or semi-circular bus connecting each electronic component in device 100. The bus allows for communication between processing devices in the headband 102, puck 104, crossbar 108, and goggle portion 110 as discussed in more detail herein.

Attached to the ear piece portion 120 is a detachable processing device, or puck, 104. As described in more detail herein, puck 104 comprises a full-fledged mobile computing device that can communicate with other elements (e.g., headband 102, crossbar 108, and goggle portion 110) via a bi-directional bus. Additionally, or alternatively, puck 104 can be battery-powered and can be configured to operate independent of other components of device 100.

In one embodiment, puck 104 can be physical attached to and detached from the ear piece portion 120. In one embodiment, puck 104 can be connected to ear piece portion 120 via a magnetic coupling, screw coupling, snap fit coupling, swage fit coupling, or any other reliable mechanical and electrically conductive manner so as to provide removable and interchangeable functionality for the user. Examples of physical connection mechanisms are discussed more fully in connection with FIGS. 2A-I.

Figure 2A:
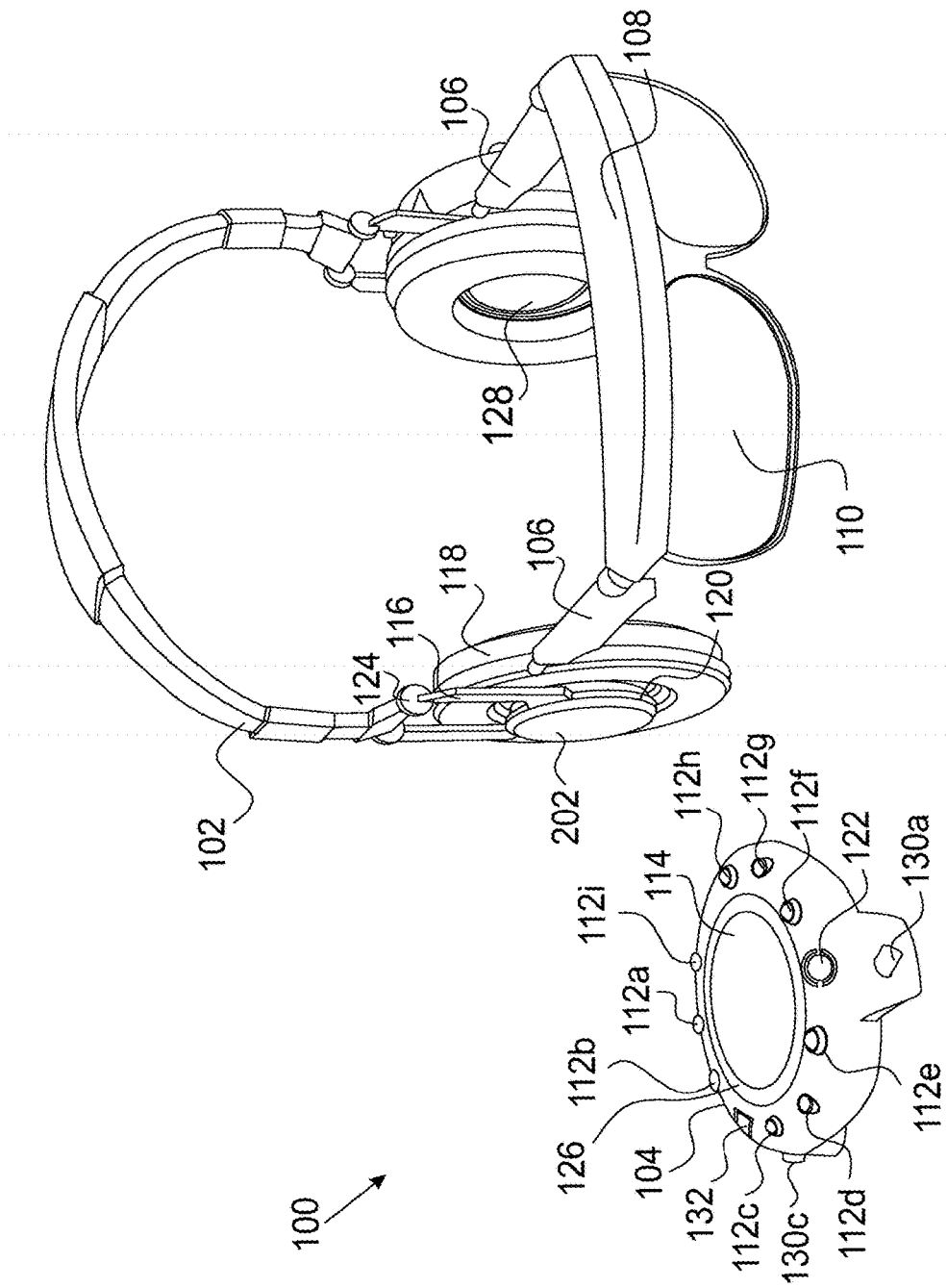
FIGS. 2A-2I depict a modular headphone-based VR/AR device assembly with a detached puck according to some embodiments of the disclosure.

In one embodiment, in addition to being physically connected to ear piece portion 120, puck 104 can additionally be communicatively coupled to ear piece portion 120 via one or more USB-C® connectors placed on the inward facing side of puck 104. In one embodiment, puck 104 and ear piece portion 120 can each include a female USB-C® receptacle and can be communicatively coupled with a male-to-male USB-C® connector as illustrated in FIGS. 2F-2G. In alternative embodiments, puck 104 can be designed such that a male USB-C® connector present on the inside of puck 104 can be inserted into a female USB-C® receptacle present on the ear piece portion 120. In alternative embodiments, puck 104 can be configured with a female USB-C® receptacle and ear piece portion 120 can be configured with a male USB-C® connector. The use of a USB-C® connection allows for communications between the puck 104 and the headband 102 and goggle portion 110, using the bus discussed previously. In alternative embodiments, other communications protocols can be used to connect puck 104 with ear piece portion 120. For example, near field communications, BLE or other wireless coupling methodologies can be used alone or in combination.

Located on the outside of puck 104 are multiple openings, apertures or mounting positions referred to herein interchangeably as "rivets" 112a-112i. In various embodiments, rivets 112a-112i can house or retain various components for performing VR or AR-specific operations. For example, rivets 112a-112i can house capture devices or tracking devices or combinations thereof. In some embodiments, puck 104 can be equipped with only capture devices or with only tracking devices in or at each rivet 112a-112i. In alternative embodiments, puck 104 can be configured with both capture devices and tracking devices at or in each of rivets 112a-112i.

In one embodiment, a capture device can comprise a camera and/or an LED. In this embodiment, the LED can be utilized to illuminate a physical space while the camera records images at one or more angles. In some embodiments, an LED and camera can be combined into a single rivet, while in alternative embodiments (discussed herein) LEDs and cameras can be placed in individual rivets at various locations on the puck. In some embodiments, other light sources other than LEDs can be used in place of LEDs. In some embodiments, a light source placed in or at rivets 112a-112i can comprise a polarized light source, unpolarized light source, laser diode, infrared (IR) source or combinations thereof. As used herein a light source can be a device that emits electromagnetic or photonic energy in visible or invisible wavelengths. In one embodiment, images captured by capture devices can be used to collect image data that can be used for generating content, including VR content. In some embodiments, the images captured by the multiple capture devices in or at rivets 112a-112i can be stored in memory present within the puck 104 and used for later display as a three-dimensional scene via crossbar 108 and goggle portion 110. In some embodiments, the cameras can be fitted with wide angle lenses or fisheye lenses. Thus, in some embodiments, puck 104 can be configured as a portable light field or reflectance field capture device and can transmit light field or reflectance field image data to goggle portion 110 or to other devices on or in communication with the device 100. In one embodiment, puck 104 can allow a user to view a three-dimensional rendering of a space in real-time or near-real time. To enable this operation, puck 104 can be configured with one or more processors to process light field or reflectance field images or to send some or all raw light field data to an external device and receive a stream of further processed data representing the VR or AR scene to be rendered. Additional details of the operation of capture devices in connection with light field and reflectance field capture is described more fully in connection with FIGS. 6A through 6C, although persons of skill will recognize that having light field or reflectance field capture devices mounted at each side of a user's head offers great advantages in the creation, capture and rendering of truly accurate and immersive VR/AR experiences.

In some embodiments, the cameras are configured to capture the reflectance fields of a subject and/or space. In this embodiment, the cameras capture images of the subject/space from multiple viewpoints using a dense sampling of incident illumination provided by light sources on the puck. The cameras transmit these images to a processor which constructs a reflectance function image for each observed image pixel from its values over the space of illumination directions. A processor is then able to generate images of the space/subject from the original viewpoints in any form of sample or computed illumination. In order to change viewpoints, the processor can then utilize a constructed model of the subject/space to estimate the appearance of the reflectance functions for different and/or new viewpoints. In some embodiments, two or more pucks can be used to capture reflectance fields. In this embodiment, pucks can communicate between each other to identify the precise location of light sources present on the puck cameras. In some embodiments, two or more pucks can be placed at varying distances or can be carried by one or more drone devices as discussed in connection with FIGS. 8A, 8B, and 9. In some embodiments, multiple pucks are capable of synchronizing cameras and/or light sources during operation.

Puck 104 can additionally include multiple tracking devices in rivets 112a-112i. In one embodiment, a tracking device can comprise a photosensor device configured to detect light emitted from a positional tracking base station. In alternative embodiments, tracking devices can comprise a depth camera. In these embodiments, puck 104 can be configured to track the position of a user while the user views a VR or AR display. Alternatively, or in conjunction with the foregoing, puck 104 can additionally include processing elements to track the head movements of a user. Details on the operation of tracking devices are described more fully in connection with FIGS. 6A through 6C. Various layouts of VR/AR processing devices in rivets 112a-112i are described more fully in connection with FIGS. 3A-R, and in particular FIG. 3H.

Puck 104 can additionally include one or more projection devices 130a, 130b. In one embodiment, projection devices 130a, 130b can comprise swivelable or positionable pico projector modules, pico projectors being small devices that can project images in the area surrounding the pico projector, generally laser based. In some embodiments, projection devices 130a, 130b can include or intercommunicate with optional depth sensors. In some embodiments, projection devices 130a, 130b can include an RGBZ module. Projection devices 130a, 130b can be configured to project light field scenes or other visible video or image information into a physical space, generally onto one or more surfaces in the space.

In one embodiment, projection devices 130a, 130b can be utilized while a user is wearing the device 100. In alternative embodiments, projection devices 130a, 130b can be used when the puck 104 is detached from the device 100. In alternative embodiments, projection devices 130a, 130b on one puck being used while detached while the user utilizes the device 100. In some embodiments, puck 104 can include at least three projectors to provide a wide degree projection that from a user's perspective seems to encompass most or all of their field of view. In this embodiment, projectors can be spaced according to the range of projection provided by each projector. In some embodiments, projection devices 130a, 130b can have an electronically or mechanically controlled skew mechanism allowing for projection devices 130a, 130b to be reoriented as needed. In some embodiments, projection devices 130a, 130b can be utilized in augmented reality applications. For example, projection devices 130a, 130b can be used with a mapping application wherein a route is projected downward (e.g., onto a sidewalk) while a user is in motion (for example to show projected footprints or line(s) to follow).

In embodiments, puck 104 additionally includes a display device 114. In one embodiment, display device 114 can comprise an OLED touchscreen display. In some embodiments, display device 114 can be communicatively coupled to one or more processors such as video processors or graphics processing units (GPUs) embedded within puck 104. In one embodiment, display device 114 can display information regarding the processing operations of puck 104. In one embodiment, display device 114 can display the view a user sees in display device 114. In alternative embodiments, display device 114 can display a QR code that identifies the user. For example to promote social networking the display 114 can display a mood or status or QR code reflecting same, so as to alert other in proximity of the user's social interactivity, desires or availability. In alternative embodiments, a QR code can be printed on puck 104 itself. In alternative embodiments, display device 114 can display a song or video being listened to or viewed, respectively, by the user. In alternative embodiments, display device 114 can display notifications or information regarding the user. For example, display device 114 can display that a user is capable of hearing another user despite wearing the puck over the user's ear. As discussed previously, puck 104 can be configured to display information on display device 114 even while disconnected from device 100. In these embodiments, puck 104 can operate as a handheld, networked computing device or set-top box to control content or generate content to be displayed on a remote display alone or in concert with attached goggles. In some embodiments, puck 104 can additionally include a touch-sensitive scroll wheel 126. In this embodiment, scroll wheel 126 can comprise a capacitive sensor, or a ring-shaped OLED touch-screen display circling display 114, or other touch sensitive sensing mechanism to detect a user's finger or hand contact for device control.

In embodiments, puck 104 additionally includes an input device 122. In one embodiment, input device 122 can comprise a trackball device configured to control interaction with display device 114. In some embodiments, input device 122 can include haptic rumble, pressure sensitivity, and/or modal click functionalities. In some embodiments, input device 122 can additionally include one or more navigational buttons (e.g., a "forward" or "back" button) to enable a user to navigate through user interfaces displayed on display device 114. In alternative embodiments, puck 104 can be equipped with an expandable "accordion" keyboard that expands outwardly from the center of puck 104. Examples of an accordion keyboard are described more fully in connection with FIG. 3O. Alternatively, or in conjunction with the foregoing, puck 104 can be configured to receive an external mouse or keyboard input via a USB input port. Puck 104 can additionally include one or more push buttons 132.

As discussed previously, puck 104 may be configured to transmit data to goggle portion 110 via arm 106 and crossbar 108. In one embodiment, arm 106 may comprise a bus connecting ear piece portion 120 (and thus, puck 104) to crossbar 108. In alternative embodiments, arm 106 can additionally be configured with additional processing devices (e.g., devices to support head tracking, position tracking, or light field capture). In some embodiments, a puck 104 on the side of device 100 can be configured to drive a single OLED display 114. For example, a puck on the left side of device 100 can be configured to drive an OLED display on the left side of device 100. Likewise, a puck on the right side of device 100 can drive an OLED display on the right side of device 100, or a single puck can control both sides.

As illustrated, goggle portion 110 is connected to ear piece via arm 106. In one embodiment, goggle portion 110 can be detachable as illustrated in FIG. 4B. Goggle portion 110 can be connected to arm 106 via crossbar 108. In one embodiment, crossbar 108 can include one or more processors or other components for controlling the goggle portion 110. For example, crossbar 108 can include and HDMI to MIPI converter, a USB-C® controller, a dedicated microcontroller, cache memory, eye tracking processor, and other components. However, crossbar 108 is not required to include processing elements for generating three-dimensional scenes. Instead, three-dimensional scenes can be processed and transmitted to goggle portion 110 from one or more pucks 104 or headband based processors or external sources using scene data collected by components of device 100. Thus, in some embodiments, the weight of crossbar 108 can be reduced and processing functionality can be offloaded to one or more pucks 104 and/or headband 102.

In some embodiments, puck 104 can be additionally configured with one or more external hooks located on the exterior perimeter of the puck 104. In this embodiment, the hooks allow for automated detachment of the puck 104 from the ear piece portion 120. In alternative embodiments, puck 104 can include a slot separating the puck 104 from ear piece portion 120. In this embodiment, a drone device can be configured to remove the puck 104 from ear piece portion 120 by inserting a fork-lifting or hook member into the slot and moving away from the ear piece portion 120, thus detaching the puck 104 from the ear piece portion 120. In alternative embodiments, puck 104 can be configured with an outward facing charging port (e.g., a USB port or inductive charging pad) to facilitate re-charging the puck via a drone re-charging mechanism discussed more fully herein.

As illustrated above, the device 100 comprises a highly modular VR/AR device. In operation, various components of the device 100 can be removed, replaced, or upgraded as needed. Thus, users are not required to replace the entire device upon failure of a single component or upon upgrades to technology. For example, in one embodiment headband 102 can comprise core processing components to display VR or AR scenes via goggle portion 110. In this embodiment, a puck 104 can be utilized to add additional VR or AR functionality (e.g., position tracking, light field capture, etc.) to a base processing functionality. Additionally, in alternative embodiments, pucks 104 can be replaced or interchanged with other pucks having differing components as required by the user under differing circumstances.

FIGS. 2A-2I depict a modular headphone-based VR/AR device with a detached puck according to some embodiments of the disclosure.

As illustrated in FIGS. 2A-F, puck 104 can be removed or detached from device 100 upon physical manipulation of the user or via an automated removal procedure (e.g., drone removal or switch activation or voice command). FIGS. 2A-F illustrate the covered portion of ear piece portion 120. In this embodiment, puck 104 can be communicatively coupled to device 100 via an inductive connection between puck 104 and ear piece portion 120 or via a wireless connection between puck 104 and ear piece portion 120. In alternative embodiments (discussed below), a wired connection can be used to connect puck 104 to device 100.

Figure 2B:
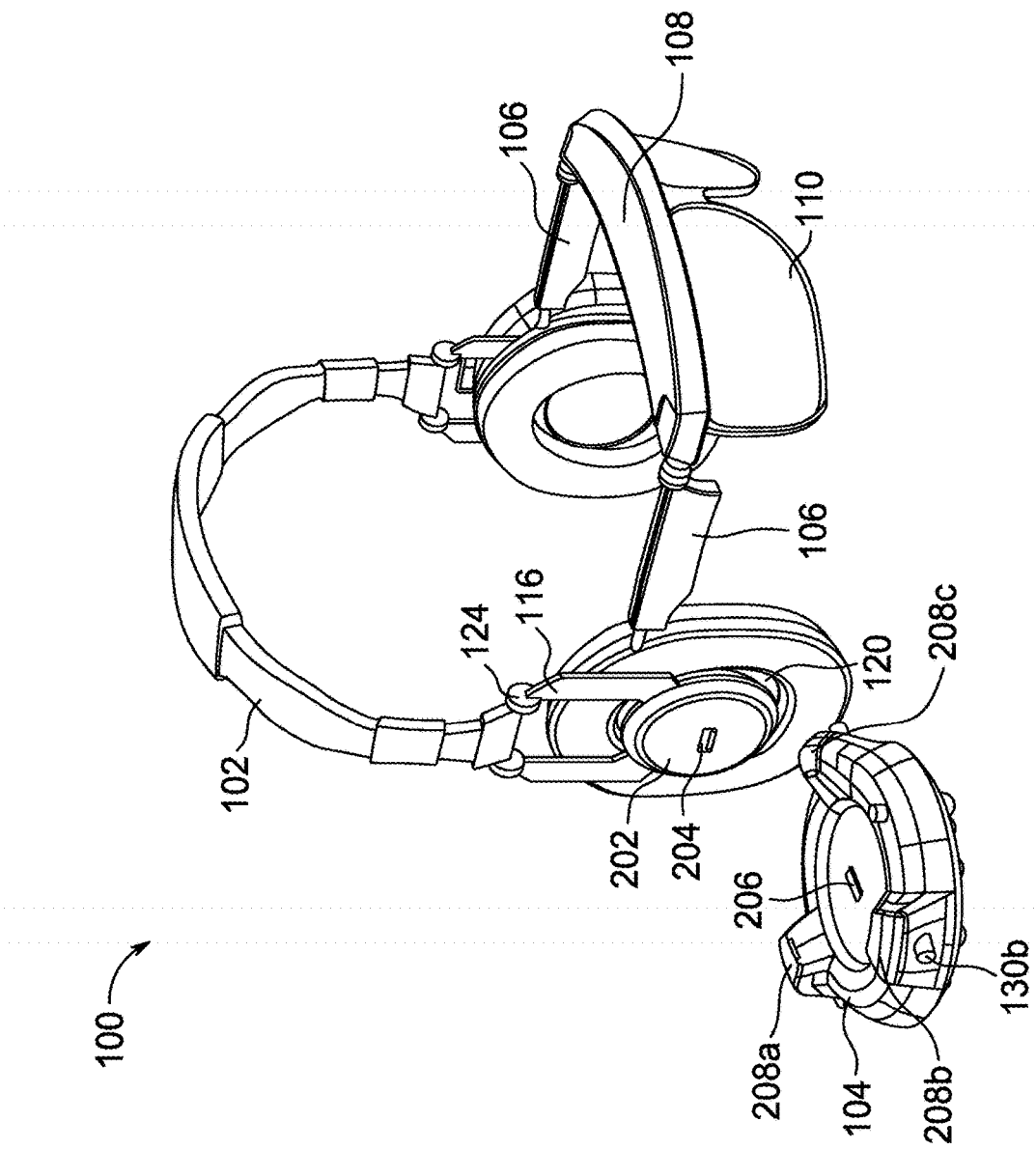

As illustrated in FIG. 2B, docking surface 202 of ear piece portion 120 can include a female USB-C® receptacle 204. Likewise, puck 104 can include a female USB-C® receptacle 206. Additionally, puck 104 can include multiple support arms 208a-c configured to retain the position of the puck 104 upon attachment to docking surface 202 and or act as mounting surfaces for components or sensors. Alternatively, or in conjunction with the foregoing, arms 208a-c can be used to align the puck 104 during automated docking and undocking. Notably, arms 208a-c may be optional components as illustrated in FIGS. 3P through 3R.

Figure 2C:
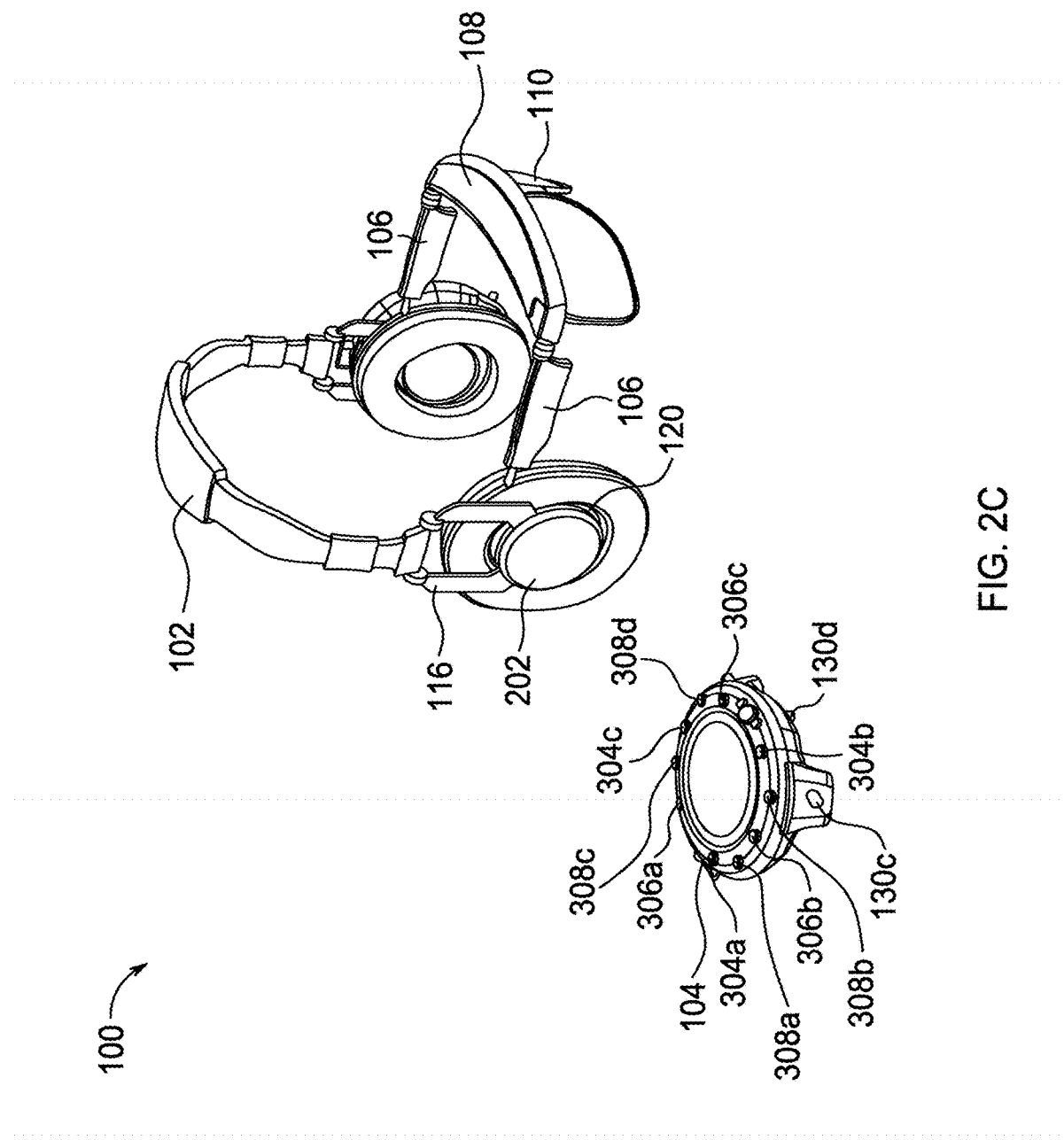
Figure 2D:
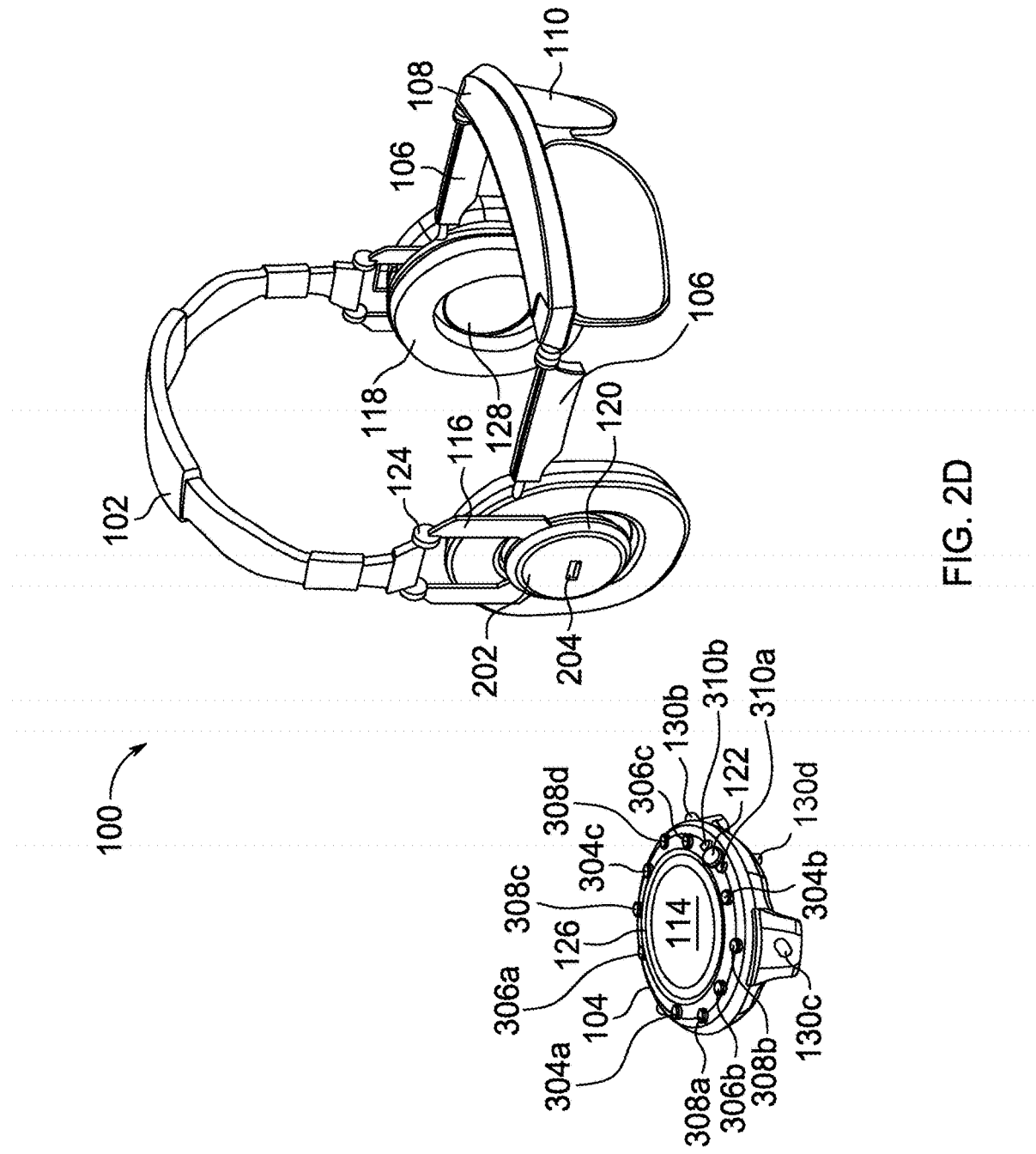
Figure 2E:
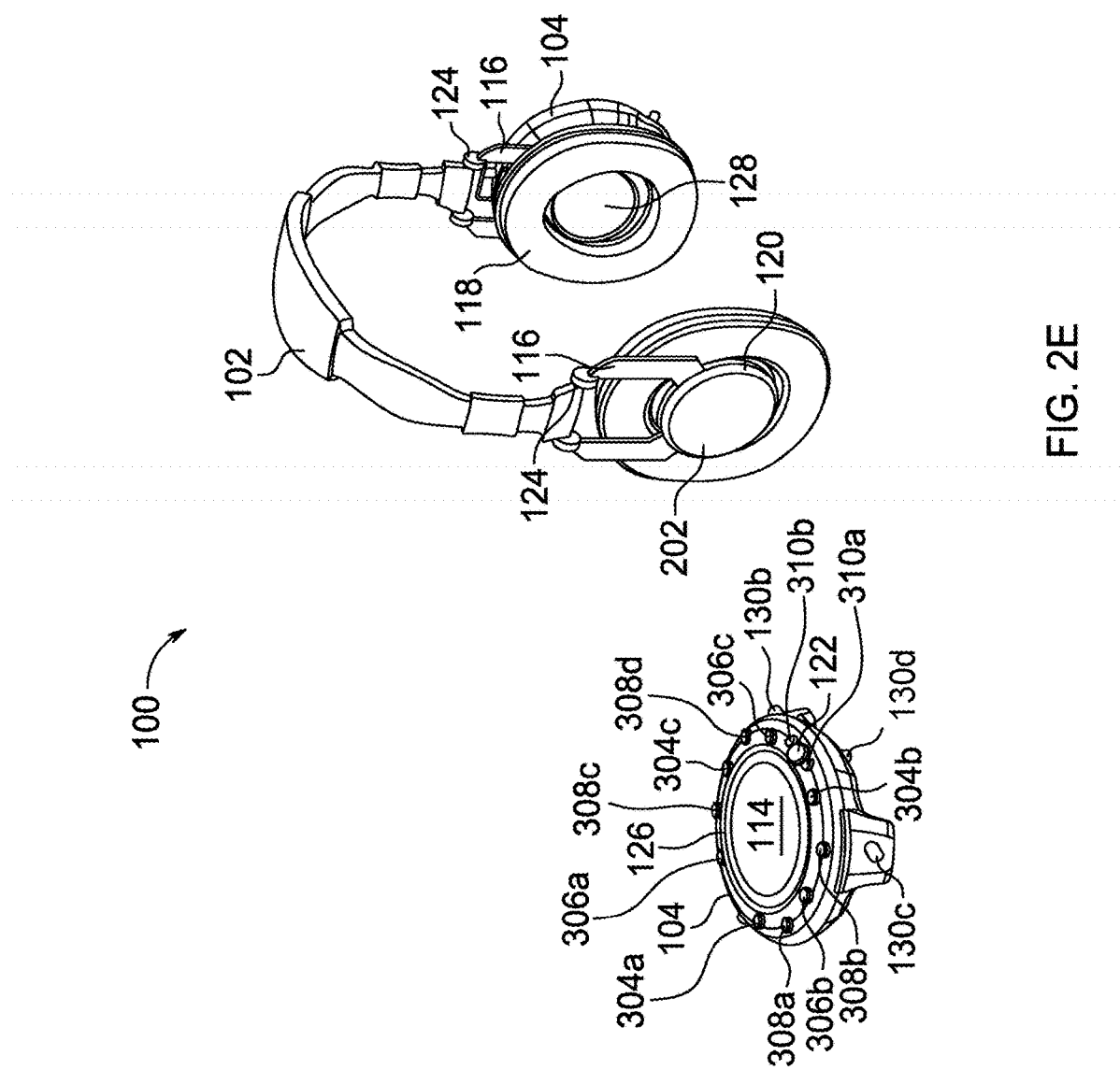
Figure 2F:
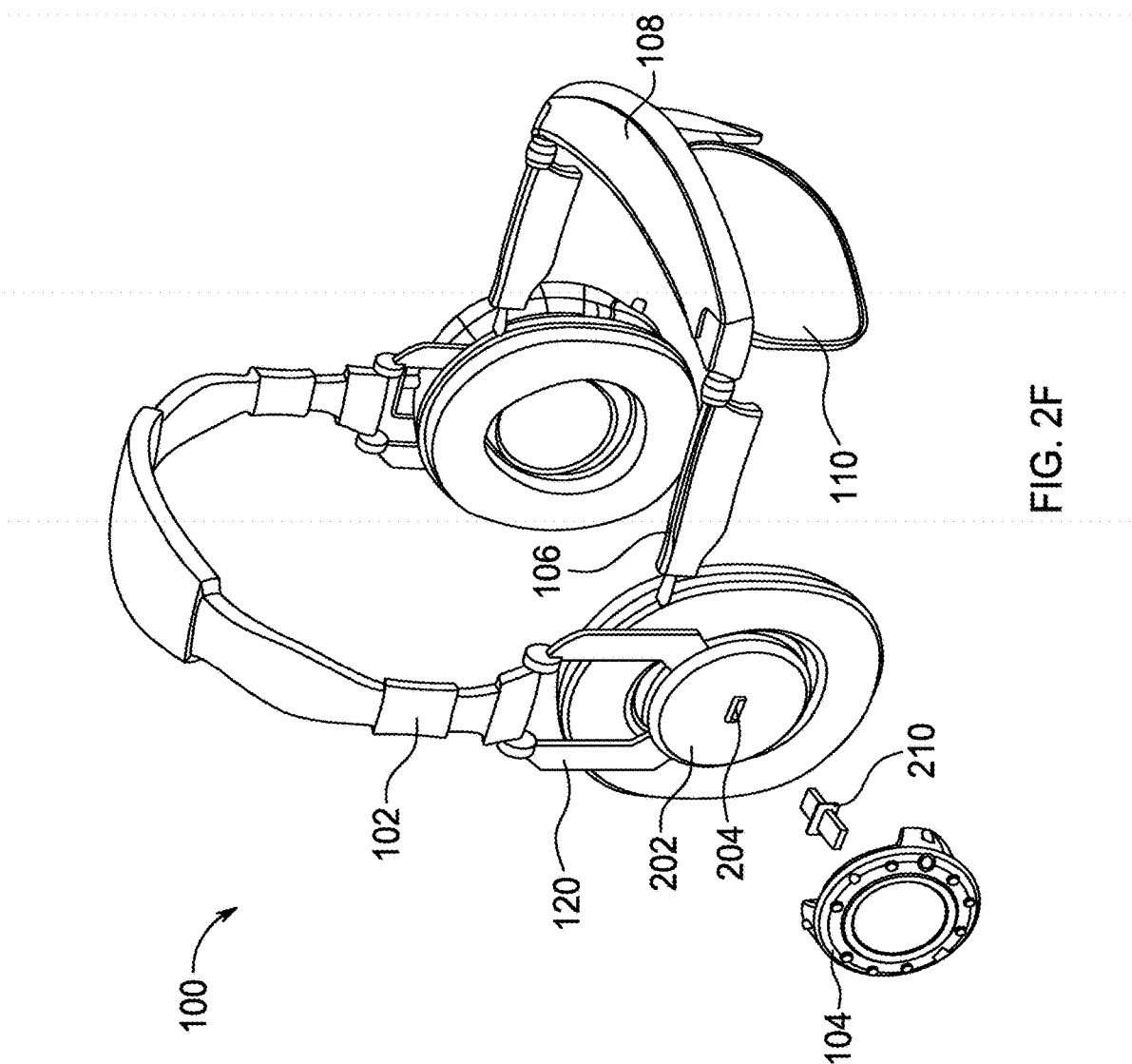
Figure 2G:
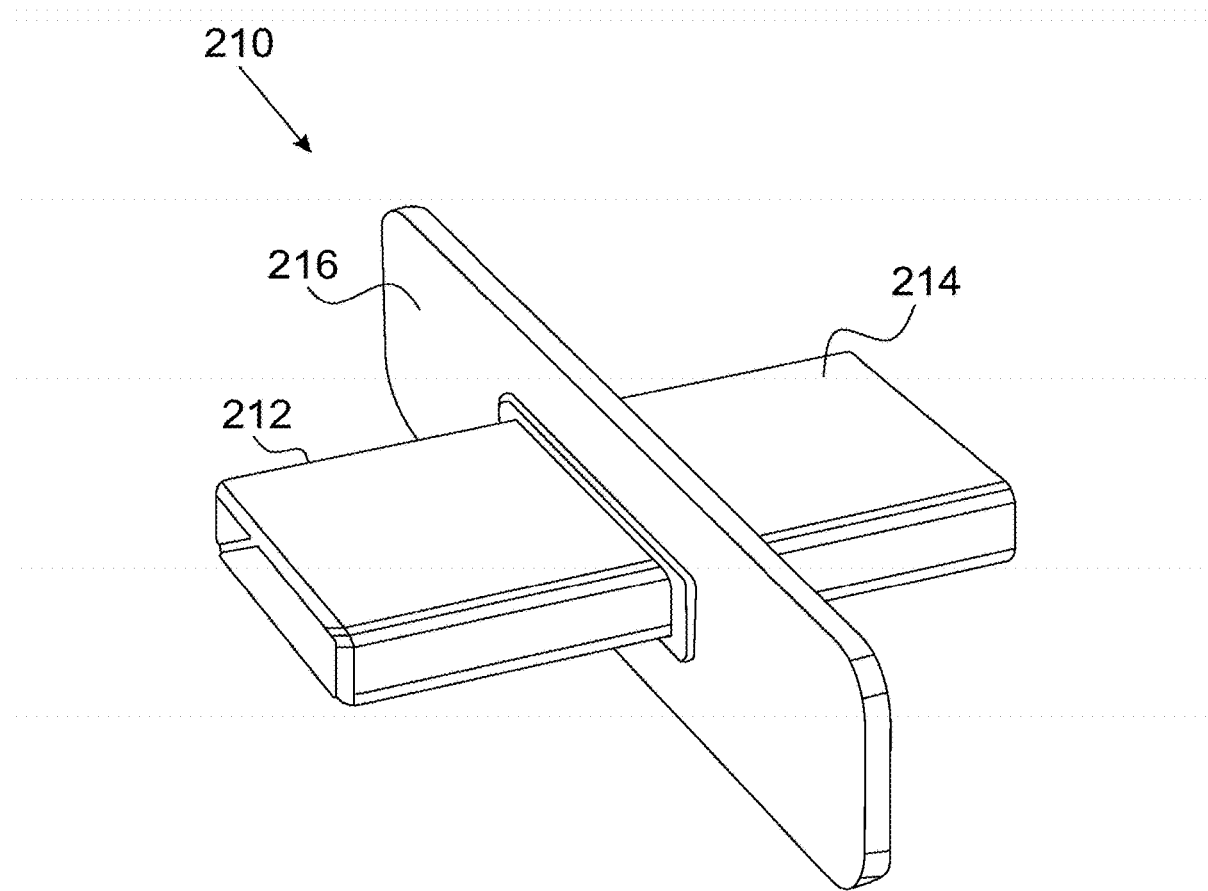

FIGS. 2C and 2D illustrate alternate views of the VR/AR device 100 discussed in connection with FIGS. 2A and 2B. FIG. 2E illustrates the detachment of puck 104 when a goggle portion is detached from the VR/AR device 100.

FIGS. 2F illustrates the use of a male-to-male USB-C® connector 210 to communicatively (and, in some embodiments, physically) connect puck 104 to ear piece portion 120 via docking surface 202. As illustrated in more detail in FIG. 2G, connector 210 includes two opposing male USB-C® connectors 212, 214 separated by a flange 216. In this embodiment, a first male end 212 of connector 210 can be inserted into puck 104 while the opposing end 214 can be inserted into docking surface 202. As discussed, the use of connector 210 can allow for the physical and communicative coupling of puck 104 to a VR/AR device 100.

Figure 2H:
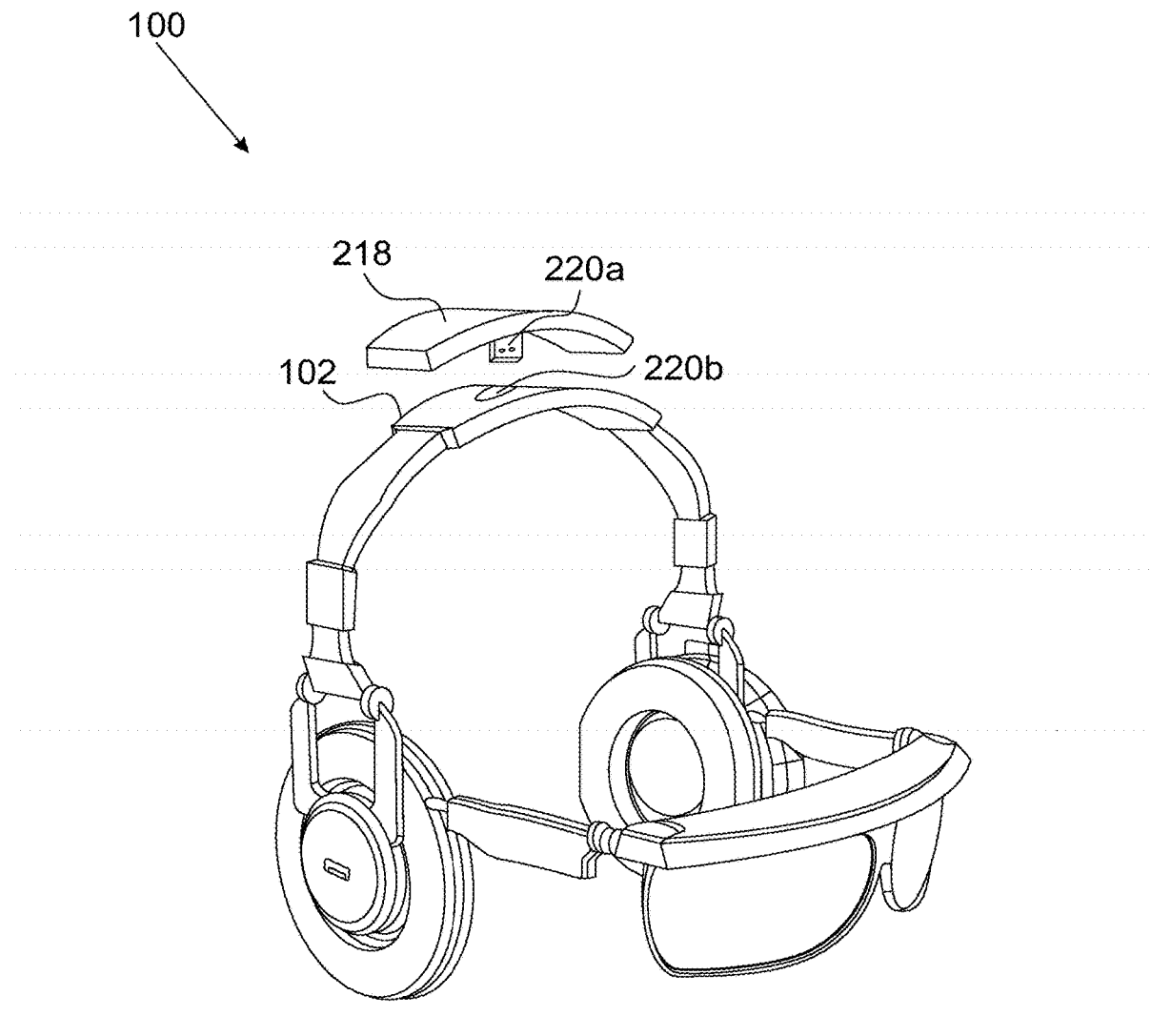

As illustrated in FIG. 2H, a VR/AR device 100 can include a modular headband extension 218. Extension 218 can comprise a full-fledged processing device as described in connection with FIG. 5. In some embodiments, extension 218 can further include VR/AR-specific processing elements as discussed in connection with FIGS. 6A through 6C. As illustrated, module headband extension 218 can connect to headband 102 via a USB connection 220a, 220b. In alternative embodiments, extension 218 can be connected to headband 102 via a wireless connection such as a Bluetooth, NFC, or Wi-Fi connection.

Figure 2I:
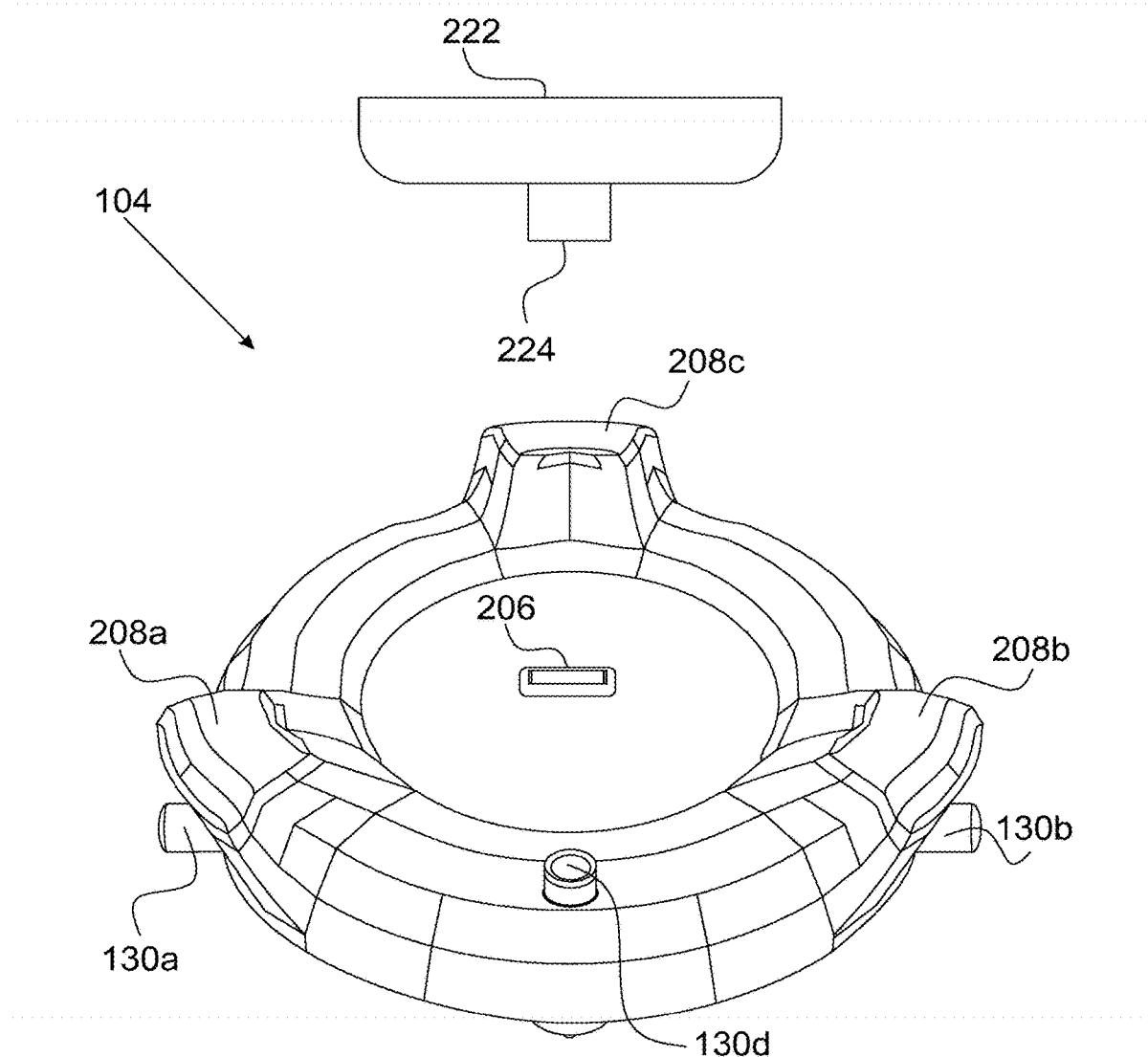

FIG. 2I illustrates a puck 104 and a removable processor component 222 according to some embodiments of the disclosure. In some embodiments, a removable processor component 222 can be placed in between puck 104 and a mounting plate. As described more fully in connection with FIGS. 6B and 6C, a processor component 222 can comprise a component fitted to nest between a mounting plate and the rear side of puck 104. In this embodiment, the processor component 222 can include the main processing components used by a VR/AR device and can connect to the headset via USB ports 206 and 224. In this embodiment, puck 104 can include fewer electronics and can offload processing to the processor component 222 via USB ports 206 and 224. For example, puck 104 may only include an FPGA to drive VR/AR components and may forward all data to processor component 222 via USB ports 206, 224 for further processing. This configuration facilitates the swapping out of major processing components in a modular manner thus further protecting a user's investment in the device of the present disclosure, since the pucks can be modified with improved processing power without replacing the entire puck.

Figure 3A:
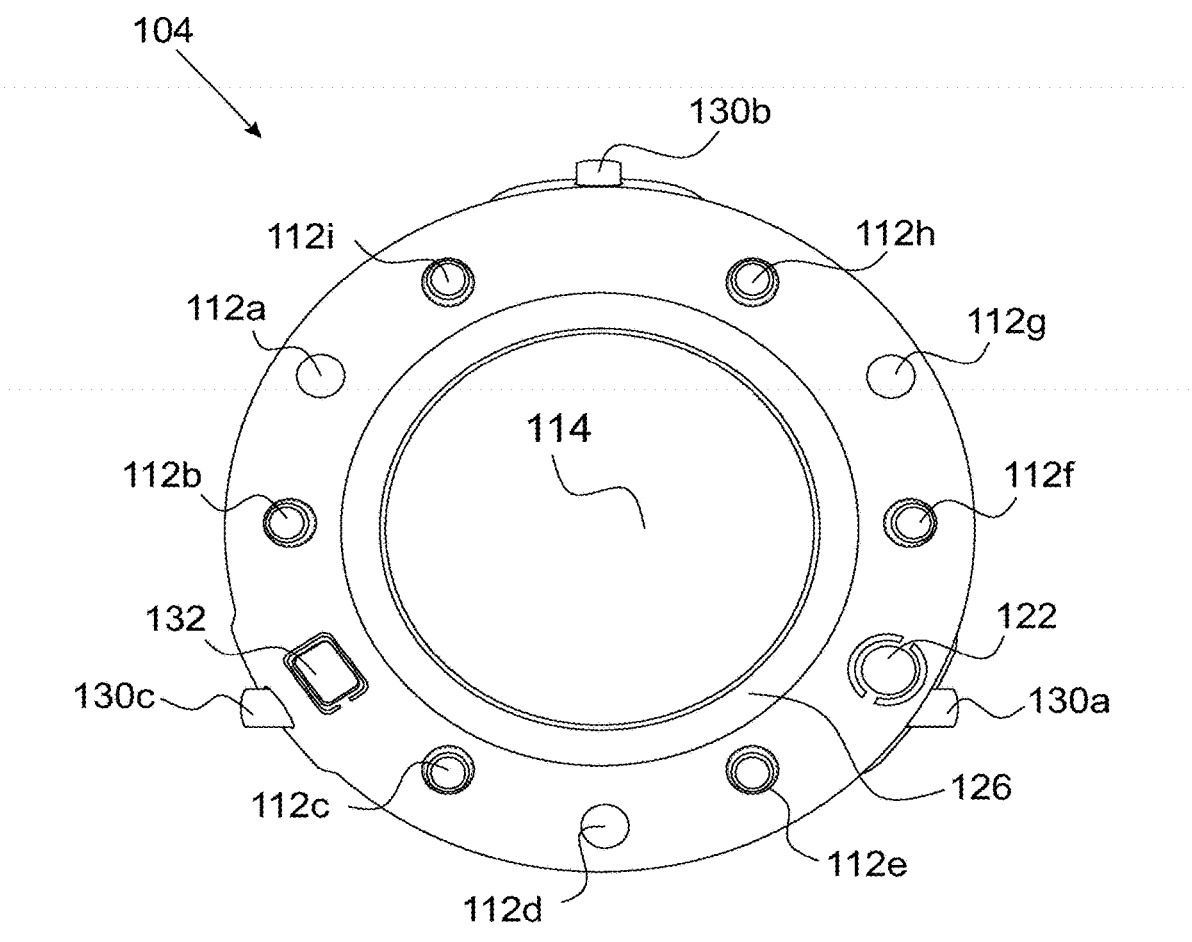
FIGS. 3A-3U depict a puck according to some embodiments of the disclosure.
Figure 3B:
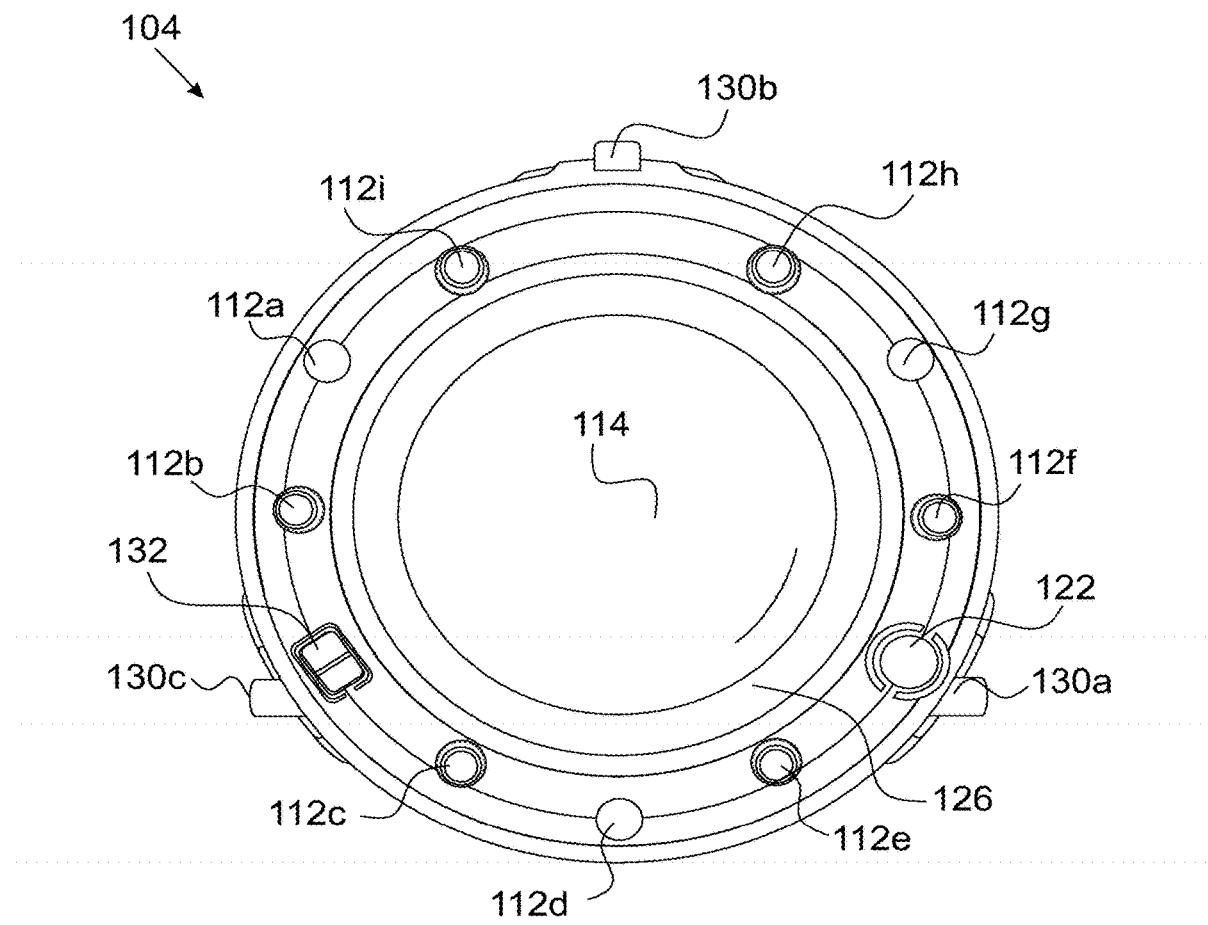
Figure 3C:
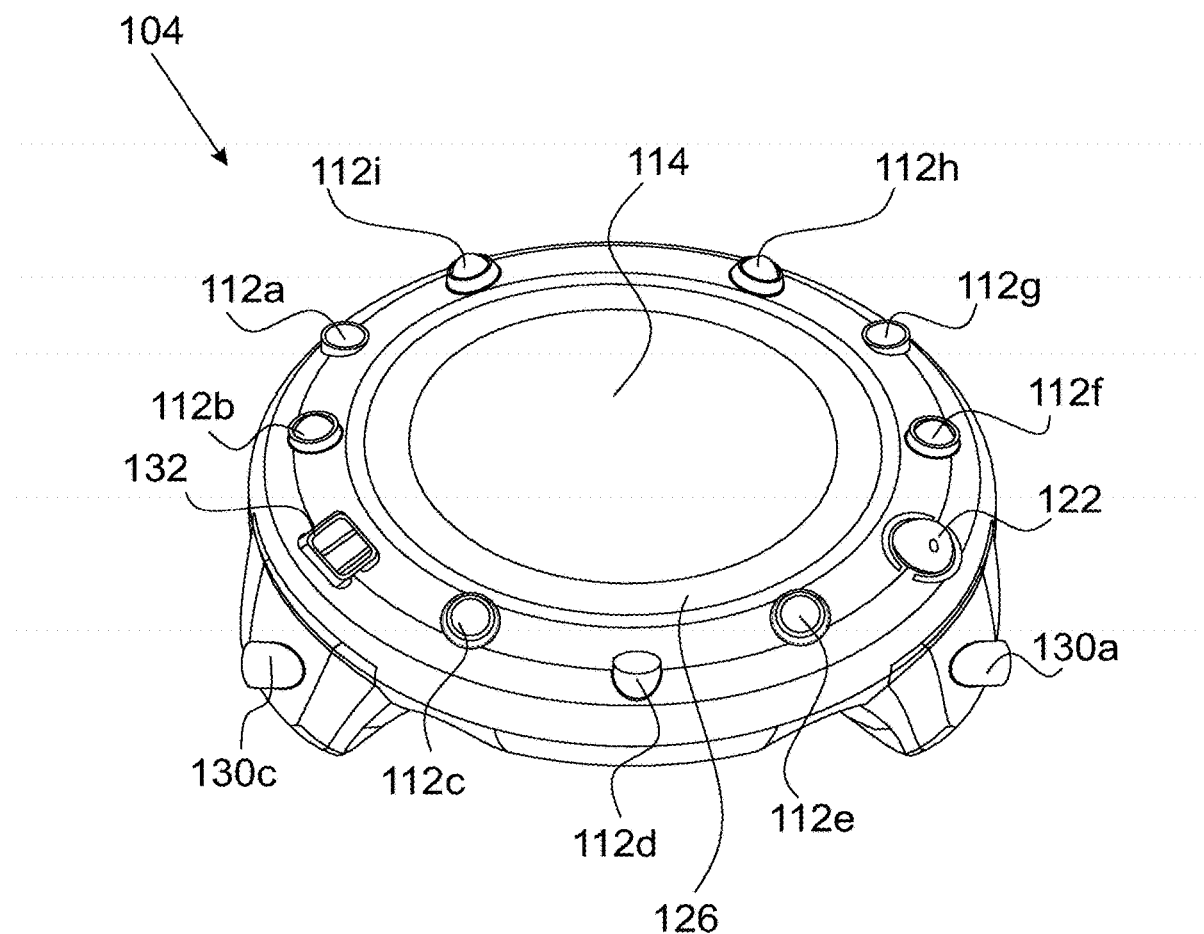
Figure 3D:
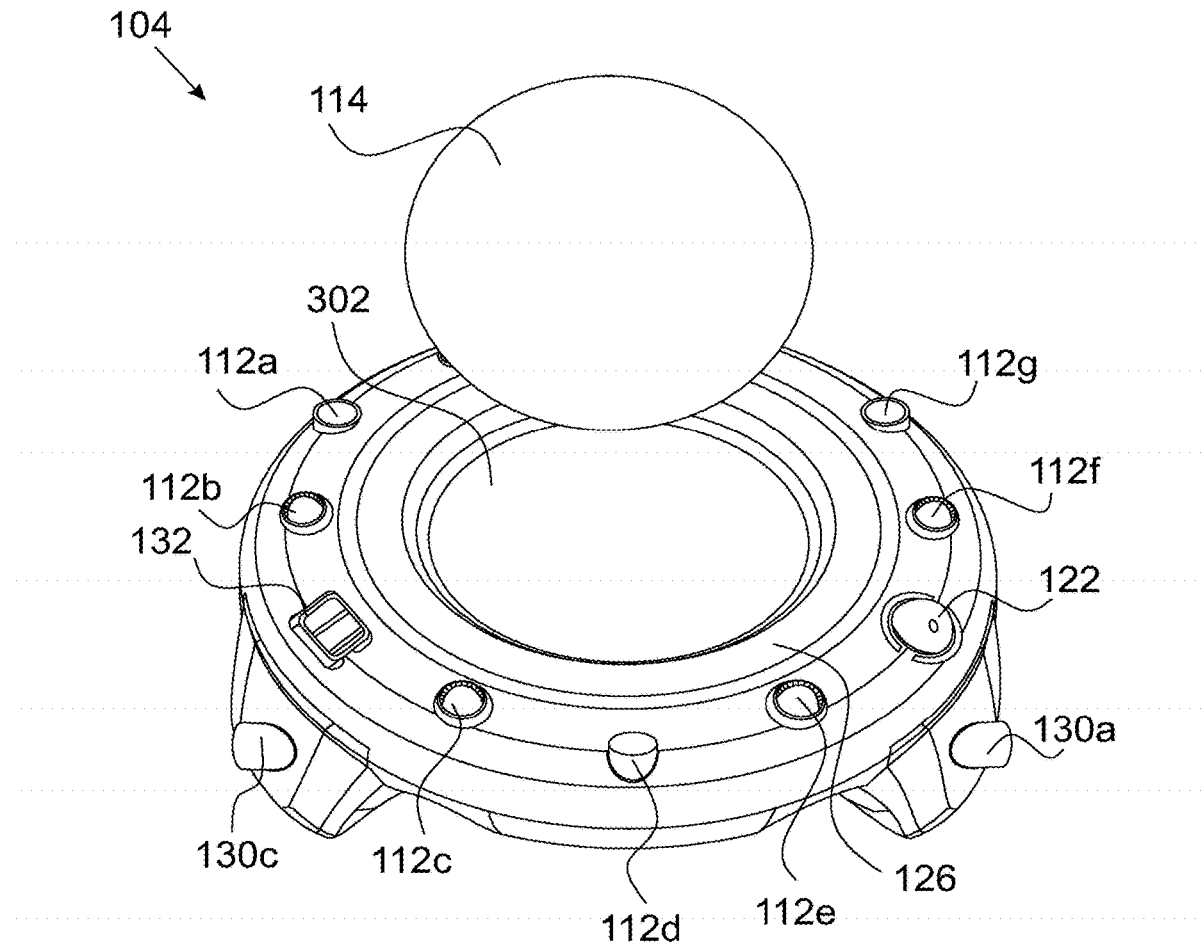
Figure 3E:
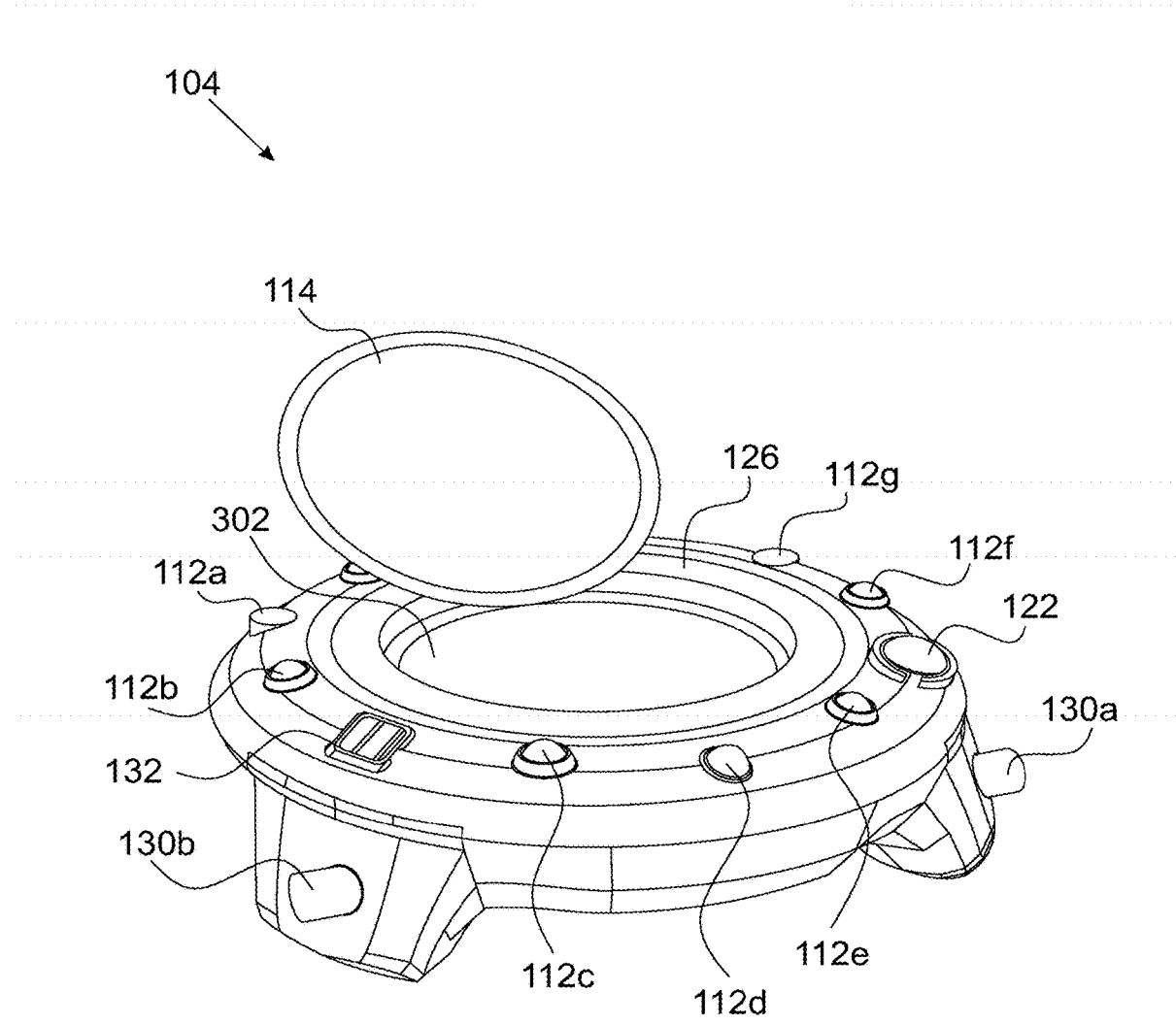
Figure 3F:
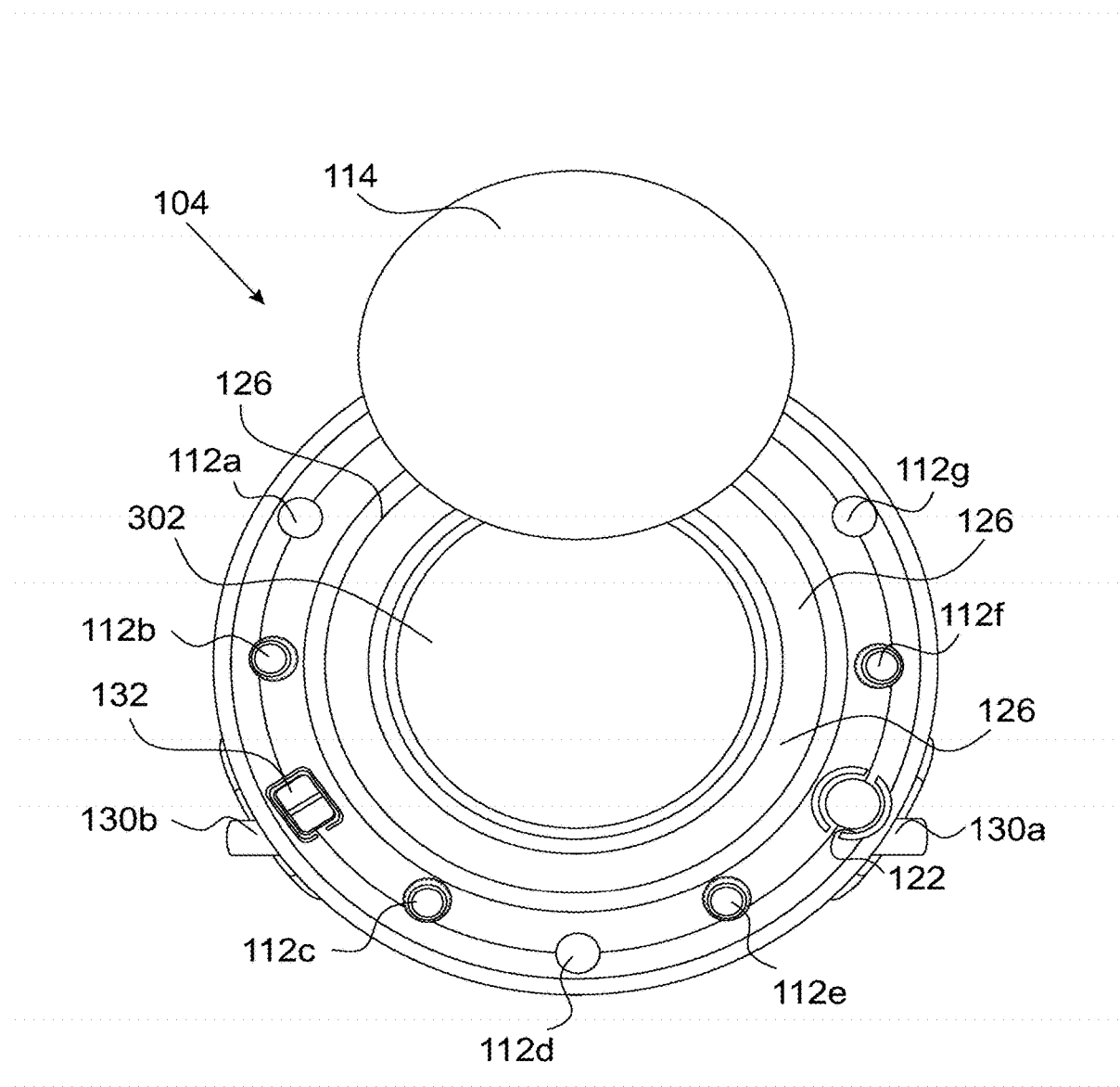
Figure 3G:
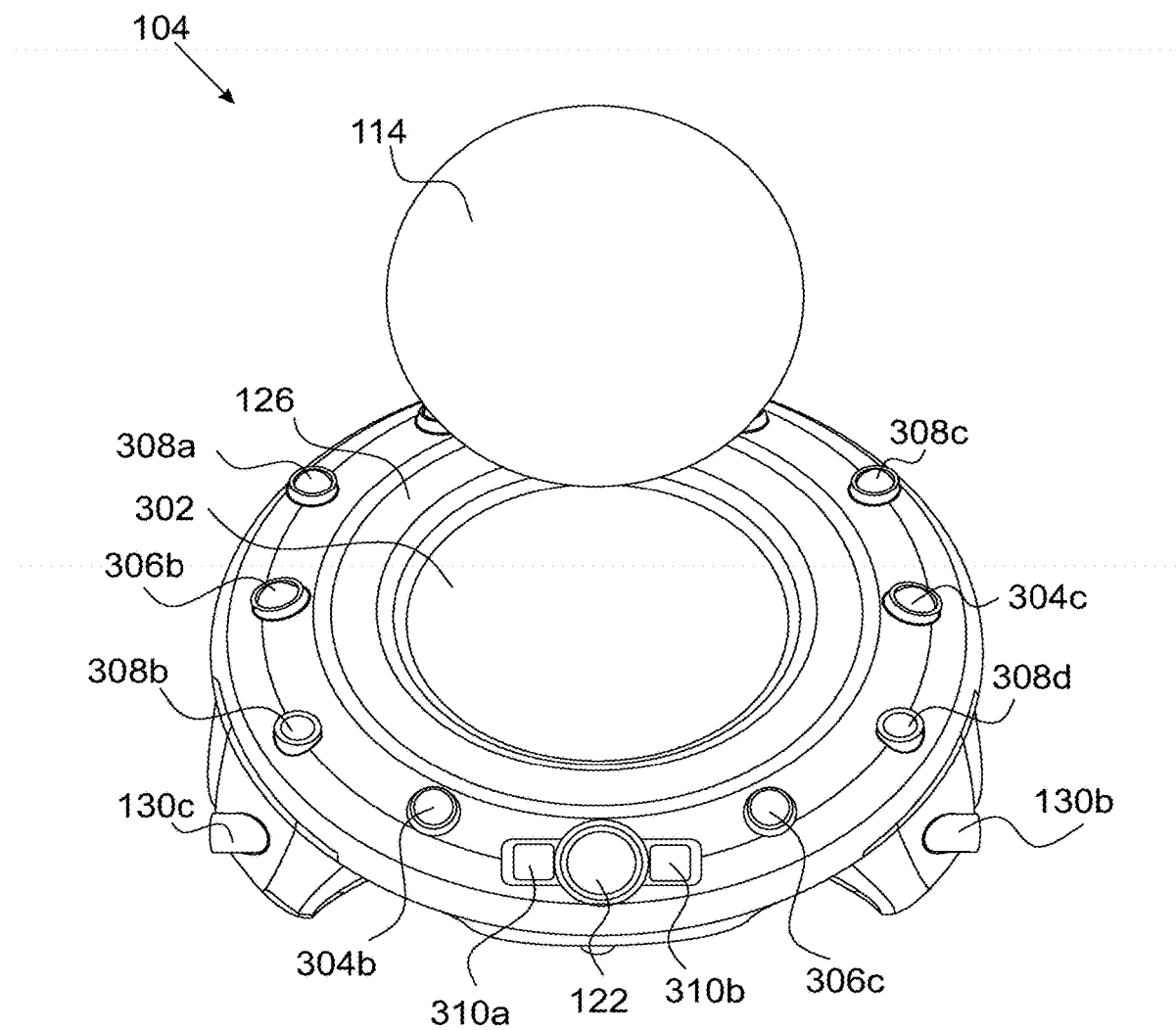
Figure 3H:
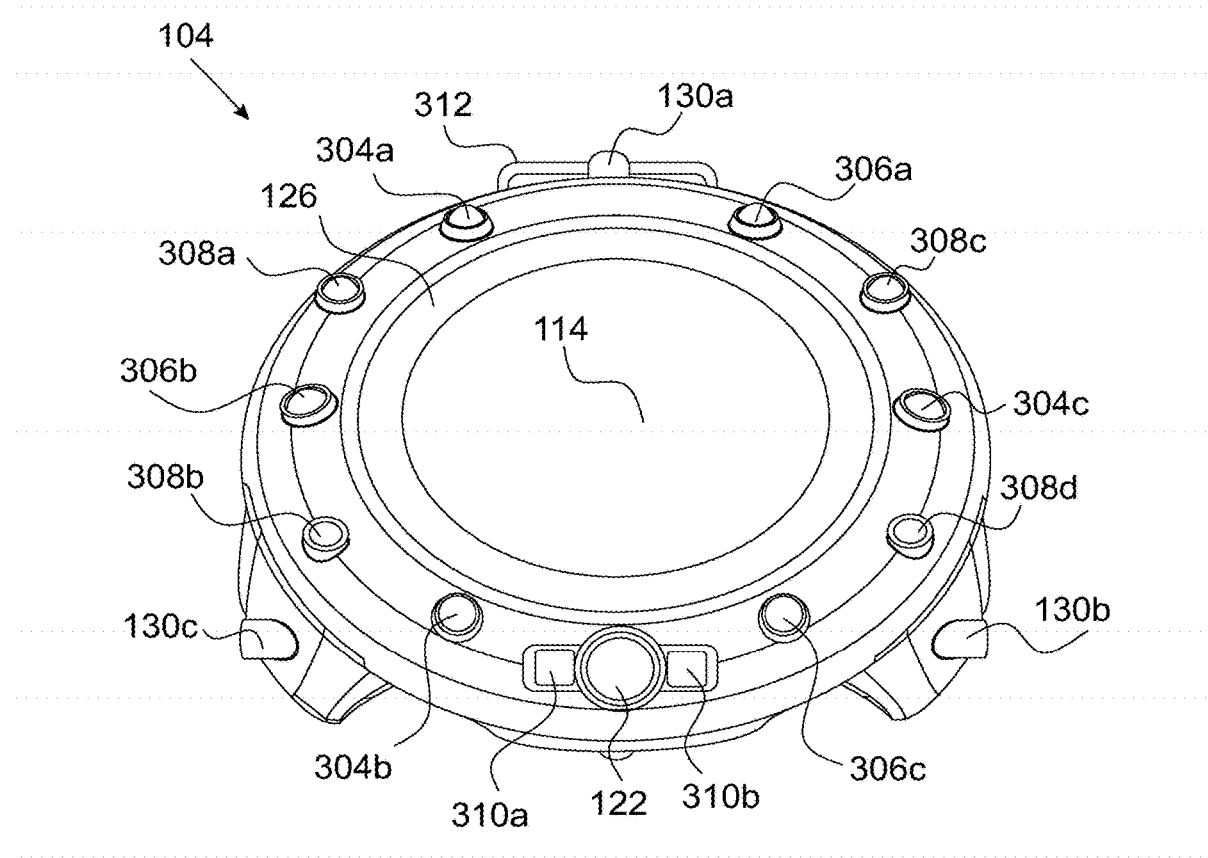
Figure 3I:
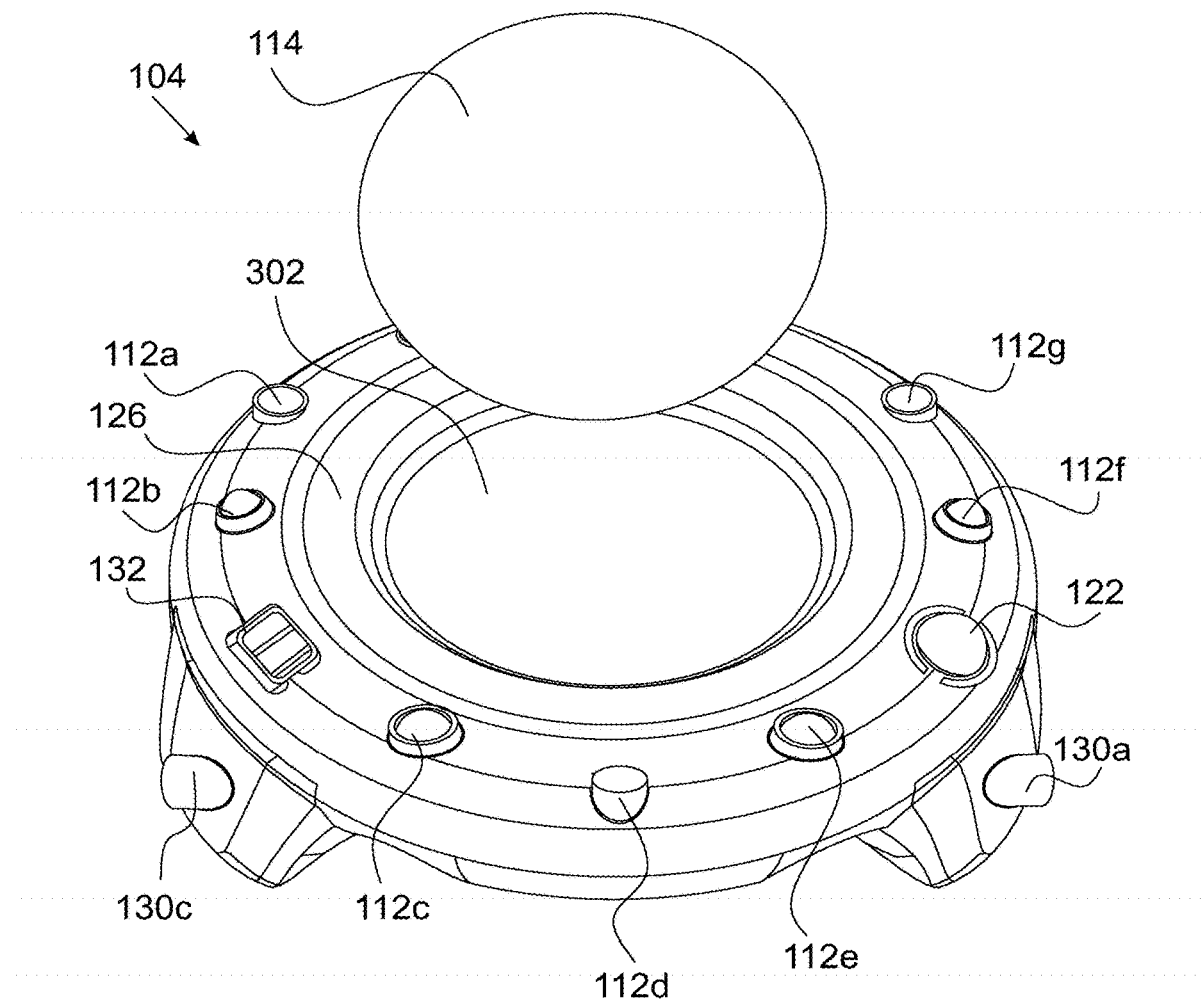
Figure 3J:
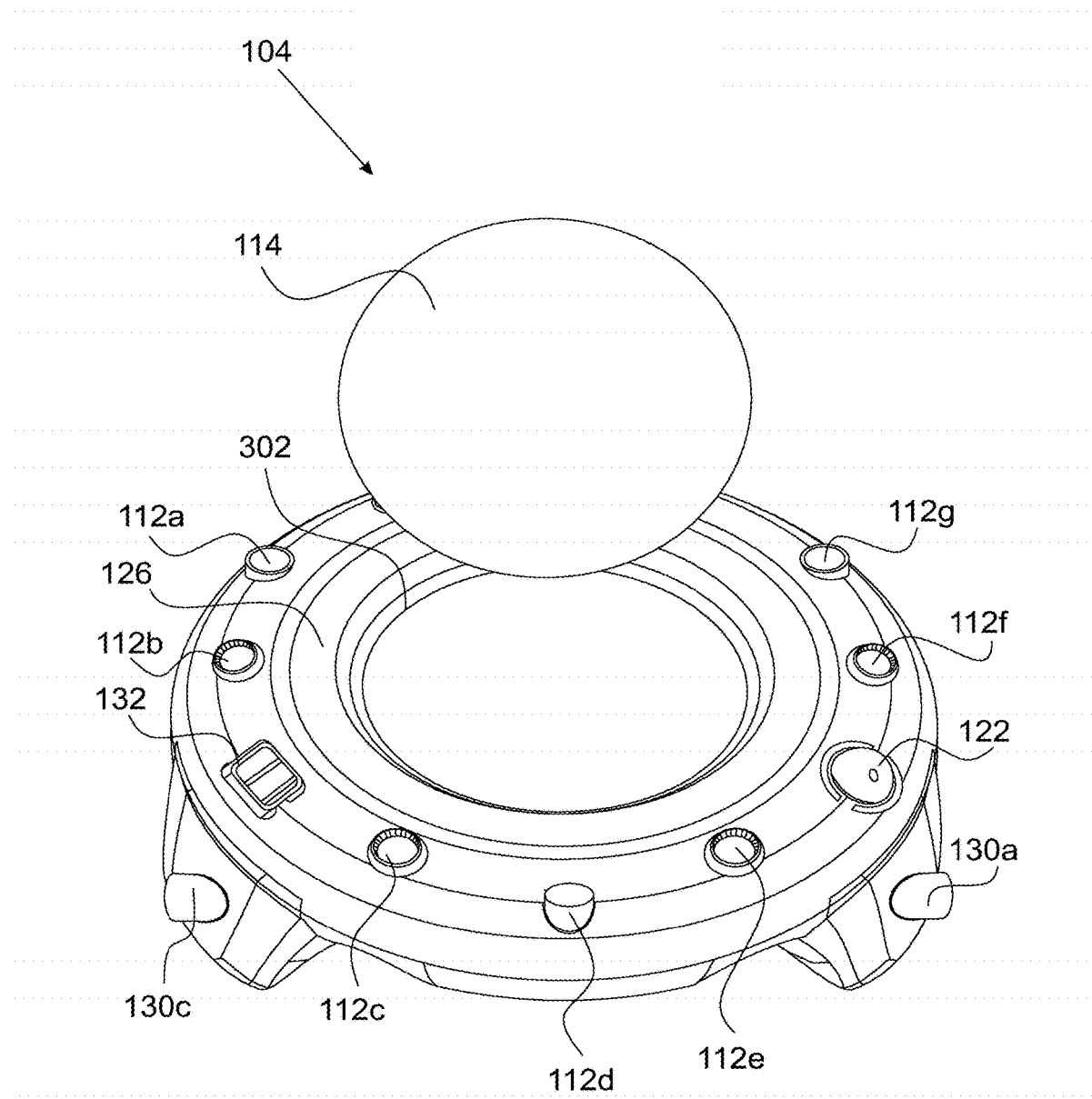
Figure 3K:
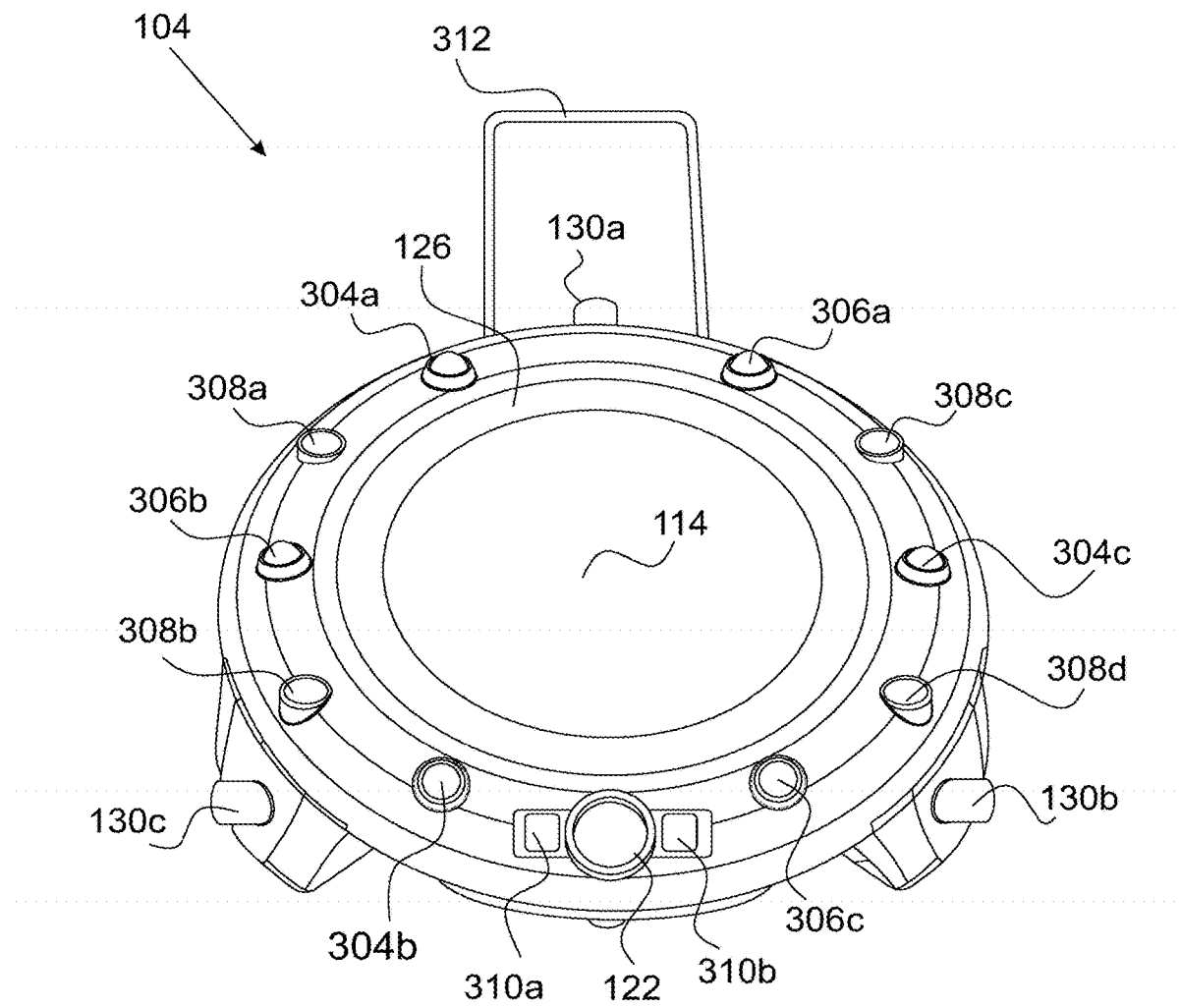
Figure 3L:
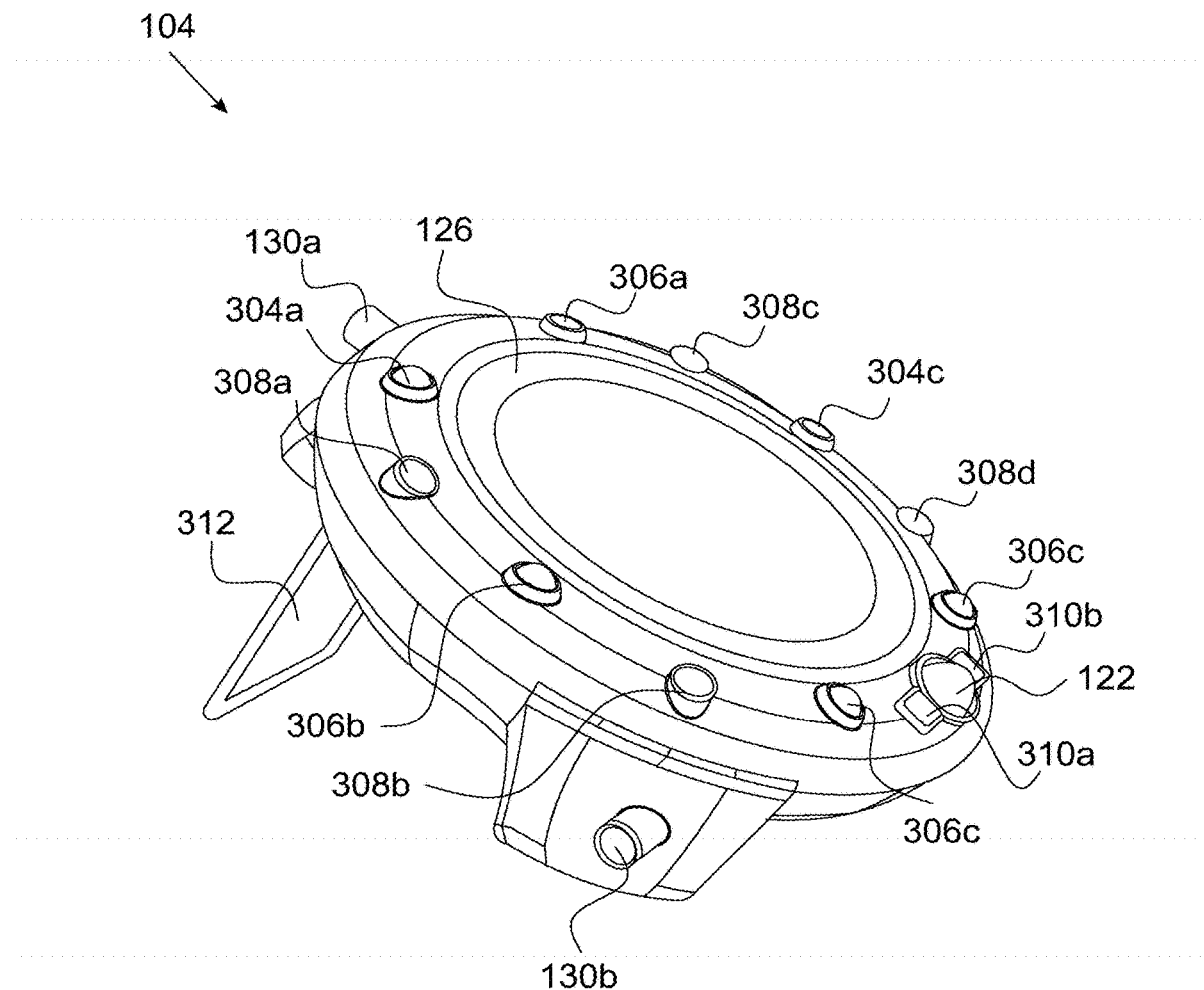
Figure 3M:
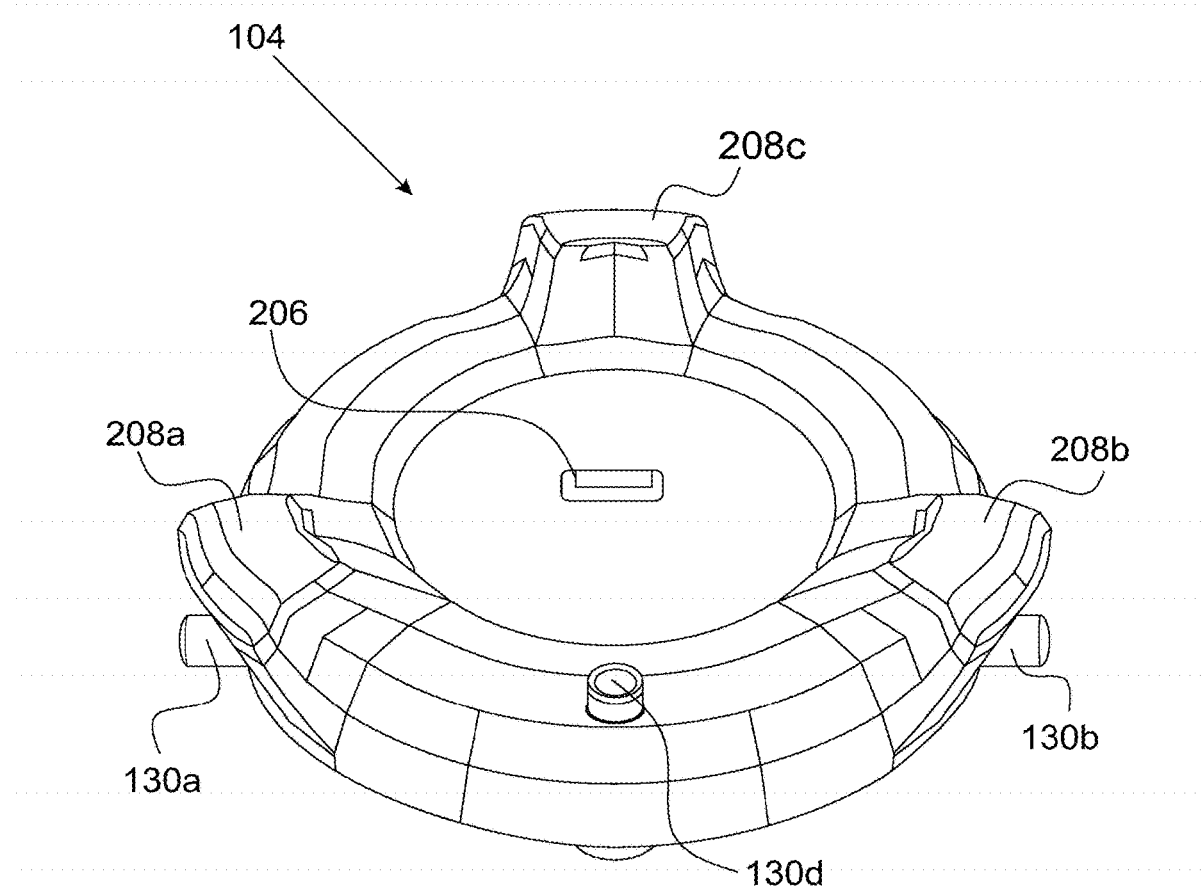
Figure 3N:
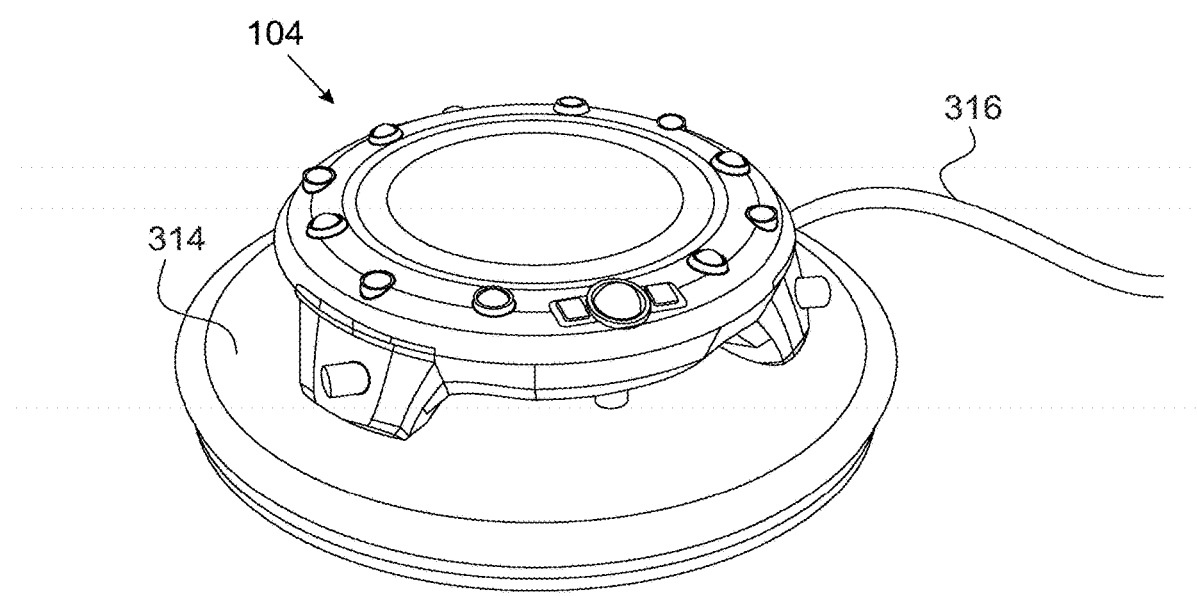
Figure 3O:
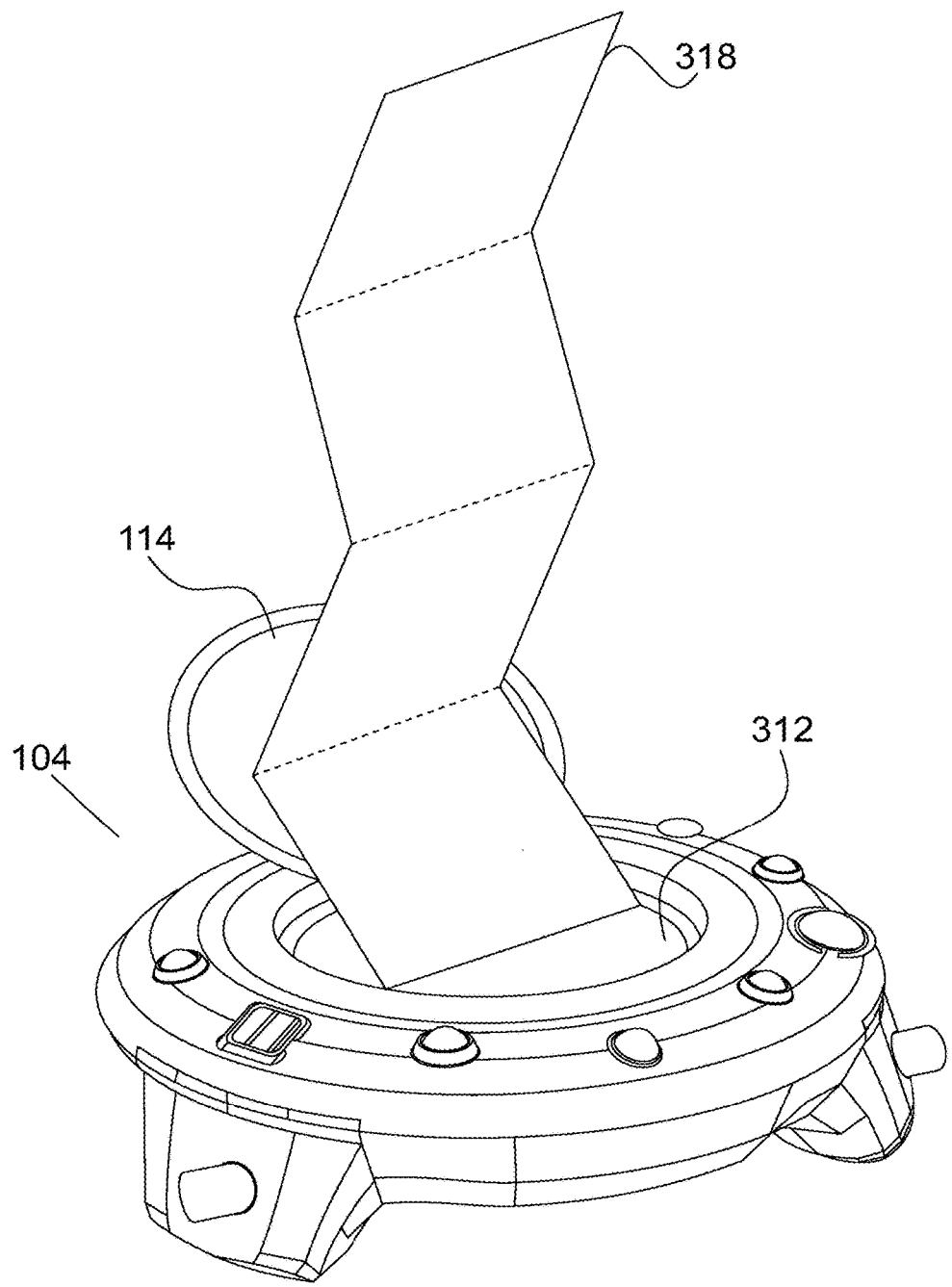
Figure 3P:
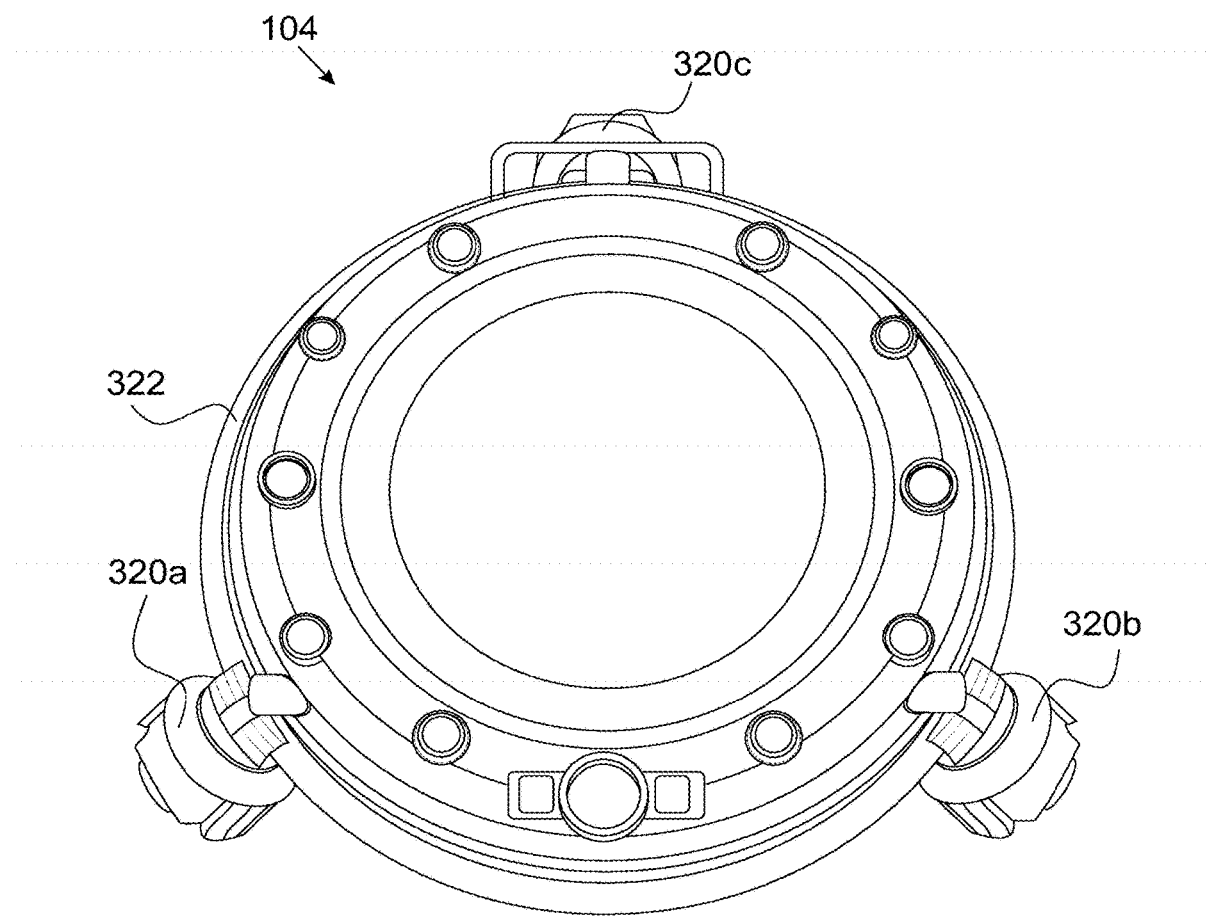
Figure 3Q:
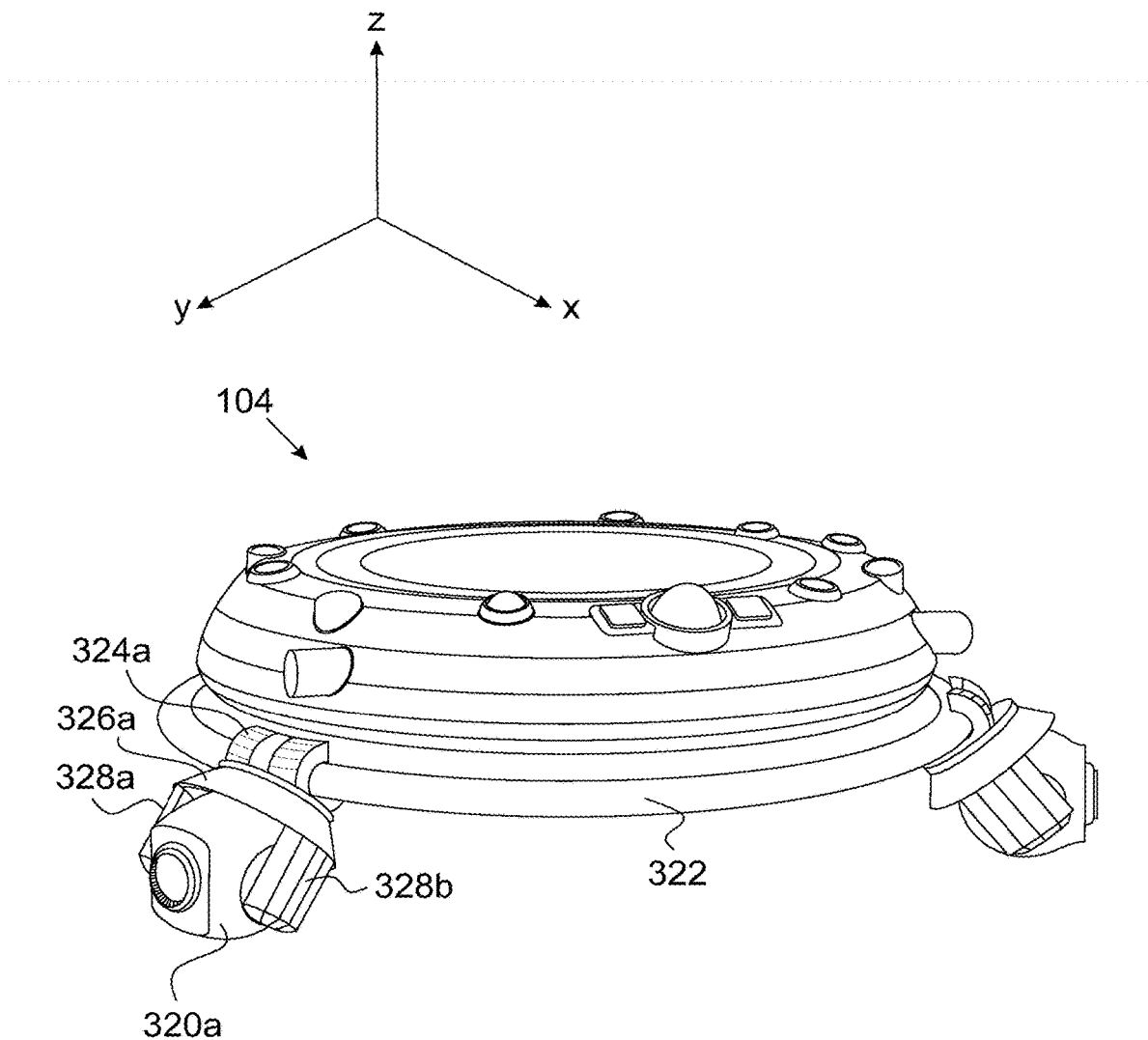
Figure 3R:
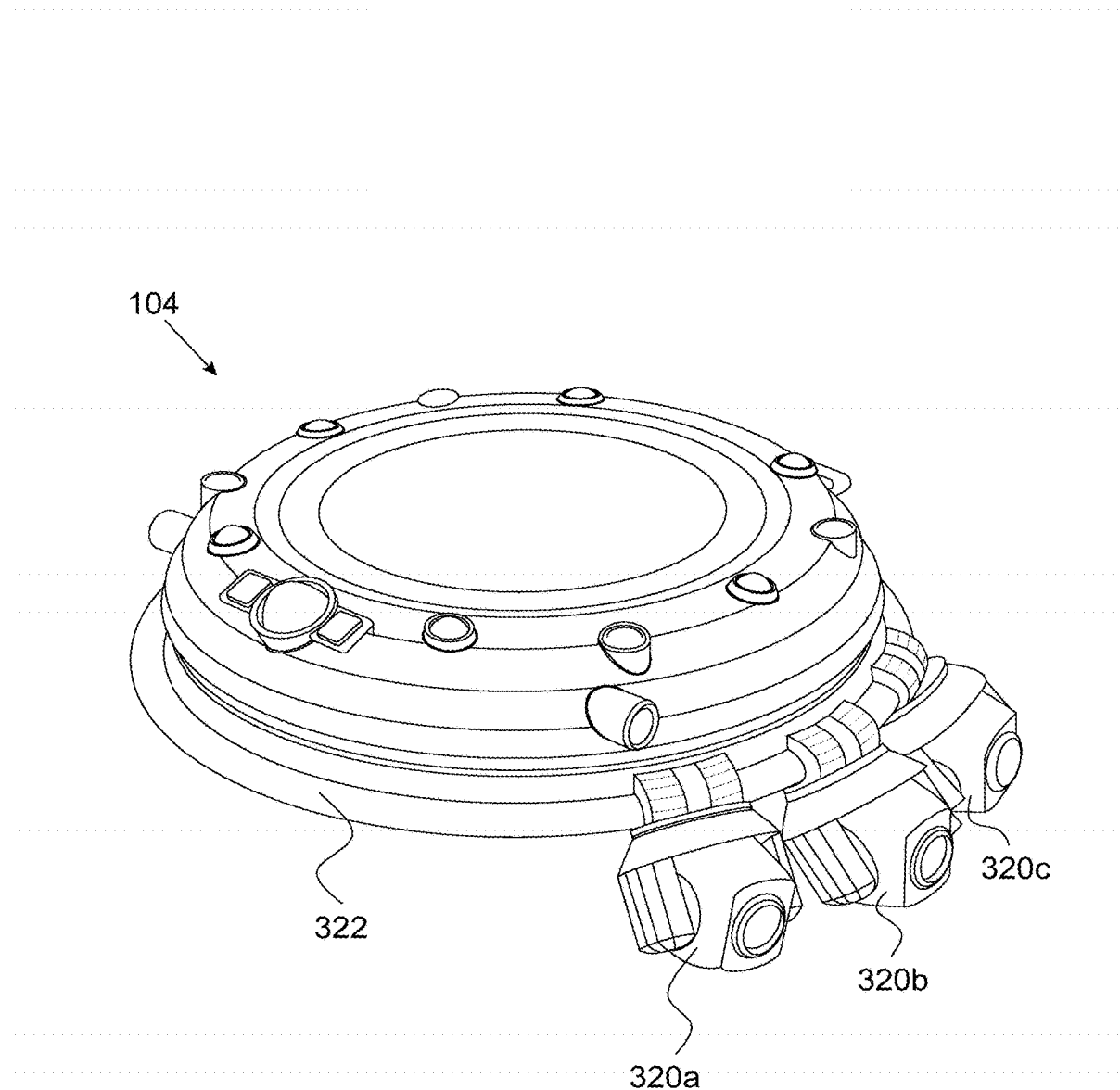

FIGS. 3A-3R depict a puck according to some embodiments of the disclosure.

FIGS. 3A and 3B illustrate a top view of a puck and FIG. 3C illustrates a perspective view of a puck. In the illustrated embodiments, a puck 104 includes a plurality of "rivets" 112a-112i. As discussed previously, rivets 112a-112i can include VR or AR specific processing elements such as cameras, light sources, photosensors, projectors, microphones or pick-ups for collecting ambient sound or user voice commands, and/or other I/O devices or sensors now known or hereafter to become known. An example arrangement of VR/AR processing elements in rivets 112a-112i is described more fully in connection with FIG. 3H.

FIGS. 3D-3G and 3I-3J illustrate a puck with a display removed. As illustrated in FIG. 3C, display 114 can be configured to be removed from puck 104 by a user. In one embodiment, display 114 can be connected to a hinge allowing display 114 to "flip" upward, away from puck 104. In alternative embodiments, display 114 can be connected to puck 104 via a ball and socket joint, that may be motor controlled. In alternative embodiments, display 114 can be configured to slide upward (away from puck 104) and outward (away from the center of puck 104). In some embodiments, display 114 can configured to be completely disconnected from puck 104. In this embodiment, display 114 can include a wireless network interface (e.g., a Bluetooth interface) to allow for communication between puck 104 and display 114 when disconnected.

In some embodiments, display 114 can comprise an OLED touchscreen display. In some embodiments, display 114 can be double-sided. That is, the display 114 can have two display surfaces on each side.

In one embodiment the OLED display 114 can be mounted on a mechanical motor driven assembly such that when the OLED display 114 is moved from a position flush with or parallel to the surface of the puck 104 to a position orthogonal or semi-orthogonal to the surface of the puck 104, the OLED display 114 can be driven to move around an axis orthogonal or angled to the surface of the puck 104. This permits the OLED display 114 to be moved in a manner similar to a radar dish. This allows the OLED display 114 to track the movement of the user so that the display face of the OLED display 114 will always be in a proper orientation with respect to the eyes of the observer. Thus, the OLED display 114 moves to follow the user in the proper orientation. As discussed herein, the headphone assembly contains, in various embodiments, position tracking components, whether in an inside-out, or outside-in configuration. This position data can be used to drive the OLED.

For example if the puck 104 is held in a user's hand or placed on a surface proximate the user, the projectors on the puck 104 and/or the cameras on the puck 104 or the other positon sensing components of the headphone assembly can be used alone or in concert to provide the fine positioning of the user relative to the OLED display. As the headphone assembly or connected or free-standing puck(s) determines the proper orientation of the user's face relative to the OLED display 114, that information can be fed wirelessly to a microcontroller in the puck 104 that is connected to a small micro-motor or step-motor that can control the OLED display 114 in response to the changes in orientation of the user relative to the surface position of the OLED display 114. In this way, the OLED display 114 can constantly track the user's movement and be rotated around an axis orthogonal or at an angle to the puck 104 to follow the user as the user moves relative to the puck 104, whether in a handheld position or whether the puck 104 is positioned on a surface proximate the user.

Upon movement or removal of display 114, cavity 302 can be exposed. In one embodiment, cavity 302 can include a keyboard or other input device. In some embodiments, cavity 302 can include an additional touchscreen display (e.g., an OLED touchscreen display). In some embodiments, cavity 302 can include a touch ball or trackpad. Additionally, as discussed previously, in embodiments puck 104 includes a circular or other shape touchscreen controller 126. Thus, in some embodiments, upon removal of display 114, puck 104 can include a touchscreen controller 126 to detect user finger movements to perform "scrubbing" operations and a trackpad or touch ball to perform other movement operations.

FIGS. 3H and 3K illustrate a puck including a retractable hook mechanism. FIGS. 3H and 3K additionally illustrate specific configurations of VR/AR devices.

As illustrated in FIG. 3H, a puck 104 can be equipped with a drone hook 312. In one embodiment, drone hook 312 can be configured to slide into and out of puck 104 in response to a force exerted inward on drone hook 312 to the center of puck 104 and outward on drone hook 312 from the center of puck 104, respectively. Drone hook 312 can be utilized to detach the puck 104 from a VR/AR device 100.

Additionally, as discussed previously, puck 104 includes a plurality of rivets or openings 304a-, 306a-c, and 308a-d. In one embodiment, rivets 304a-c can be configured to house a polarized light source, rivets 306a-c can be configured to house an unpolarized light source, and rivets 308a-d can be configured to house cross-polarized stereo camera pair modules and, optionally, depth sensors. In some embodiments, a cross-polarized stereo camera pair module can comprise multiple discrete cameras including a wide-angle fish-eye camera and adjacent cameras. In some embodiments, projection devices 130a-c can optionally include cross-polarized stereo camera pair modules and optional depth sensors.

FIGS. 3G-3H additionally illustrate an alternative input mechanism. As discussed previously, puck 104 can be equipped with a trackball or similar input device 122. In the illustrated embodiment, puck 104 can additionally be equipped with a back button 310a and forward (or next) button 310b. In some embodiments, these buttons 310a, 310b can comprise tactile push buttons. In some embodiments, buttons 310a, 310b can additionally include haptic rumble, pressure sensitivity, and/or modal click functionalities.

FIG. 3K illustrates puck 104 with a drone hook 312 in an extended position. As discussed previously, drone hook 312 can be extended outward from puck 104 manually or by a drone device (not illustrated). In the embodiment illustrated in FIG. 3K, drone hook 312 can comprise a flexible material to allow drone hook 312 to be manipulated by a drone device. In alternative embodiments, drone hook 312 can additionally comprise a hinge or similar apparatus at its base (closest to puck 104) in order to allow forward and backward angular movement of the drone hook while the puck 104 is attached to a VR/AR device.

FIG. 3L illustrates a puck 104 configured in a "desktop" mode. In this mode, drone hook 312 is rotated toward or away from the underside of puck 104. By rotating drone hook 312 into various positions, puck 104 can be placed on a flat surface laid flat or angled using the hook as a "kick-stand" with the puck utilized as a light field projector using projection devices 130a, 130b, and 130c (130c not visible as illustrated). As discussed previously, puck 104 can include at least three projectors spaced 120 degrees apart to provide a wide angle of projection. In this embodiment, projectors can be spaced according to the range of projection provided by each projector. In some embodiments, projection devices 130a-c can have an electronically controlled skew mechanism allowing for projection devices 130a, 130b, 130c to be reoriented as needed. In some embodiments, projection devices 130a-c can be utilized in augmented reality applications, or for video conferencing. For example, projection devices 130a-c can be used with a mapping application wherein a route is projected downward (e.g., onto a sidewalk) while a user is in motion.

FIG. 3M illustrates the inner side of puck 104. As discussed previously, the inner side of puck 104 can include a female USB-C® connector 206. Additionally, puck 104 can include an addition projection device 130d on the inner side of puck 104. Projection device 130d can be similar in design to projection devices 130a-c, previously discussed. By providing a project device 130d on the inner side of puck 104, puck 104 may be able to project a light field display both forward and backward when being carried by a drone device via drone hook 312. In some embodiments, projection device 130d can additionally include one or more cross polarized stereo camera pair modules to enable image capture during flight. In alternative embodiments, inner side of puck 104 can additionally include one or more light sources.

FIG. 3N illustrates a puck connected to a charging device. As illustrated, puck 104 can be recharged by placing puck 104 on charging device 314. In one embodiment, charging device 314 can comprise an inductive charging device (e.g., a Qi charging device) or other wireless coupled powering solution. In alternative embodiments, charging device 314 can include a male USB-C® connector that can connect to connector 206 on puck 204 to charge puck 104. Charging device 314 can be connected to an external power source (e.g., a power outlet or computing device) via cable 316. In the illustrated embodiment, puck 104 can be fully functional while charging on charging device 314. Thus, when placed on charging device 314, puck 104 can continue to perform VR/AR operations such as light stage capture, projection, etc.

FIG. 3O illustrates a puck including an expandable keyboard. As discussed previously, a user can lift display 114 to expose cavity 312. In the illustrated embodiment, upon exposing cavity 312 the user may be able to extend an accordion-style keyboard 318 from puck 102. In one embodiment, keyboard 318 can be communicatively coupled to puck 104 and allow for the input of keyboard signals to manipulate display 114. In the illustrated embodiment, keyboard 318 can be configured to be folded while display 114 covers cavity 312. Upon removing display 114, keyboard 318 can automatically expand, or can expand upon activation by the user.

FIGS. 3P through 3R illustrate depict a further embodiment of a puck including rotatable projectors according to some embodiments of the disclosure.

As illustrated in FIG. 3P, puck 104 includes projectors 320a-c. In one embodiment, projectors 320a-c can comprise swivelable or positionable pico or micro projector modules, pico projectors being small devices that can project images in the area surrounding the pico projector, generally laser based. Projectors 320a-c are connected to puck 104 via a circular, band 322 circling puck 104. Respective conductive elements in the band 322 mate with sliding respective contacts on the projectors to create an electrical path between the projector and puck for power and data transfer.

In one embodiment, band 322 includes multiple conductive traces circling the puck 104. In this embodiment, each projector 320a-c can include one or more conductive pads that align with a single conductive trace. In this manner, data can be transmitted from processing devices in puck 104 to individual pucks. In some embodiments, band 322 can include one or more conductive areas placed at pre-defined intervals around band 322. In this embodiment, projectors 320a-c are rotated around band 322 until a conductive area on the projector contacts the conductive area on the band 322. Upon such meeting, data can be transmitted to and from projectors 320a-c.

In some embodiments, puck 104 is configured to control the direction and projection of projectors 320a-c via the conductive band 322. Additionally, due to the conductive contact, projectors 320a-c can be moved along band 322 and, thus, can be placed at various points along band 322. In some embodiments, projectors 320a-c can be moved either manually or programmatically.

As illustrated in FIG. 3Q, a projector 602a is connected to band 322 via a C-shaped base connector 324a. As illustrated, base connector 324a allows for the movement of a projector 320a along the z-axis illustrated in the inset legend. Base connector 324a is connected to connector 326a. In this embodiment, connector 326a allows for the rotation of projector 320a about the x-axis illustrated in the inset legend. Side connectors 328a, 328b are connected to connector 326a and extend outwardly from puck 104. Side connectors 328a, 328b are connected to projector 320a via a rotatable joint. As illustrated, side connectors 328a, 328b allow for movement of projector 320a along the y-axis illustrated in the inset legend. In some embodiments, a small-cell battery can be placed behind projectors 320a-c in order to provide supplemental or sole power to the projectors 320a-c rather than taking power from the puck.

FIG. 3R illustrates a configuration of projectors according to some embodiments of the disclosure. As illustrated, projectors 320a-c can be rotated to a one portion of the band 322. For example, in FIG. 3R, projectors 320a-c are rotated towards the front of puck 104, the front comprising the portion facing forward and outward from the side of a user's face. In one embodiment, a VR/AR device 100 can be equipped with a simple curved reflective visor at the position of glasses or goggles 108. In this embodiment, the projection of a light field on the reflective visor results in a holographic display of the light field before a user without the need for active VR/AR glasses or goggles. In this embodiment, projectors 320a-c can thus be used to provide AR experiences without the need for an OLED display or projectors in the glasses or goggles.

Specific directions are not intended to be limited, and projectors 320a-c can be pointed in any direction to provide a full light field or reflectance field projection in a physical space. In some embodiments, projectors 320a-c can be pointed at a curved, reflective surface other than the goggles. In this embodiment, the projection of the light field using two pucks can provide a full light field projection by overlapping projections of projectors 320a-c.

Figure 3S:
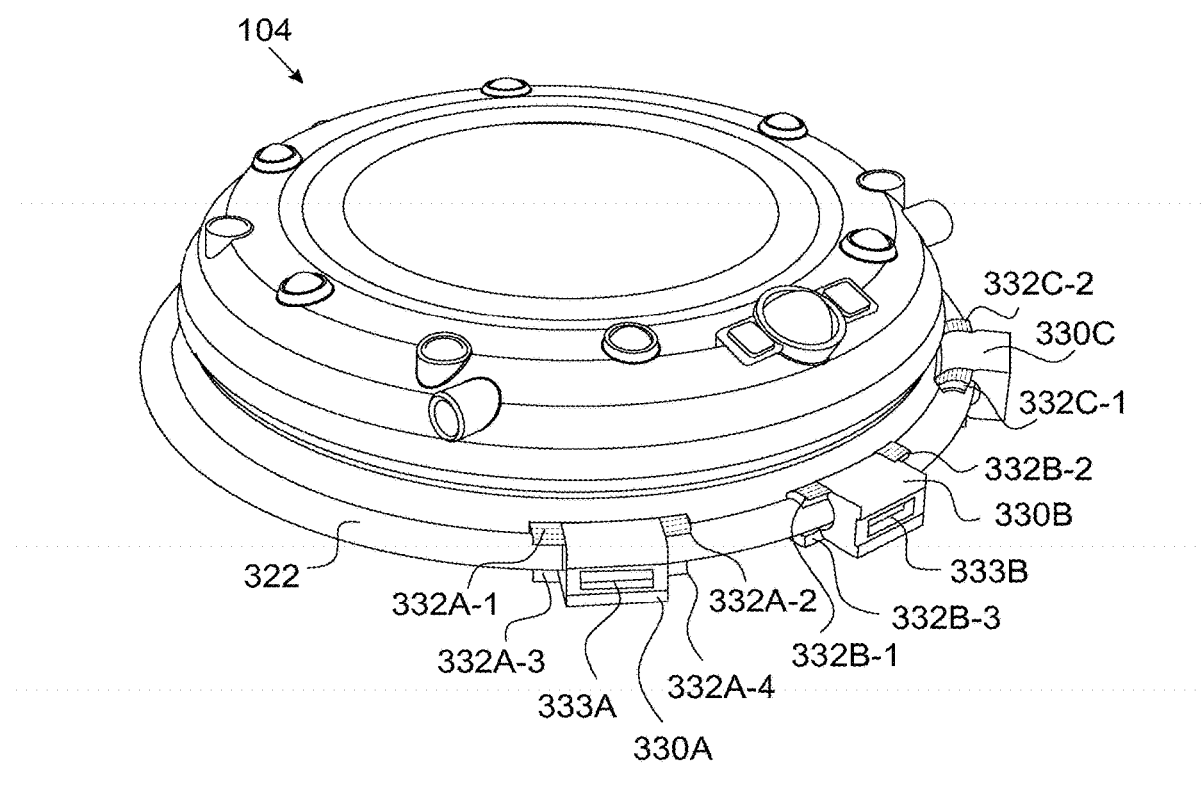
Figure 3T:
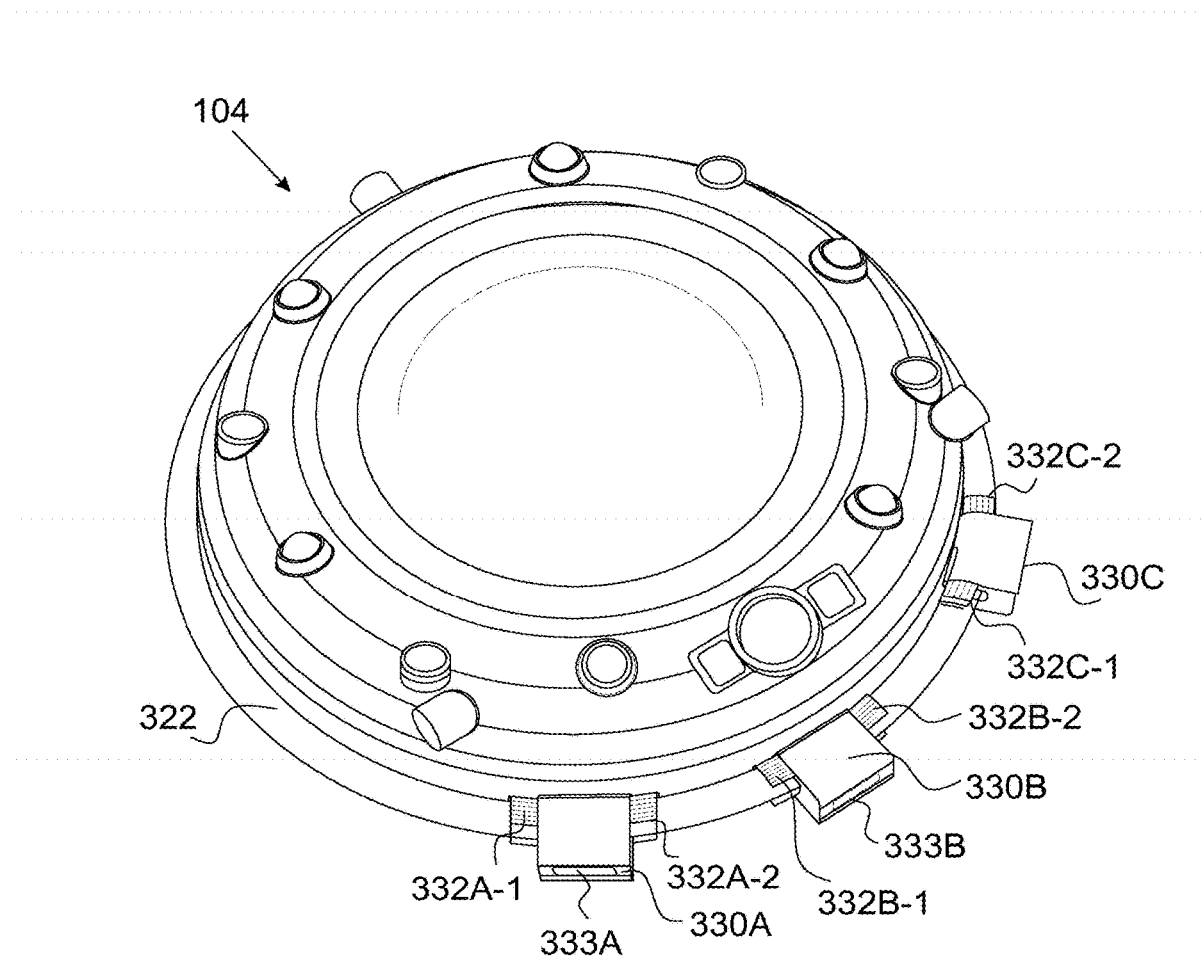
Figure 3U:
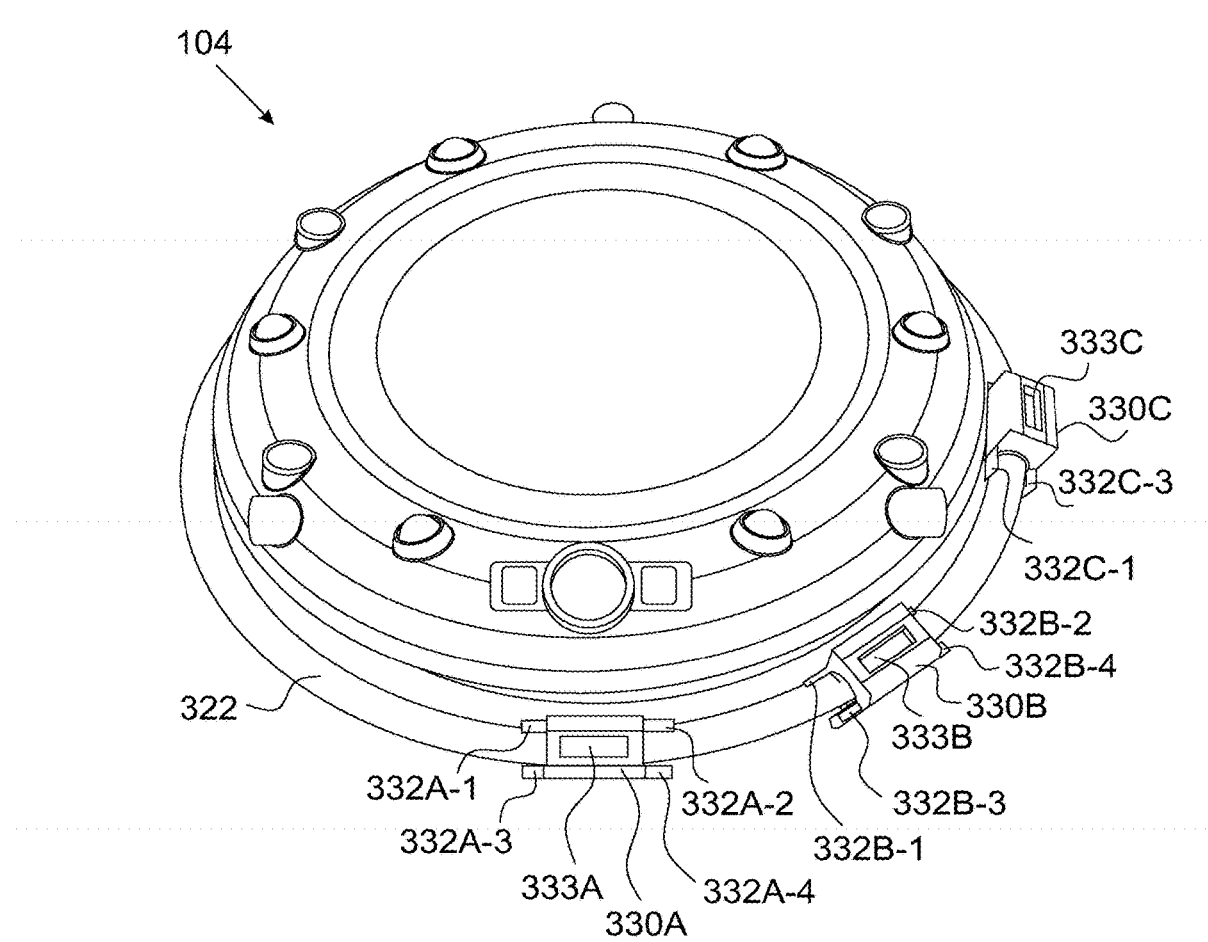

FIGS. 3S, 3T, and 3U illustrate alternative embodiments of a puck according to some embodiments of the disclosure.

In the illustrated embodiments, the puck 104 is equipped with multiple UBS-C® connectors 330A, 330B, 330C. Although three UBS-C® connectors are illustrated, the disclosed embodiments are not intended to be limited to only three connectors and more or fewer UBS-C® connectors may be used. While described primarily in the context of UBS-C® connectors, any other type of data connectors may be used such as, but not limited to, LIGHTNING® connectors, USB-A, UBS-C®, FIREWIRE®, or other connector types.

Each connector 330A, 330B, 330C comprises a housing that includes a receptacle 333A, 333B, 333C formed as part of the connector housing. In one embodiment, a receptacle includes one or more connection points (e.g., copper or similarly conductive connection points) for facilitating data transfer between the puck 104 and a peripheral. The number of connection points within a receptacle is dependent on the number of connection points required for the underlying protocol used by the connectors 330A-330C. For example, UBS-C® connector would include 10 connection points whereas a LIGHTNING® connection point would include eight connection points. In one embodiment, the housing of connectors 330A-330C may comprise a plastic-injection molded housing.

Each connector 330A-330C includes a set of four hinge elements (e.g., 332A-1, 332A-2, 332A-3, and 332A-4). Each of these hinge elements extends outwardly away from the housing. In the illustrated embodiment, the hinge elements are curved according to the circumference of the band 322. In the illustrated embodiment, the hinge elements may be formed as part of the housing (e.g., via injection molding or via attachment). Thus, the hinge elements and the housing can in some embodiments form a single contiguous element. In one alternate embodiment, the hinge elements are suitably flexible to allow the connectors 330A-330C to "snap" onto the band 332. In one embodiment, a user of the puck 104 snaps the connectors 330A-330C onto the band by situating the connectors 330A-330C against the band (with the hinge elements facing the band) and exerts an inward force to attach the connectors 330A-330C to the band 322. The coefficient of friction between connectors 330A-330C and band 332 may be designed such that each connector 330A-330C may be freely moved along band 332, thus allowing each connector 330A-330C to be positioned at any location around the band 332. Additionally, each connector 330A-330C may be rotatable toward the top side and bottom side of the puck 104. In one embodiment, the coefficient of friction may be designed such that the upward or downward rotation of the connectors 330A-330C causes the connectors 330A-330C to be fixed at an upward or downward angle.

In one embodiment, each connector 330A-330C includes a plurality of conductive pads positioned on the underside of the housing, that is, facing the band 322 when connected. Specifically, these conductive pads are positioned opposite the receptacles 333A-333C. As described above, the number of these conductive pads is dependent on the protocol used for the connectors 330A-330C. Similar to the embodiments discussed above, the band 322 includes a plurality of conductive traces equal to or greater than the number of connective pads on the connectors 330A-330C. Thus, when snapped onto the band 322, each connector 330A-330C is communicatively coupled to the puck 104 via the conductive traces on the band 322 and the conductive pads on the connectors 330A-330C. In one embodiment, the conductive pads may be aligned vertically to match the position of the traces. In other embodiments the conductive pads may be spaced both vertically and horizontally on the housing so long as a single conductive pad is in contact with a trace. For example, the conductive pads may be positioned along a diagonal line on the underside of the connectors 330A-330C.

In some embodiments, the conductive pads and traces may be greater than the number of connection points of the protocol used by the connectors 330A-330C. For example, one or more additional control traces and pads may be installed on the band 322 and connectors 330A-330C respectively. In one embodiment, these additional connection points may be used to control the location of a given connector 330A-330C. In one embodiment, the band 322 and connectors 330A-330C may additionally include a magnetized or detectable control path enabling the connectors 330A-330C to be repositioned programmatically. For example, movable magnets (e.g., micro-electrical mechanical motors attached with or without magnets, or a worm gear drive or screw/ gear or other linear actuator) may be configured to rotate around band 322 (e.g., via motor control or manually). In one embodiment, these magnets or position controllers may be situated on the top side of band 322. Each connector 330A-330C may additionally include magnetic or otherwise engageable portion on the top side of the housing that is in contact with the band 322. Upon moving the movable magnet or other actuator mechanism within or on the band 322, a respective connector 330A-330C moves in synchrony, thus allowing the connectors 330A-330C to be rotated around the band 322.

FIGS. 4A-4H depict a modular headphone-based VR/AR device with a detachable goggle portion according to some embodiments of the disclosure.

Figure 4A:
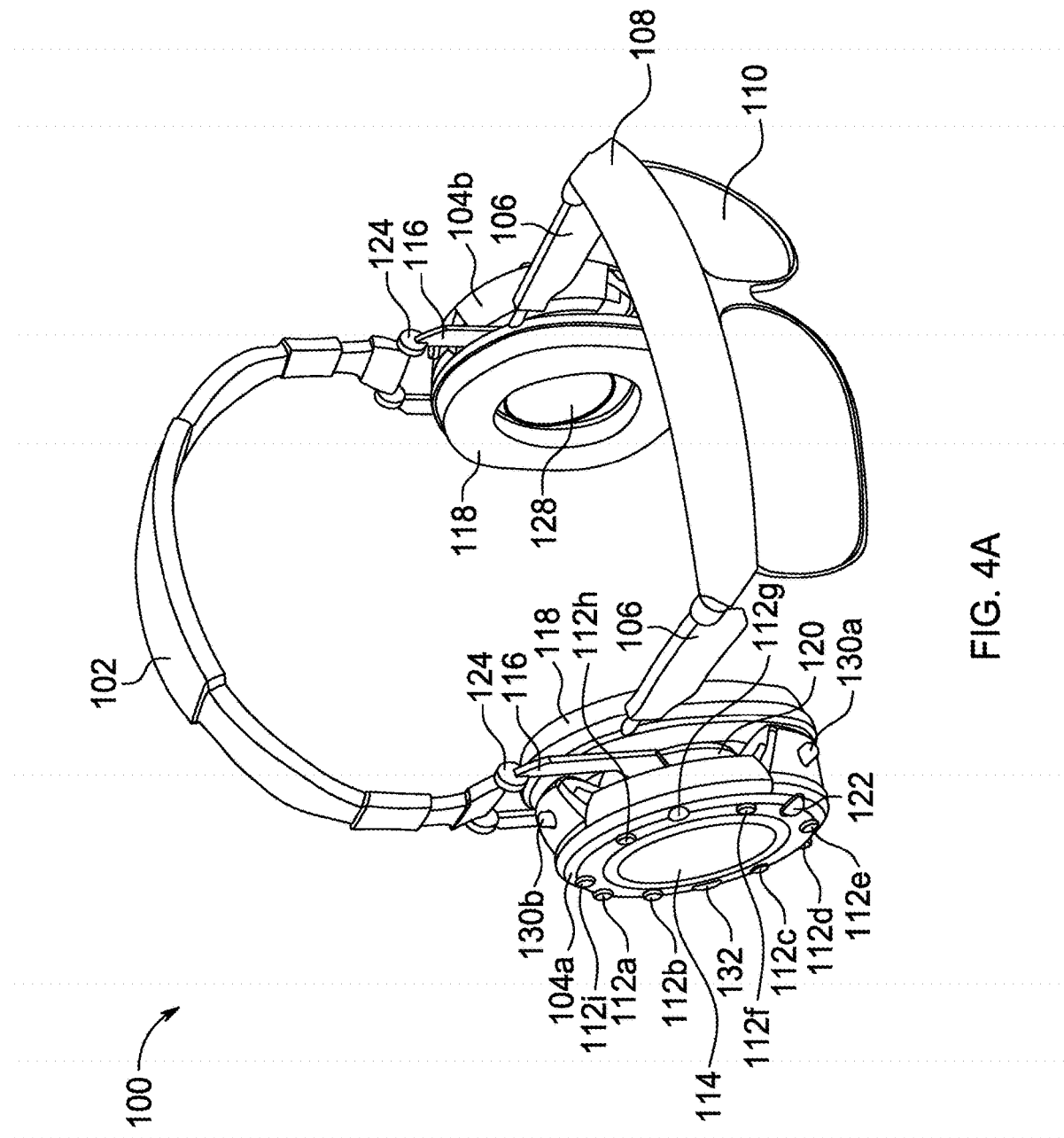
Figure 4B:
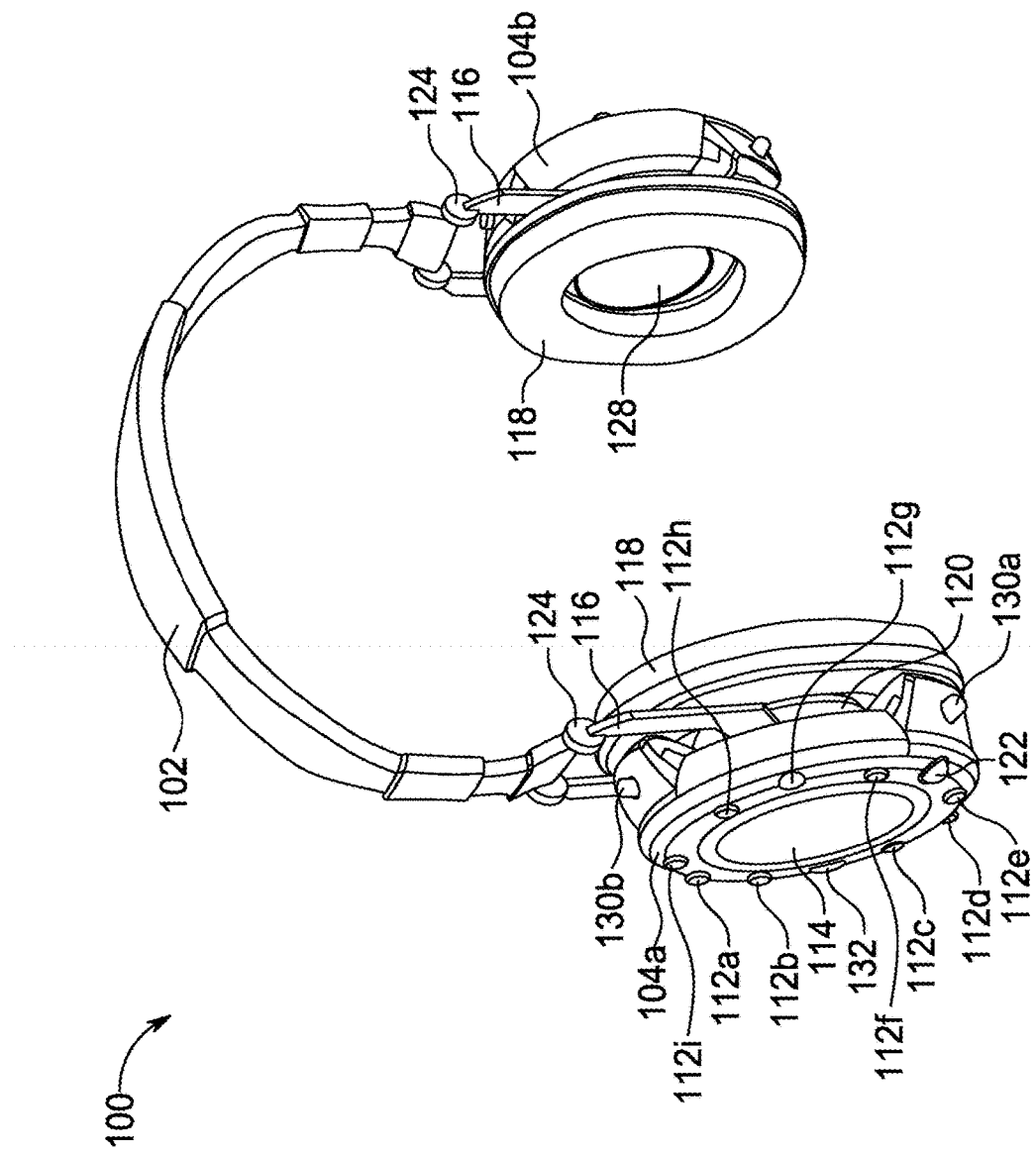
Figure 4C:
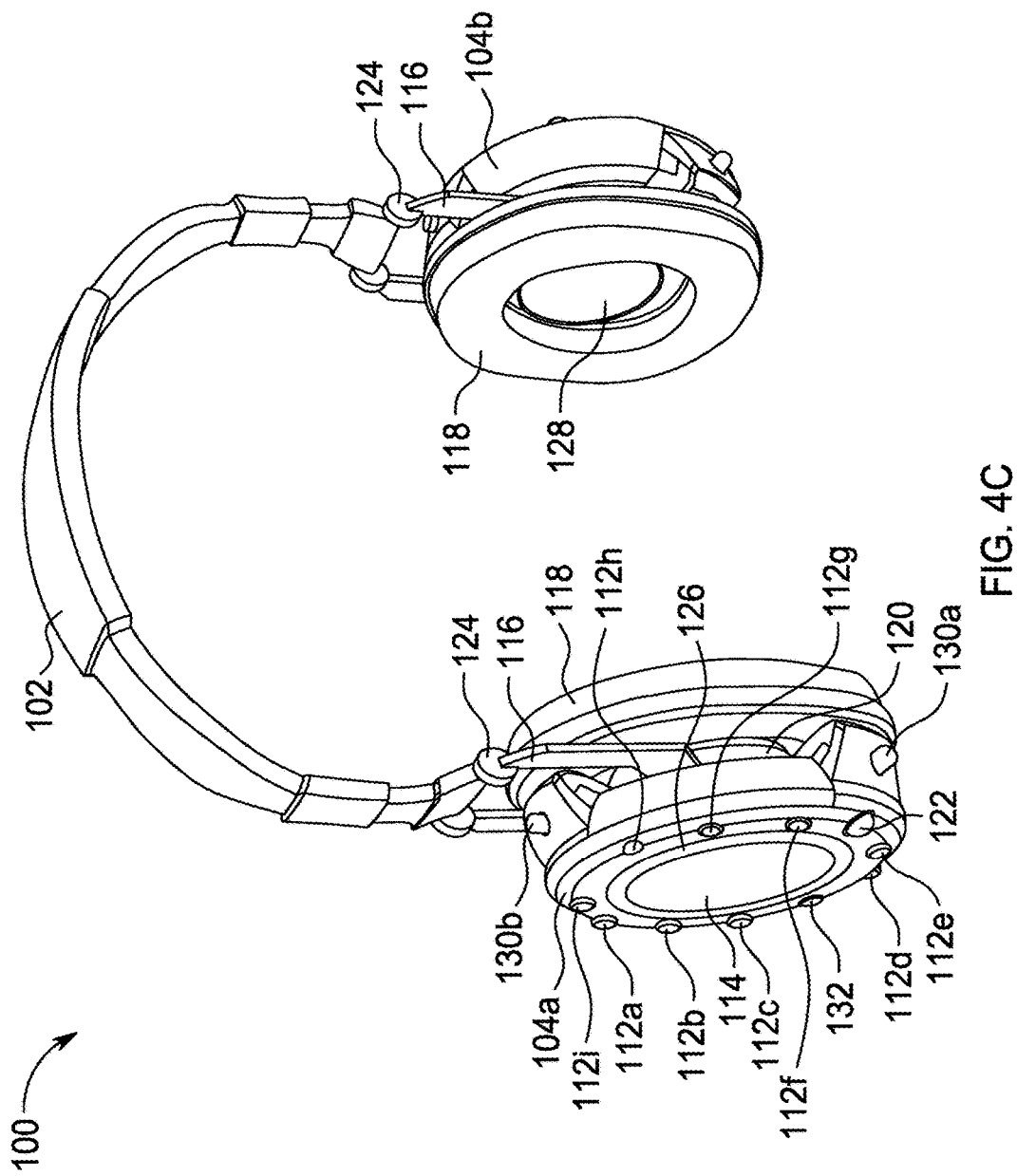
Figure 4E:
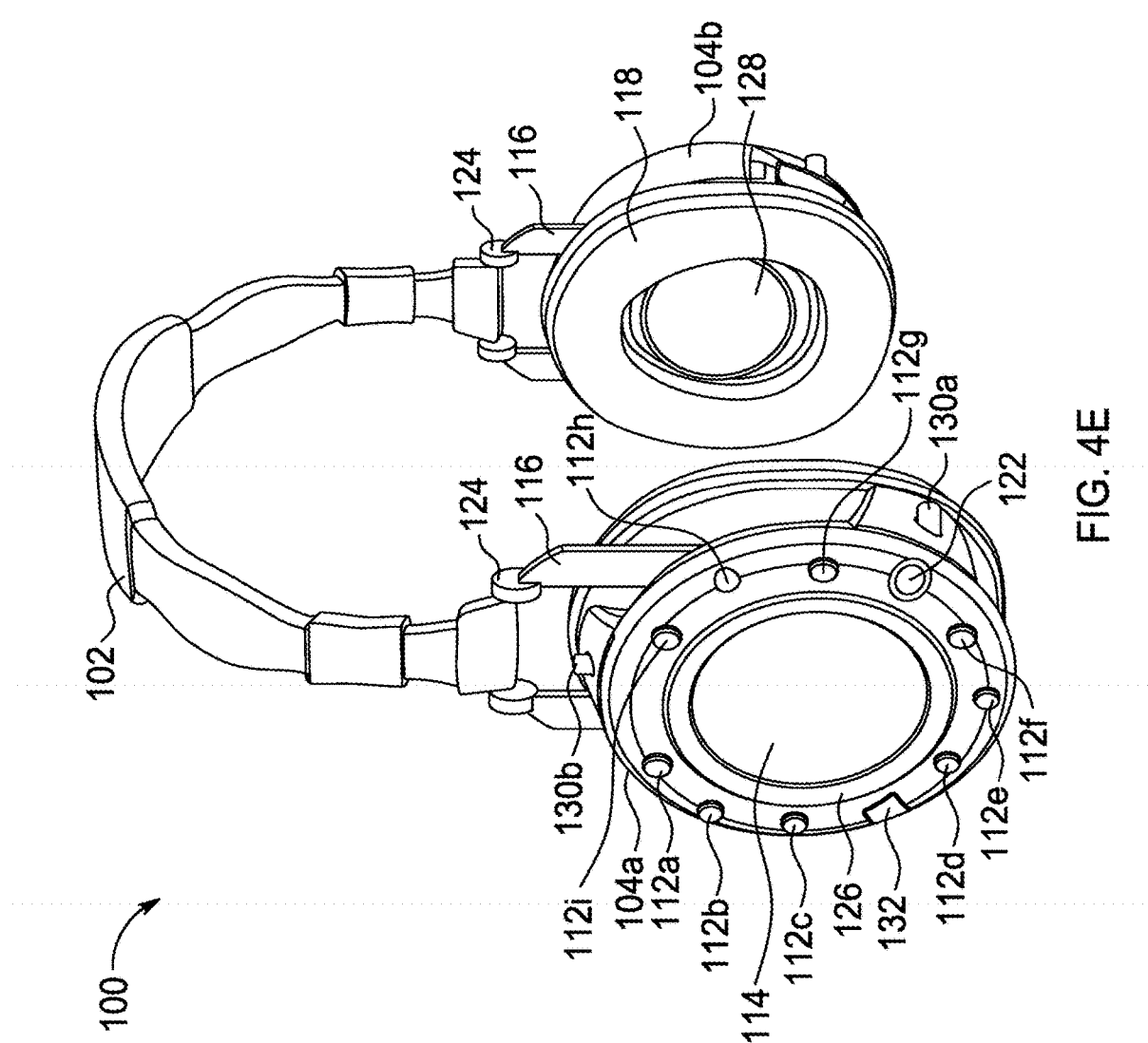

As illustrated in FIG. 4A, and discussed previously, goggle portion 110 can be fixedly connected to ear portion 120 via a detachable connector. Additionally, in some embodiments, the detachable connector can additionally include a USB-C® connection allowing for data communications between headband 102 and puck 104.

As illustrated in FIGS. 4B-4E, goggle portion 110 can be removed from ear piece portion 120. In this configuration, pucks 104a, b and headband 102 can continue to operate despite the removal of the goggle portion 110. In some embodiments, the device 100 can continue to provide functionality such as audio playback, light capture, and position or head tracking (light capture and position or head tracking are described more fully in connection with FIGS. 6A through 6C). In some embodiments, device 100 can be configured to transmit data regarding position or head movements to external devices while in a detached state. For example, device 100 can be configured to transmit position or head movements to a set top box while a user is watching television, or a detached puck or pucks can act as a set top box to control one or more video displays, or the puck itself can act as a set top box and via the pico projectors generate a video or VR/AR space within which the user wearing the puckless or single-pucked device 100 moves or interacts. By transmitting position or head movements, a device 100 can be configured to act as an input device for the set top box. In some embodiments, the set top box can be configured to receive position or head movements to monitor user interaction with the set top box.

Figure 4F:
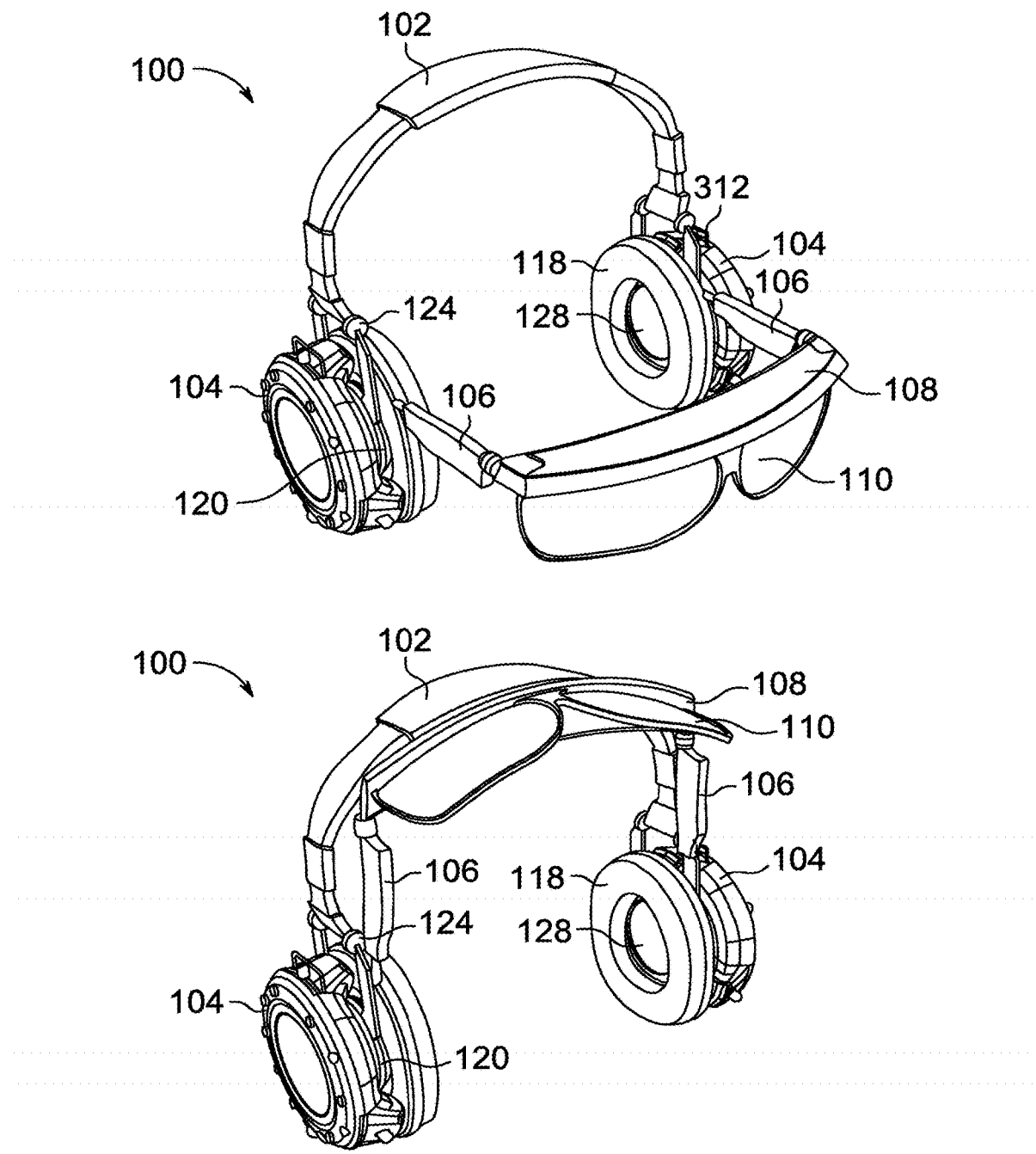

FIG. 4F illustrates a VR/AR device. As illustrated in FIG. 4F, goggle portion 110 can be connected to ear piece portion 120 via arm 106. In one embodiment, the connection between ear piece portion 120 and arm 106 can comprise a rotatable joint or circular hinge that allows goggle portion 110 to be rotated up toward headband 102.

FIG. 4G illustrates a VR/AR device including a drone hook. As illustrated in FIG. 4G, and discussed previously, drone hook 312 can be pulled upward, away from puck 104 to allow for removal by a drone (as discussed more fully in connection with FIG. 7) or used as a kick-stand.

Figure 4H:
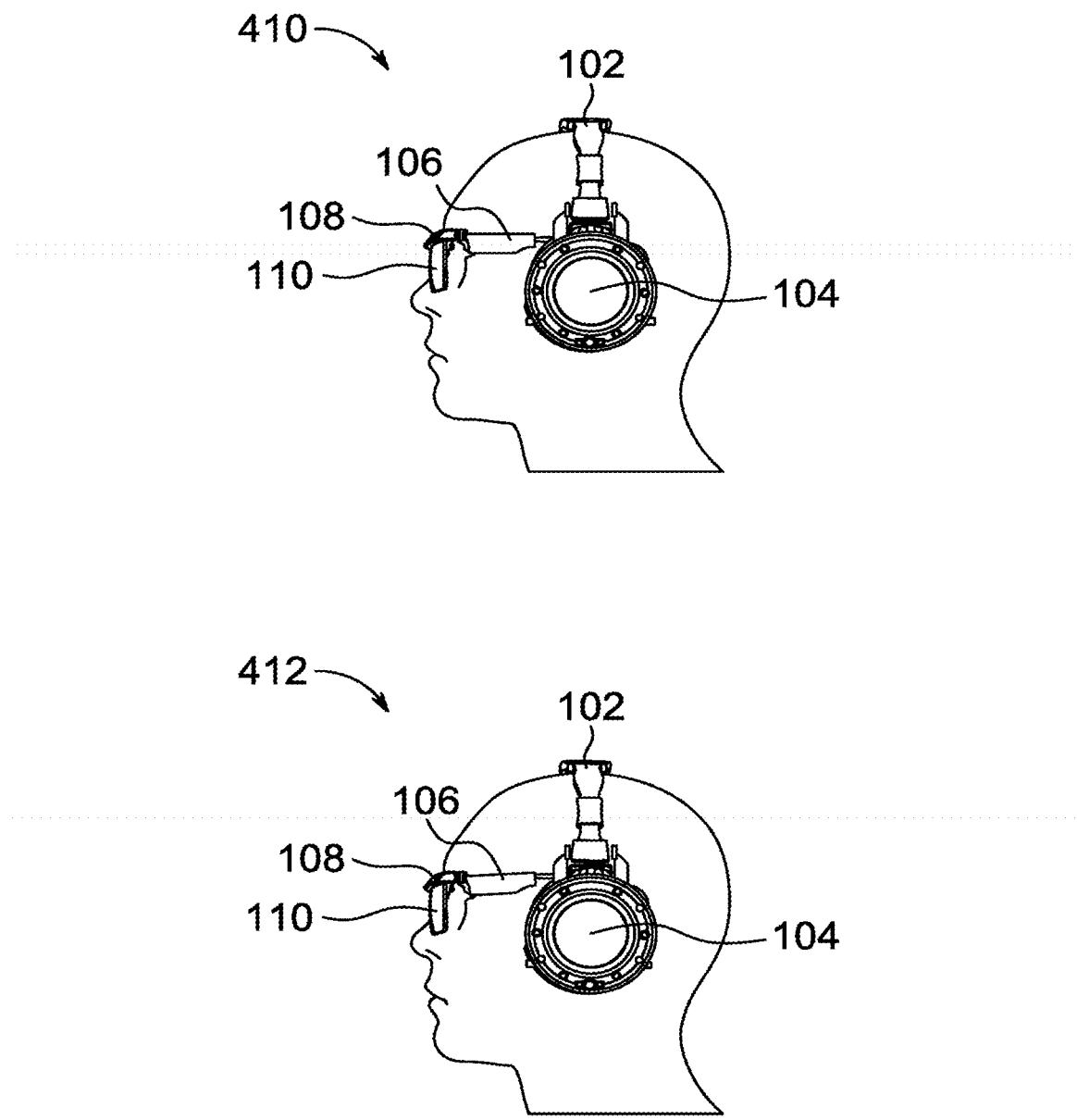

FIG. 4H illustrates an adjustment position for a goggle portion of a VR/AR device. As illustrated, in a first state 410 goggle portion 110 can be positioned at a first angle for viewing a VR/AR scene. In state 412, goggle portion 110 can be moved by moving arm 106. In some embodiments, a user can move goggle portion 110 toward or away from a user's eyes, or up or down relative to a user's eyes, to adjust the viewing angle of the VR/AR device while in use to suit a user's face shape, eye position, accommodate prescription glasses worn by a user, and other comfort based positioning. In some embodiments, arm 106 can be connected to ear piece portion 120 via a rotatable connector allowing for relative rotative movement of the goggle portion 110 as described above.

Figure 5:
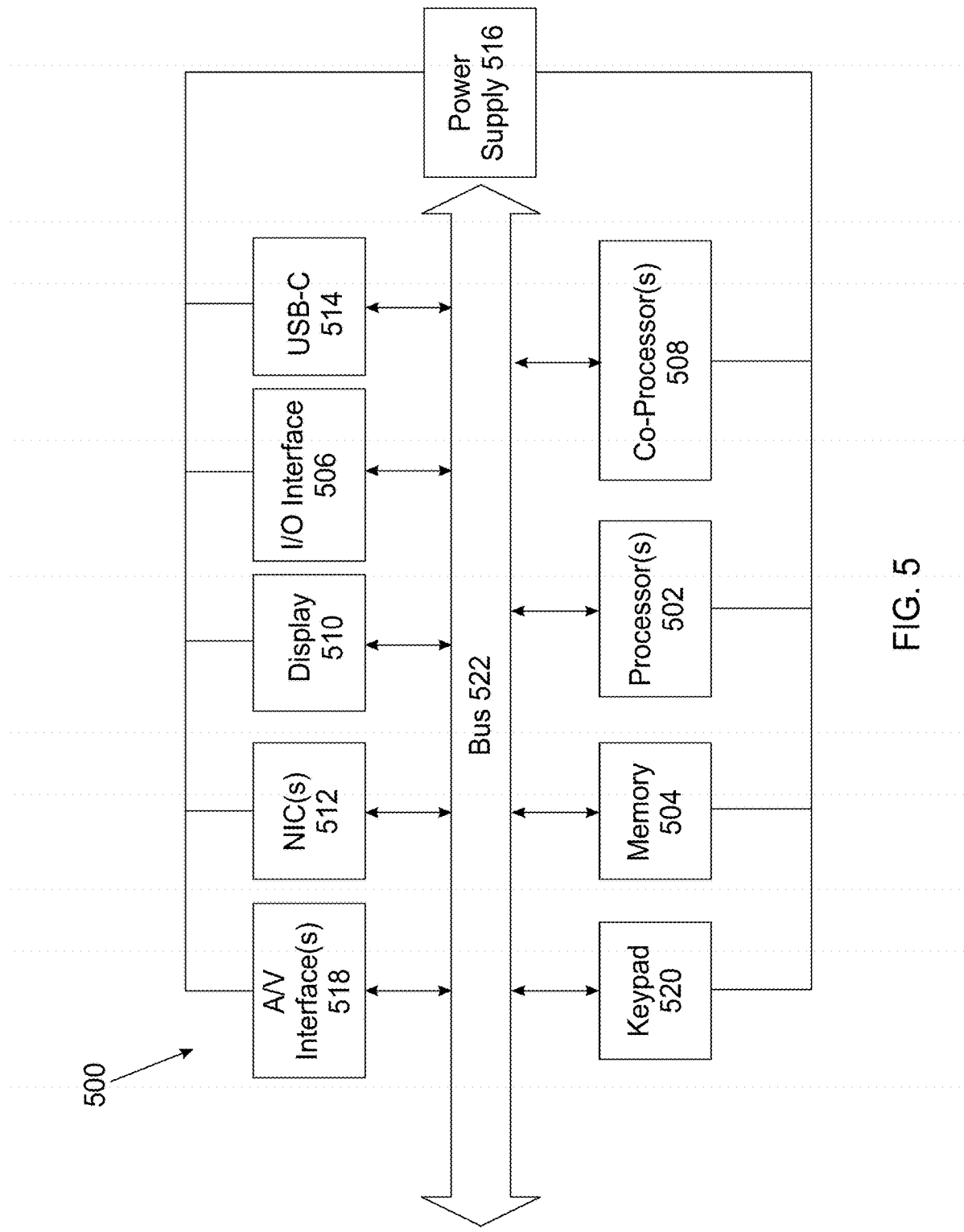
FIG. 5 is a block diagram illustrating a puck according to some embodiments of the disclosure.

FIG. 5 is a block diagram illustrating a puck or headband mounted accessory according to some embodiments of the disclosure.

As illustrated in FIG. 5, a puck 500 includes processor(s) 502, memory 504, input device(s) 506, co-processor(s) 508, a display 510, one or more network interface cards 512, USB-C® connector 514, power supply 516, audio interfaces 518, and keypad 522. Although illustrated as separate components, in some embodiments, some or all components of puck 500 can be implemented as a SoC design and thus can be tightly integrated.

In the illustrated embodiment, puck 500 includes one or more processors 502. In one embodiment, processors 502 can be utilized to control the operation of the puck 500 during contemplated operations. For example, processors 502 can be utilized to coordinate access to input/output devices and display devices, access to memory, and other general purpose functions. In one embodiment, processors 502 can be a fully realized mobile processor such as that sold as the Qualcomm 835 SNAPDRAGON®, or the NVIDIA TEGRA® X1 processors or similar processors. Such processors are known in the art to incorporate multiple functional components to: receive environment data (video, audio, position, motion, orientation and the like) from multiple sensor types; contain modems for facilitating the receiving and transmitting data to and from other devices using multiple communication protocols; process and render high speed graphics with graphic processing units (GPUs); perform digital signal processing using a digital signal processor (DSP); perform rapid image capture using an image sensor processor (ISP); drive multiple video devices with up to 4 k resolution; contain programmable microprocessor(s) and memory, all in a fan-less single chip structure. Thus a puck or headband mounted accessory utilizing this type of processor to integrate the multiple elements described herein can act as a full function mobile device or set top box or smart TV as well as a full function VR/AR device, yet be easily worn on a headphone assembly for exceptional comfort, wear-ability, ease of long use (due to comfort and/or battery life), and free interchangeability on the assembly 100 in a manner heretofore unrealizable in the absence of the flexible assembly structure and methodology disclosed herein. Moreover these processors are becoming ubiquitous in the market and the ease of connecting peripheral devices to interact with such processors is becoming accepted by persons of skill, who will readily recognize the benefits of the modular device concept introduced in this disclosure. In some embodiments, processors 502 can be implemented as an ASIC. In one embodiment, processors 502 can include one or more graphics processing units ("GPUs").

For example a user may start with a puck or pucks utilizing a lower cost lower function processor chip, and then upgrade to a puck containing a higher cost higher function processor, without having to abandon the headphone assembly 100, thus providing consumers a continuous pathway to higher functions in a modular manner without the risk of rapid obsolescence.

In some embodiments, processors 502 can be selected based on heating requirements of the puck 500. For example, processors 502 can be selected to obviate the use of a fan or mechanical cooling system.

Processors 502 can be utilized to manage communication along bus 522. Processors 502 can additionally be configured to control access to other devices on the bus 522 in response to requests received via USB-C® connector 514. As discussed herein, puck 500 can be connected via USB-C® connector 514 to other pucks via a bus. In this embodiment, processors 502 can receive requests for data and/or processing operations from other pucks and can coordinate external processing requests from other pucks. For example, another puck can transfer a process to puck 500 for processing. In response, processor 502 can accept or deny the external process and, if accepting, can schedule processing of the process. In some embodiments, scheduling an external process can comprise coordinating access to co-processors 508.

As discussed, puck 500 can include one or more co-processors 508. In one embodiment, puck 500 can be configured to perform specific VR or AR operations. In these embodiments, puck 500 can be equipped with specialized hardware to perform these operations. In some embodiments, co-processors can comprise an NVIDIA TEGRA® X1 processor, Qualcomm 835 SNAPDRAGON® processor, or a MICROSOFT® HPU. In some embodiments, co-processors 508 can be selected based on compatibility with the one or more processors 502, or can act fully as processor 502. In some embodiments, co-processors 508 can be implemented as a field-programmable gate array (FPGA).

As an example, puck 500 can include additional co-processors to perform position-based tracking and/or light field capturing. Examples of specific configurations of co-processors 508, and associated peripheral devices, are described more fully in connection with FIGS. 6A through 6C. Although illustrated as processor devices, processors or co-processors can comprise a SoC or FPGA device and can additionally include further input and/or output devices as described in connection with FIGS. 6A through 6C. In some embodiments, processors 502 and co-processors 508 can be combined into a single chip or SoC.

Power supply 516 provides power to the components of puck 500. A rechargeable battery can be used to provide power. In one embodiment, power supply can be recharged via a USB-C® input or via an inductive charging pad or other wireless charging methodology. In one embodiment, power supply 516 can be configured to be recharged using a drone-based recharging system as discussed more fully in connection with FIGS. 7-8B. In some embodiments, power supply 516 can comprise a battery significantly larger than existing VR or AR devices due to its placement on the side of the head or in the headband versus on the front of a VR or AR device as in current goggles and masks. In some embodiments, power supply 516 can be connected to an inductive power charging pad or device as described more fully herein.

Network interfaces 512 include circuitry for coupling puck 500 to one or more networks, and are constructed for use with one or more communication protocols and technologies. Network interfaces 512 are sometimes known as a transceivers or transceiving devices. In one embodiment, network interfaces 512 include Wi-Fi, Bluetooth, cellular, or NFC interfaces. In some embodiments, puck 500 can be configured to receive three-dimensional or augmented reality data streaming from a remote server for display using device 100.

Audio/video interfaces 518 are arranged to produce and receive audio signals and video signals. In one embodiment, audio/video interfaces 517 can receive audio data such as the sound of a human voice or audio associated with a VR or AR scene. For example, audio/video interfaces 518 can be coupled to a speaker and microphone to enable telecommunication with others and/or generate an audio acknowledgement or user voice commands to initiate some action. Alternatively, or in conjunction with the foregoing, audio/video interfaces 518 can receive video data for further processing. For example, puck 500 can be equipped with one or more cameras configured to record video and display video via display 510. Additional video interfaces (and supporting hardware) for capturing light field images are described more fully in connection with FIGS. 6A through 6C.

Display 510 can be a liquid crystal display (LCD), gas plasma, or OLED display, or any other type of display used with a computing device. Display 510 can also include a touch sensitive screen arranged to receive input from an object such as a stylus or a digit from a human hand. Display 510 can also be a pico projector as discussed herein.

Keypad 520 can comprise any input device arranged to receive input from a user. For example, keypad 520 can include a push button numeric dial, or a keyboard. Keypad 520 can also include command buttons that are associated with moving backward and forward through one or more user interfaces. In one embodiment, keypad 520 can comprise an expandable accordion keyboard that can be retractable from puck 500.

Puck 500 also comprises input/output interface 506 for communicating with external devices, or other input or devices not shown in FIG. 5. Input/output interfaces 506 can utilize one or more communication technologies, such as USB, infrared, Bluetooth, Wi-Fi or the like.

Memory 504 can include a RAM, a ROM, and other storage means. Memory 504 illustrates another example of computer storage media for storage of information such as computer readable instructions, data structures, program modules or other data. Memory 504 stores a basic input/output system ("BIOS") for controlling low-level operation of puck 500. The memory 504 can also store an operating system for controlling the operation of puck 500. It will be appreciated that this component can include a general purpose operating system such as a version of UNIX, or LINUX™, or a specialized client communication operating system such as WINDOWS CLIENT™, or the SYMBIAN® operating system. The operating system can include, or interface with a Java virtual machine module that enables control of hardware components and/or operating system operations via Java application programs.

Puck 500 additionally includes a USB-C® connection 514. As discussed previously, puck 500 can be connected to a headband or other apparatus via the USB-C® connection 514. Puck 500 can additionally be configured to transmit VR or AR data to an external display device (e.g., a set of VR goggles or pico projector(s) via USB-C® connection 514 or wirelessly. Additionally, USB-C® connection 514 can be used to charge the device.

Figure 6A:
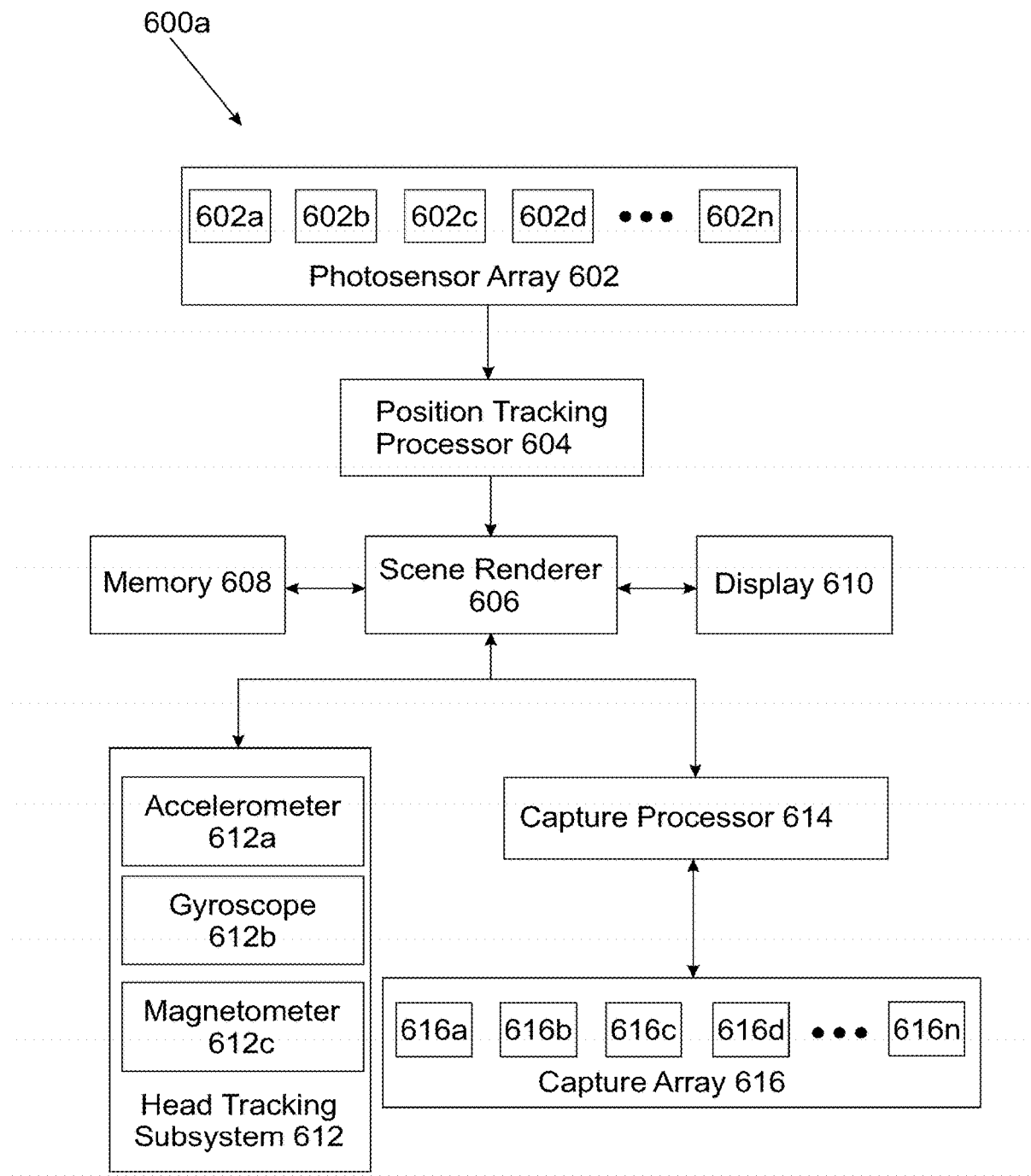
FIGS. 6A through 6C are block diagrams illustrating a puck according to some embodiments of the disclosure.

FIG. 6A is a block diagram illustrating internal components of a puck or headband mounted accessory according to some embodiments of the disclosure (which may also incorporate or be incorporated into components depicted in FIG. 5).

As discussed previously, pucks can be configured in a modular manner so as to provide different functionality or functionalities as needed by the VR/AR device. In the illustrated embodiment, puck 600a is configured to allow for both positional tracking of a VR/AR device as well as light capture. In alternative embodiments, puck 600a can include additional components to provide additional functionality as needed, including functionality as discussed previously.

In the illustrated embodiment, puck 600a can include a photosensor array 602 that includes a plurality of photosensors 602a-n. In the illustrated embodiment, photosensors 602a-n can be placed on the external surface of the puck 600a as illustrated, for example, in FIGS. 1A through 1D and 3A through 3R.

In the illustrated embodiment, photosensors 602a-n can be utilized with one or more "outside-in" positional tracking devices. In an outside-in positional tracking system, a user can utilize one or more positional tracking projectors which provide reference points that allow a device to determine the position of a user within a physical space. In one embodiment, a light-based positional projection device can be utilized to implement positional tracking as described herein.

In some embodiments, puck 600a can be configured as a LIGHTHOUSE™ tracking device utilized as part of a LIGHTHOUSE™ tracking system provided by Valve Corporation. In this embodiment, one or more LIGHTHOUSE™ reference points can be placed within a physical space and photosensors 602a-n can be configured to detect pulses of light and laser sweeps throughout the physical space to detect the position of the puck. In alternative embodiments, puck 600*a* may not utilize outside-in tracking. In these embodiments, photosensor array 602 can be omitted from puck 600*a* and rivets associated with the photosensor array can likewise be omitted.

In the illustrated embodiment, photosensors 602*a-n* can be configured to detect light emitted from a positional projection device (not illustrated) at periodic intervals. In one embodiment, a positional projection device can comprise a light emitting device that periodically outputs light from one or more light sources and "fills" a physical space with light at regular, defined intervals.

In the illustrated embodiment, puck 600*a* can store an identifier for each photosensor 602*a-n* representing its location on the exterior of puck 600*a*. Upon detecting a light source, the photosensors 602*a-n* transmit signals to position tracking processor 604 indicating that a light source was detected by one or more of the photosensors 602*a-n*. Position tracking processor 604 can initiate a timer and record and process the timing of received signals from photosensors 602*a-n* and thus be capable of determining a user's position relative to the positional projection device(s).

Position tracking processor 604 can transmit the detected position of the puck (and thus, user) to scene renderer 606. As illustrated in FIG. 6A, scene renderer 606 can comprise one or more processors configured to retrieve scene data from memory 608. For example, memory 608 can include one or more three-dimensional scenes to be displayed on device 610 (or projected using the pico projectors). In some embodiments, individual scenes may be linked together to form a "map" of a physical space. By receiving a user's position, scene renderer 606 can identify a virtual representation of a scene to be rendered based on the scene data stored in memory 608. In some embodiments, scene renderer 606 can include one or more modules to provide the geometry which the scene renderer 606 combines with the animation, textures and the like to output a rendered scene comprising the virtual representation. In the case of a light-field or reflectance field, the scene renderer 606 uses the aforementioned data to appropriately update the display. In some embodiments, scene renderer 606 can comprise or utilize one or more NVIDIA TEGRA® X1 processors, Qualcomm SNAPDRAGON® processors, or a Microsoft Holographic Processing Unit (HPU) processor(s). Additionally, in some embodiments scene renderer 606 can comprise a SoC containing components to carry out the functions described herein.

In addition to receiving a user's position from position tracking processor 604, scene renderer 606 can receive head position information from head tracking subsystem 612. In one embodiment, head tracking subsystem 612 includes an accelerometer 612*a*, gyroscope 612*b*, magnetometer 612*c*. In the illustrated embodiment, the head tracking subsystem 612 transmits head tracking data associated with the user's head (as measured by accelerometer 612*a*, gyroscope 612*b*, magnetometer 612*c*) to scene renderer 606. In response, scene renderer 606 adjusts a rendering of the virtual representation based on the head tracking data. In some embodiments, position tracking processor 604 can comprise one or more NVIDIA TEGRA® X1 processors or Qualcomm SNAPDRAGON® processors. Additionally, in some embodiments, scene renderer 606 can comprise a SoC. In some embodiments, position tracking processor 604 and scene renderer 606 can be combined in a single SoC chip design. Alternatively, position tracking processor 604 and scene renderer 606 can be implemented as a single processor.

Additionally, as illustrated in FIG. 6A, puck 600*a* can include a light field capturing array 616 including capture devices 616*a-n*. In one embodiment, a capture device can comprise a light source and camera device situated at positions on the exterior of puck 600*a*. Alternatively, capture array 616 can include separate light sources and cameras as capture devices 616*a-n*. In some embodiments, capture array 616 can only include light sources or cameras, as discussed previously.

In the illustrated embodiment, light field capturing array 616 can be configured to capture multiple images of a three-dimensional space under differing lighting conditions. In some embodiments, the images can comprise static photographs or video. In some embodiments, the camera devices can be fitted with wide angle lenses or fisheye lenses. In some embodiments, the cameras can be placed within recesses or spaces formed on the exterior of puck 600*a*.

In some embodiments, the camera devices can comprise light field cameras or plenoptic cameras. A light-field camera aims to measure the intensity and direction of every incoming ray instead of merely recording the sum of all the light rays falling on each photosite at a sensor. With such information every possible image of whatever is within the field of view of the camera at the moment of image capture can be generated. A single capture from a light-field camera can provide digital data such that focus, exposure and even depth of field are adjustable after the image is captured.

Capture devices 616*a-n*, under the control of capture processor 614, can be configured to capture a plurality of images of a three-dimensional space and transmit the captured images to capture processor 614. In some embodiments, each camera can be capable of being adjusted (e.g., focus, angle, etc.) by capture processor 614. In some embodiments, capture processor 614 can receive adjustment commands from a user via an input device.

In one embodiment, the field of view of the cameras is very wide relative to the spacing of the horizontal and vertical viewpoints, such that most of one image captured by one of the cameras covers the same scene content as the ones captured by the adjacent cameras, though from a slightly different viewpoint. The images thus obtained from the cameras in the light field capturing array 616 do not have to be stitched into a single panorama, but rather can be stored in a database as a two-dimensional array of two-dimensional images, forming a four-dimensional light field dataset.

During operation, each of the cameras in capture devices 616*a-n* can be activated by the capture processor 614 and are activated simultaneously to collect image data. In one embodiment, a puck 600*a* can be placed on both sides of a user's head as illustrated in FIGS. 1A-1D. In this embodiment, a near-360 degree view of a scene can be recorded.

In addition to camera devices, capture devices 616*a-n* include light sources. In one embodiment, capture processor 614 can be configured to activate the light sources in conjunction with camera devices in order to illuminate a subject or space with a sequence of time-multiplexed lighting configurations. In one embodiment, the capture processor 614 can be configured to adjust the direction of the light sources in order to focus the light on the subject or space being imaged at a particular time and at a specific angle or at a specific polarization.

In one embodiment, a light source can comprise a light-emitting diode ("LED"). In some embodiments, alternative light sources can be used in place of LED devices. Alternatively, or in conjunction with the foregoing, the light sources used as part of capture devices 616a-n can comprise polarized light sources.

In alternative embodiments, puck 600a can additionally utilize cameras in the capture array 616 to measure the depth of an area. In this embodiment, some or all of the cameras in capture array 616 can comprise depth cameras. In this embodiment, depth cameras can be utilized in place of, or in conjunction with, photosensors 602a-n to calculate a user's position and changes in positions in a physical space in an "inside-out" manner.

Although discussed as a single puck above, a VR/AR device can be configured with multiple pucks and/or headband mounted accessories as discussed previously. For example, a VR/AR device can include two pucks including the components discussed in connection with puck 600a. In this embodiment, the two pucks can be communicatively coupled to each other via a bus spanning a headband, as illustrated in FIGS. 1A-1D, or via a wireless connection. In this arrangement, each puck would be connected via a USB-C® (or wireless) connection spanning the headband and may work cooperatively with each other and/or with a similarly configured headband mounted accessory to perform the operations discussed in connection with puck 600a. For example, both pucks and/or headband unit can be configured with a capture array and a position tracking processor. In this arrangement, the position tracking processor of each puck can coordinate the position tracking operations discussed above. For example, the position tracking processors in each can transfer data between the pucks and/or headband unit to distribute processing loads. Alternatively, or in conjunction with the foregoing, each puck can be equipped with a capture array and a capture processor and can distribute processing loads evenly between the pucks. Such transfers are beneficial in the event that one puck detects a minimal workload due to the positioning of the puck. In alternative embodiments, a first puck can be configured only to perform position tracking operations while the other puck can be configured to perform light capture operations.

As discussed previously, puck 600a (or headband accessory) can include one or more batteries. As puck 600a includes one or more batteries, the aforementioned operations may be performed by puck 600a even while puck 600a is detached from a headband as illustrated in FIGS. 1A-D. For example, a user may detach puck 600a from a headband and utilize the puck as a light capture apparatus to capture a three-dimensional scene including a user wearing a VR/AR device. In this embodiment, puck 600a can further include one or more network interface for transmitting a three-dimensional scene to additional users.

In some embodiments, position tracking processor 604 and capture processor 614 can be implemented in an FPGA. In this embodiment, scene renderer 606 can be implemented via a multi-purpose processor (like an SoC) or GPU or general purpose processor. In some embodiments, scene renderer 606, head tracking subsystem 612, and memory 608 may all be implemented in a multi-purpose purpose processor or SoC. The aforementioned embodiments are discussed more fully in connection with FIGS. 6B and 6C.

Figure 6B:
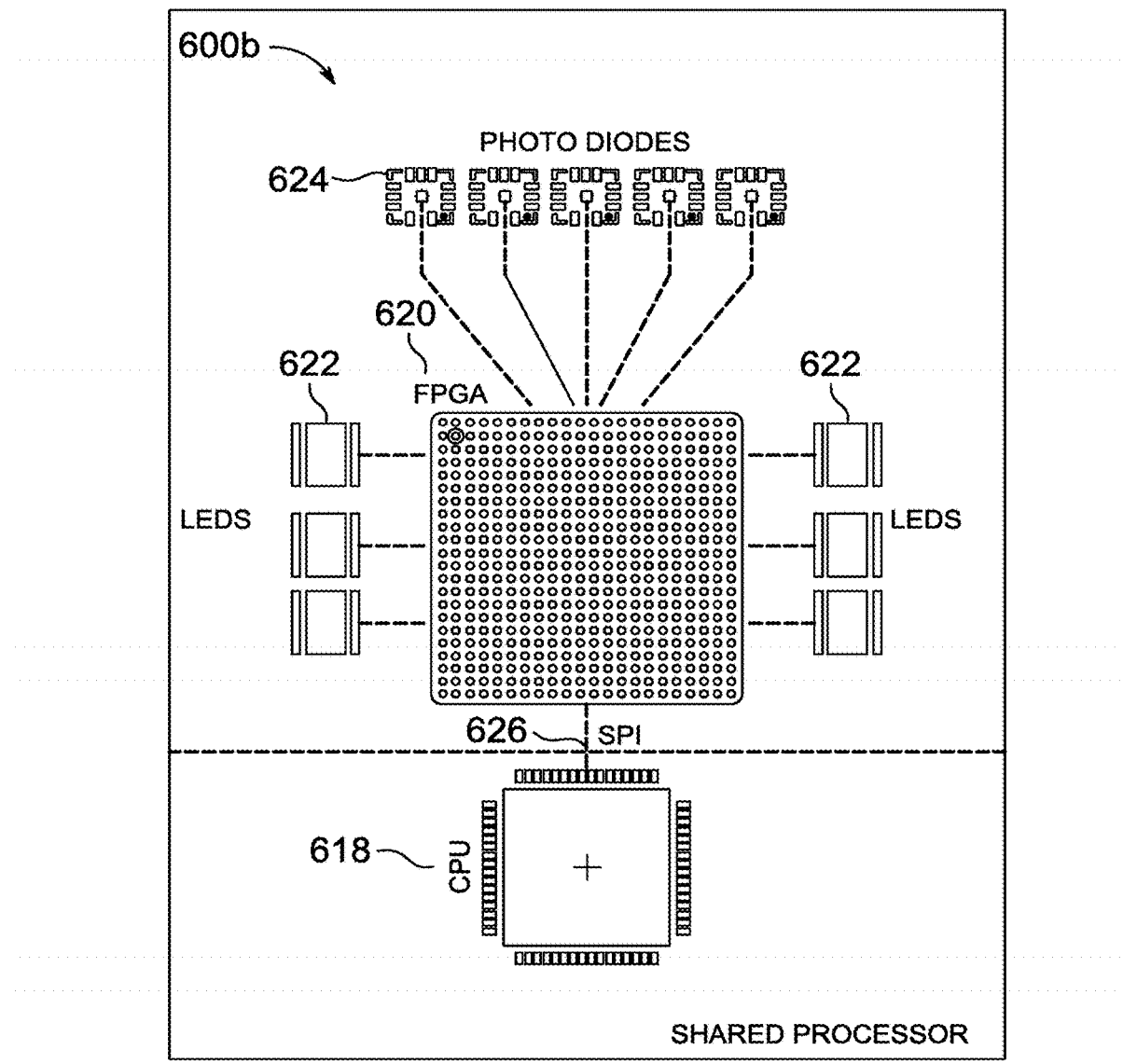

FIG. 6B is a circuit diagram illustrating internal components of a puck or headband mounted accessory according to some embodiments of the disclosure (which may also incorporate or be incorporated into components depicted in FIG. 5).

FIG. 6B illustrates a distributed architecture for providing the functionality of a puck. As illustrated, the architecture 600b is divided into a shared processor section that includes a CPU 618 and an FPGA-based section that includes one or more FPGAs 620, LEDs 622, and photodiodes 624.

As illustrated in FIG. 6B, the FPGA 620 is utilized to drive the photodiodes 624 and LEDs 622. In one embodiment, FPGA 620 is utilized to control the operation photodiodes 624 and LEDs 622 as well as receive and route data from photodiodes 624 and LEDs 622 to CPU 618.

CPU 618 can comprise a multi-purpose processor such as a Qualcomm 835 SNAPDRAGON® or NVIDIA TEGRA® X1 processor, sometimes referred to as systems on a chip (SoCs). CPU 618 communicates with FPGA 620 via shared processor interface ("SPI") 628. In one embodiment, SPI 628 comprises a USB-C® interface. In one embodiment, the shared processor section is located in a removable housing and can be connected and disconnected from the FPGA-based section.

Figure 6C:
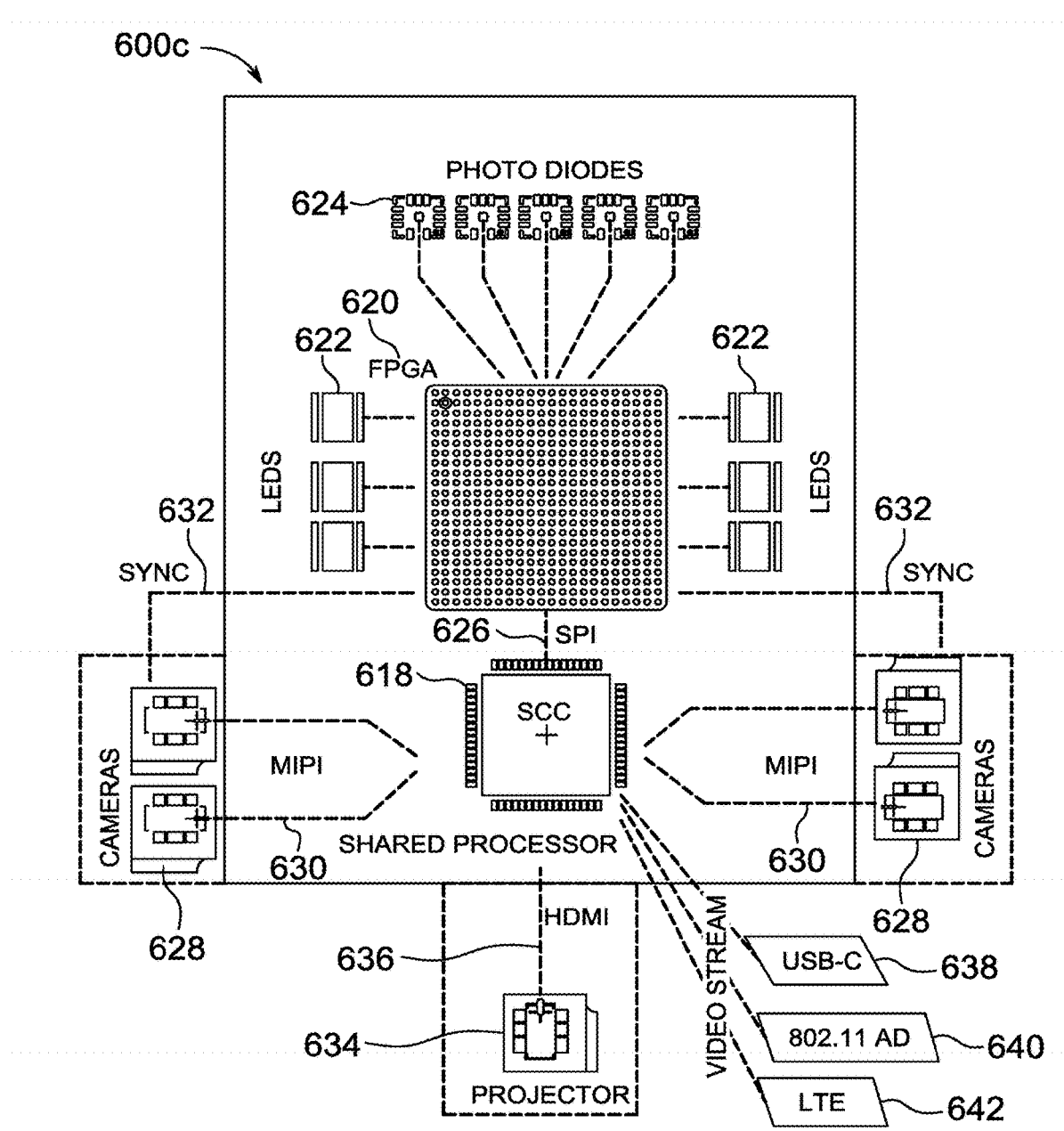

FIG. 6C is a circuit diagram illustrating internal components of a puck or headband mounted accessory according to some embodiments of the disclosure (which may also incorporate or be incorporated into components depicted in FIG. 5).

FIG. 6C illustrates a distributed architecture for providing the functionality of a puck. As illustrated, the architecture 600c is divided into an FPGA-based section that includes one or more FPGAs 620, LEDs 622, and photodiodes 624 and a shared processor section that includes a CPU 618. The two sections can be connected via SPI bus 626. SPI bus 626, CPU 618, FPGAs 620, LEDs 622, and photodiodes 624 are described in connection with FIG. 6B.

Additionally, illustrated in FIG. 3C are cameras 628. In embodiments, cameras 628 comprise cross-polarized stereo camera pair modules and, optionally, depth sensors. In some embodiments, a cross-polarized stereo camera pair module can comprise multiple discrete cameras including a wide-angle fish-eye camera and adjacent cameras. In some embodiments, projection devices can optionally include cross-polarized stereo camera pair modules and optional depth sensors. Cameras 628 are connected to CPU 618 (which can be an SOC) via a MIPI ("Mobile Industry Processor Interface") interface 630 although alternative interfaces may be utilized.

FPGA 620 is connected to cameras 628 via a synchronization bus 632. In some embodiments, synchronization bus 632 can comprise a USB-C® bus or other signal path. In alternative embodiments, FPGA 620 can synchronize cameras 628 through CPU 618. Synchronization bus 632 allows for the synchronization of LEDs 622 and cameras 628 during light capture operations as discussed previously, as well as other cross-function syncing functions.

CPU 618 is additionally communicatively coupled to projector 634 via a bus, such as HDMI (High-Definition Multimedia Interface) bus 636. In some embodiments, CPU 618 can be connected to multiple projectors. As discussed previously, projector 634 can comprise a swivelable or positionable pico projector. In some embodiments, projector 634 can include an RGBZ module. As discussed previously, projector 634 can be configured to project light field scenes or other visible video or image information into a physical space, generally onto one or more surfaces in the space.

CPU 618 receives video streams from one or more interfaces 638, 640, 642. As illustrated, CPU 618 can receive a video stream via a USB-C® interface 638. In one embodiment, video streams from other pucks or from a headband portion of a VR/AR device, described previously, can provide video streams to CPU 618 via UBS-C interface 638. Video streams can also be transmitted to CPU 618 via an IEEE 802.11AD interface 640. In alternative embodiments, other Wi-Fi interfaces can be used to transmit video streams to CPU 618. Video streams can also be transmitted to CPU 618 via a LTE (Long-Term Evolution) interface 640. In alternative embodiments, other cellular interfaces can be used to transmit video streams to CPU 618. In alternative embodiments, video streams can be received by CPU 618 via satellite interfaces and/or radio interfaces. Although illustrated outside the shared processor section, in some embodiments, interfaces 638, 640, and 642 can be implemented as part of CPU 618. As illustrated, CPU 618 can receive video stream data from a VR/AR device itself (e.g., via USB-C® interface 628) or from a remote data source via 802.11AD interface 640 and/or LTE interface 642. For example, CPU 618 can receive three-dimensional scenes transmitted from a remote rendering site (e.g., a cloud rendering application or service).

Figure 7:
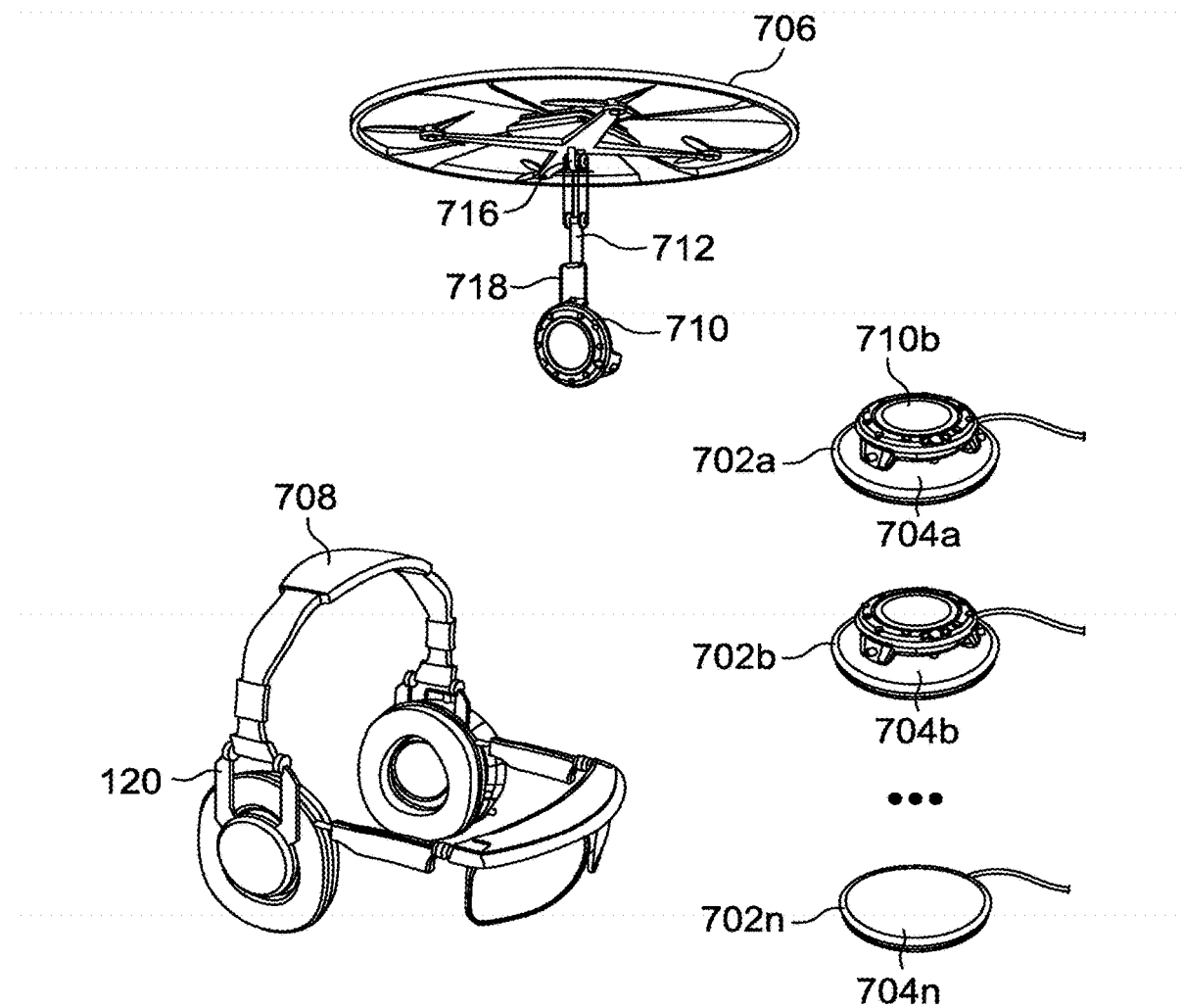
FIG. 7 is a block diagram illustrating a drone-based recharging system according to some embodiments of the disclosure.

FIG. 7 is a block diagram illustrating a drone-based recharging system according to some embodiments of the disclosure.

As illustrated in FIG. 7, one or more wired charging devices 702*a-n* can be placed throughout a physical space. In one embodiment, a charging device can comprise an electronic device designed to be inserted into a power outlet such as wall-mounted power outlet. In alternative embodiments, charging device can comprise an electronic device connected to another electronic device (e.g., a laptop, desktop, etc.) via a USB or similar connection. In each case, the charging device can be configured to draw power from a fixed power source. Charging device can include power circuitry known in the art to perform standard power operations.

Charging devices 702*a-n* additionally includes an external charging portions 704*a-n*. In some embodiments, a charging portion 704*a* can comprise an inductive charging surface. In alternative embodiments, a charging portion 704*a* can comprise a USB port.

As illustrated, a drone device 706 can be capable of connecting a puck 710 to charging portion 704*n*. Alternatively, or in conjunction with the foregoing, drone device 706 can include a rechargeable battery capable of being recharged via charging portions 704*a-n*. In one embodiment, drone device 706 can place a puck on charging device 702*n* until needed by VR/AR device 708, the operation of which is described below.

As discussed previously, pucks connected to VR/AR device 708 include a rechargeable battery. In some embodiments, the pucks can monitor their available battery level and can transmit a notification to one or more drone devices 706 upon detecting that the available battery level has reached a limiting threshold. For example, a puck 710 can monitor available battery life and notify drone device 706 upon detecting a remaining battery level of 10%.

Drone device 706 can include one or more network interfaces designed to receive notification from the pucks. In one embodiment, drone device 706 can include Bluetooth, Wi-Fi, NFC, or other radio-based network interfaces to allow for communication with a VR/AR device 708.

Upon detecting a notification from VR/AR device 708, one or more drone devices (e.g., 706) can activate and detach a charged puck (e.g., 710*b*) from charging device 702*a*. As described in connection with FIGS. 8A and 8B, a drone device 706 can comprise a quadrotor type drone. After detaching a puck 710 from charging device 702*a*, drone device 706 can navigate to the VR/AR device 708. In one embodiment, drone device 706 can utilize one or more LED lights present on the VR/AR device 708 and/or pucks to identify a location of the VR/AR device 708 and navigate to the VR/AR device 708.

Upon reaching VR/AR device 708, drone device 706 can position itself above ear piece portion and lower hook 712 using motor 716. As illustrated in FIG. 7 and discussed previously, puck 710 can include a retractable drone hook 718 in a recessed state when connected to VR/AR device 708. Drone device 706 can be configured lower hook 712 such that a curved portion of hook 712 engages drone hook 718.

Once the drone device 706 attaches the hook 712 to drone hook 718, the drone device 706 can move outward and/or upward from the user in order to disconnect the puck 710 from VR/AR device 708.

Drone device 706 can then return the puck 710 to available charging device 702*n*. As illustrated, drone device 706 can be configured to place the puck 710 on an inductive charging pad of charging device 702*n*. Once placed on charging pad 704*n*, drone device 706 can wait until the puck 710 is fully charged. In some embodiments, puck 710 can continue to broadcast a battery state while charging to notify drone device 706 of the charge state of puck 710.

In some embodiments, multiple charging devices 702*a-n* can be utilized. In this embodiment, drone device 706 can identify a fully charged puck placed on another charging device (e.g., 702*a*). Upon detecting a fully charged puck, the drone device 706 navigate to the fully charged puck, pick up the puck 710*b* using hook 712 and delivery the fully charged puck to VR/AR device 708. This, the system can allow for continued operation of one or more pucks by swapping pucks based on battery life notifications.

Figure 8A:
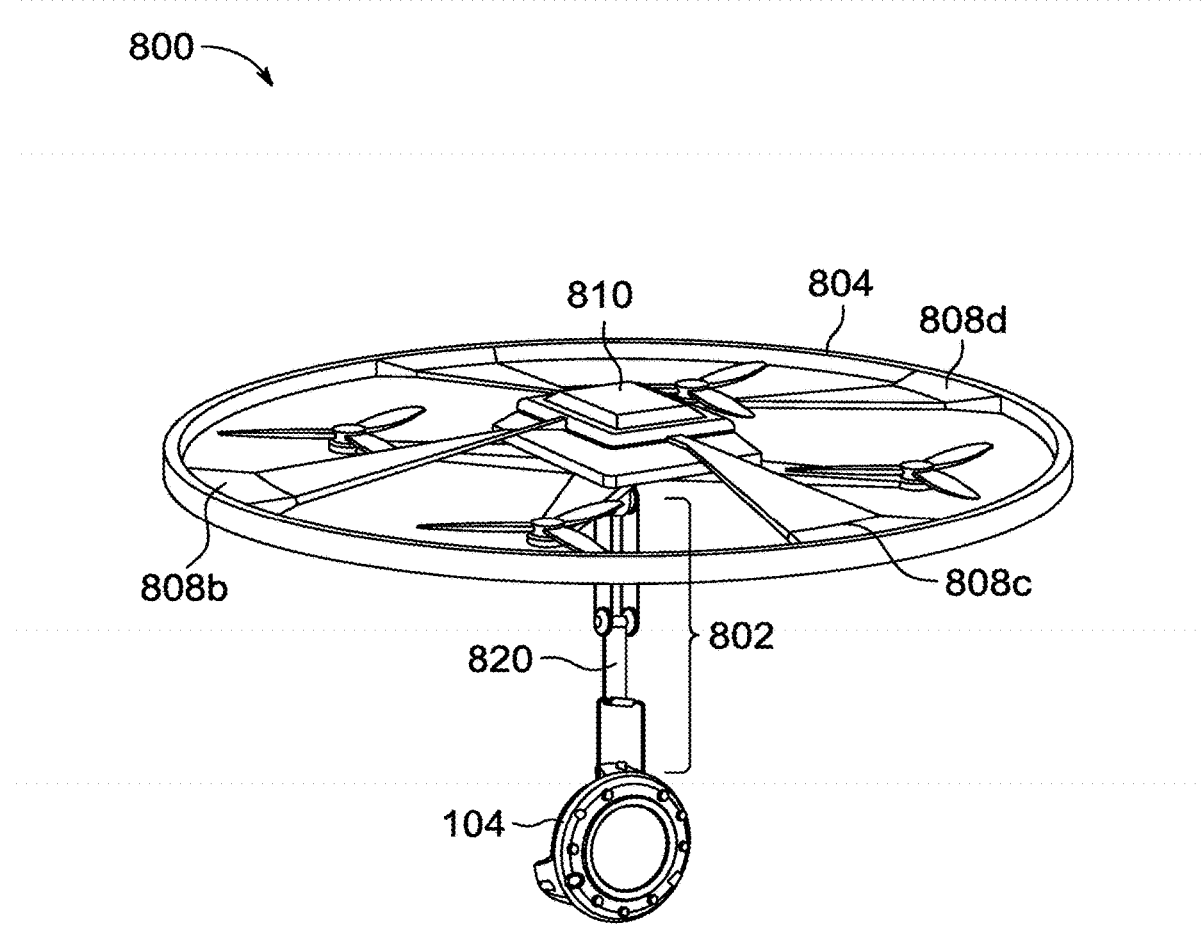
FIGS. 8A and 8B illustrate drone delivery devices according to some embodiments of the disclosure.
Figure 8B:
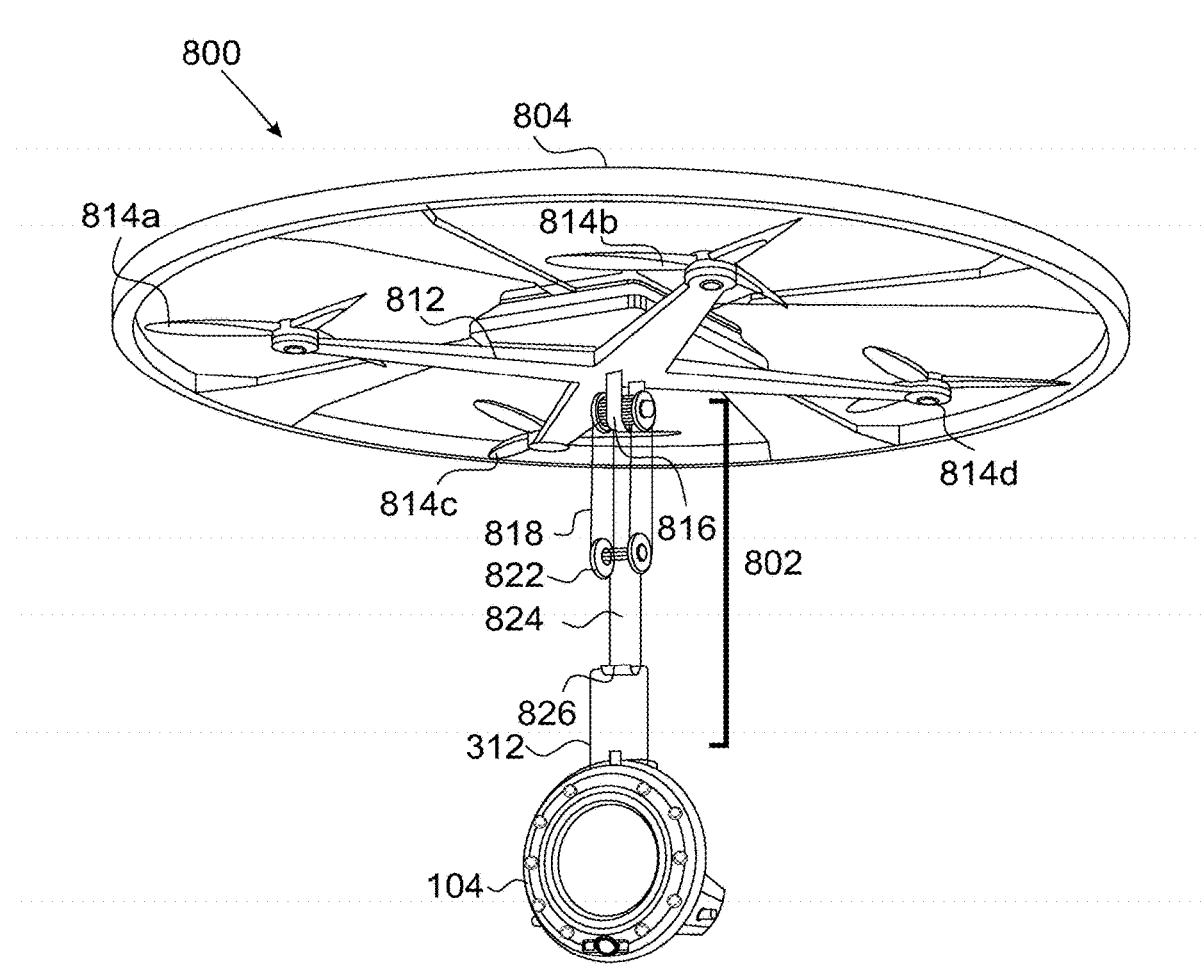

FIGS. 8A and 8B illustrate drone delivery devices according to some embodiments of the disclosure.

As illustrated in FIGS. 8A and 8B, drone device 800 can comprise a quadrotor type drone. It may be appreciated that FIGS. 8A and 8B and related description is only provided only by the way of illustration and not limitation and that any type of aerial or multi-mode vehicle of suitable attributes currently known or to be invented can be employed. The drone 800 includes an attachment portion 802 located underneath an upper frame 804. The upper frame 804 operates to hold shafts 808*a-d* fixed to the attachment portion 802 in an 'X' shaped configuration. Hub 810 can be connected to rotor shaft apparatus 812. As illustrated in more detail in FIG. 8B, rotor shaft apparatus 812 can comprise a rotatable 'X'-shaped component. At the end of each arm of rotor shaft 812 are rotors 814*a-d*. Rotors 814*a-d* can comprise two pairs of counter-rotating, fixed-pitch blades located at the four corners of the vehicle. The attachment portion 802 can also comprise a power source to power the vehicle and its onboard circuitry along with any computer readable storage media.

As illustrated, rotor shaft apparatus 812 is coupled to a motor 816 which includes a retractable chain 818. In some embodiments, chain 818 can comprise any suitably flexible material capable of being lowered and raised by motor 816. Chain 818 connects the motor 816 to hook 820. In one embodiment, hook 820 can comprise a spindle top portion 822 connected to chain 818, a vertical hook shaft 824, and a curved hook end 826. Hook end 826 can be configured to connect to drone hook 312 connected to puck 104, as described previously. In some embodiments, drone device 800 can be fitted with imaging equipped such as cameras and photosensors in order to detect the location of puck 104 as described previously.

As illustrated and discussed previously, drone 800 can be configured to fly to a VR/AR device and attach hook end 826 to the drone hook 312 of a puck 104 that is in use by the VR/AR device. In this manner, drone 800 can be capable of replacing pucks of a VR/AR device as needed and as discussed in connection with FIG. 7. Additionally, drone 800 can be configured to fly with puck 104 attached to perform light capture operations as described more fully in connection with FIG. 9.

Figure 9:
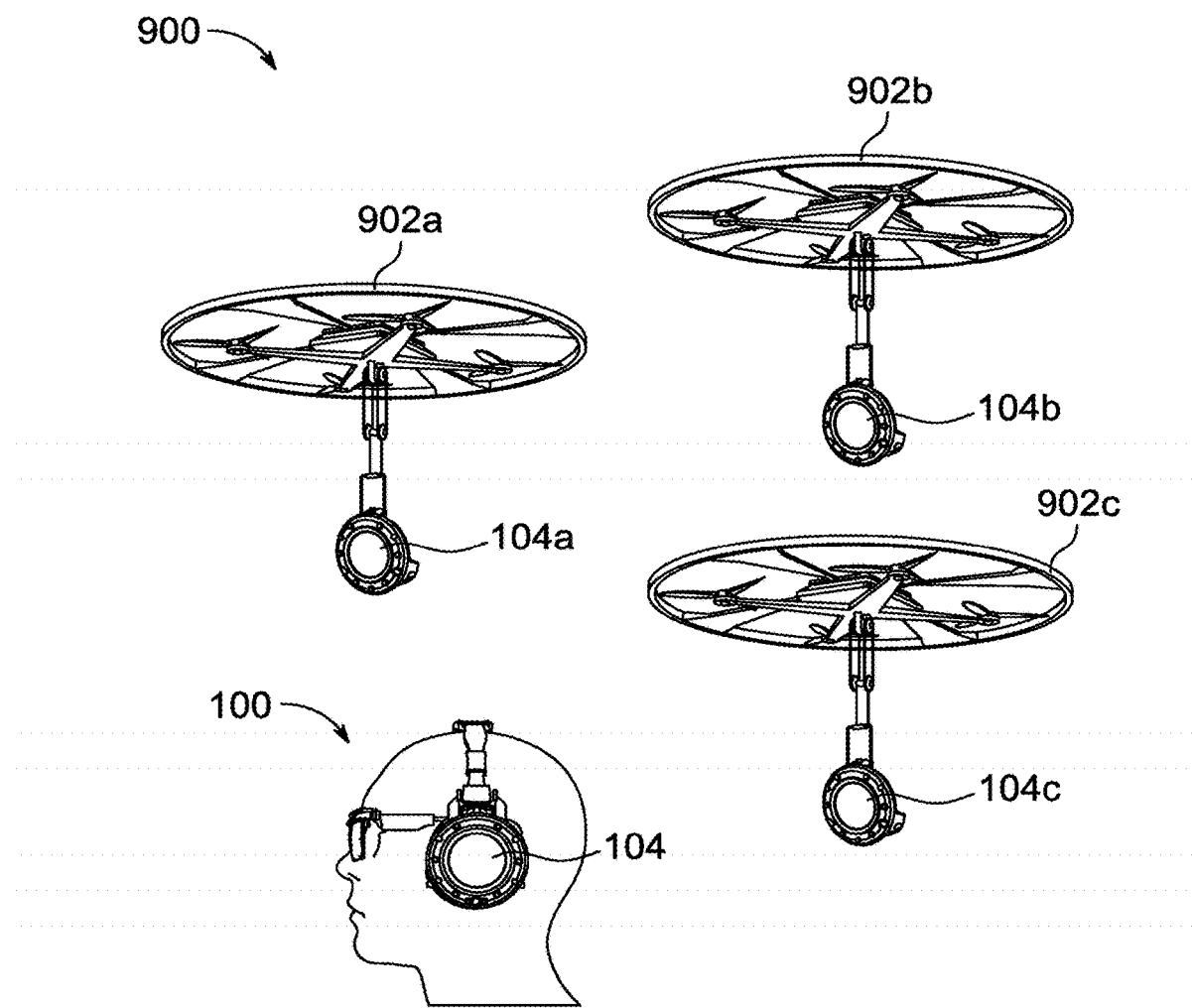
FIG. 9 is a block diagram of a drone-based capture system according to some embodiments of the disclosure.

FIG. 9 is a block diagram of a drone-based capture system according to some embodiments of the disclosure.

As illustrated in FIG. 9, a capture system 900 can include a plurality of drones 902a-n. In some embodiments, drones 902a-n can comprise quadrotor type drones equipped with sensor and imaging equipment that can be flown into a wide variety of patterns or positions or paths to facilitate image data capture. In some embodiments, imaging equipment can comprise light sources (e.g., LEDs), cameras, optical sensors, infrared sensors, radio sensors, polarized light sources, or a combination thereof. The structure and operation of drones 902a-n is described more fully in connection with FIGS. 8A and 8B.

In the illustrated embodiment, drones 900a-n can be equipped with communications components to allow for communication with VR/AR device 100, and in particular, puck 104. In one embodiment, drones 900a-n can be equipped with Bluetooth, Wi-Fi, or other radio-based transceivers and can be configured to receive commands from puck 104. Alternatively, or in conjunction with the foregoing, drones 900a-n can additionally be configured to transmit image or other data to puck 104 for further processing and/or display.

In some embodiments, puck 104 can be utilized to control the movement of drones 902a-n. In some embodiments, drones 900a-n can be configured to track the position of the VR/AR device 100 while in flight and can be configured to fly in a particular pattern. In one embodiment, a pattern can be programmed by a user and/or via the device 100. In one embodiment, a pattern comprises a plurality of points representing positions in three dimensional space having therewithin a subject. Drones 902a-n are positioned at points to form the pattern in the space in proximity to the device 100 (and/or a pre-defined image subject). At various times, drones 902a-n can activate imaging components on pucks carried by drones 90a-n for collecting imaging data of the subject or area. In some embodiments, pucks carried by drones 902a-n can be configured to capture and render three-dimensional light field images as discussed previously. In this embodiment, drones 902a-n can be configured to transmit the rendered scene data to puck 104 for display on VR/AR device 100.

Each of the drones 902a-n can be configured to fly independently and can have a respective trajectory mapped out to reach and levitate at a particular position or continuously or repeatedly follow a certain trajectory in space. However, they can also be remotely controlled or their flight paths can be monitored and altered by a device 100.

The drones 902a-n are arranged in a particular pattern with respect to a subject being imaged. It may be appreciated that the number and pattern of the drones 902a-n is shown only by the way of illustration and that greater or lesser number of drones 902a-n can be used in various patterns to generate different lighting conditions or to collect image data from various positions or angles as will be detailed further herein.

In one embodiment, each of the drones 902a-n can receive respective, unique position information from the device 100, map a flight path or trajectory in order to reach a respective, designated position at a predetermined time. The position information for each drone can be generated based on one or more of a selected arrangement for the plurality of drones 902a-n, or attributes of the drones 902a-n as will be detailed further herein. In one embodiment, the device 100 and/or the subject in combination with the ground or base surface can be used by the drones 902a-n as a reference entity to achieve their respective positions. In one embodiment, one or many radio sources may be present at the location of the subject so that the drones 902a-n are able to identify the subject and therefore position themselves accordingly in a designated pattern in proximity to the subject. Alternatively, or in conjunction with the foregoing, device 100 (or pucks thereon) can be used as a radio source. This can be useful in external or outdoor environments where there may be a multitude of objects and particular identification of the subject to be imaged may be required. Alternatively, sonar can be used (either on the drone itself or using an external sonar device to track the drone) to provide position information to one or more of the drones 902a-n relative to the subject or other object of known position or other drones 902a-n.

The subject or object being imaged can be illuminated with the light from the pucks held by drones 902a-n. In one embodiment, all the pucks need not emit light. In an embodiment, the pucks can be pre-programmed to activate the LEDs and illuminate the subject with a sequence of time-multiplexed lighting configurations. The light sources on pucks can be selectively activated to emit light at a particular time after the drones 902a-n reach their designated positions. Image data of the subject thus illuminated can be recorded by one or more cameras on the puck. In one embodiment, the camera(s) can also be controlled by the device 100 when the drones 902a-n have achieved the desired formation and illuminate the subject in a desired manner. In an embodiment, the functioning of the camera(s) and the plurality of drones 902a-n can be synchronized such that the camera(s) automatically capture the image data upon the drones 902a-n achieving particular configurations. As the drones 902a-n are small and wireless, they are portable and may be carried easily to a location of a subject. As described previously, the pucks carried by drones 902a-n can comprise different types of lights, cameras, filters, sensors or combinations thereof. Hence, in contrast to the efforts and time utilized in adjusting conventional lighting and camera equipment, the illustrated system affords simple adjustments wherein one or more of the pucks can be swapped with other different type(s) of pucks in order to produce a different lighting effect or record different type of image data as needed. As described previously, pucks can be equipped with light-field cameras that measure the intensity and direction of every incoming ray instead of merely recording the sum of all the light rays falling on each photosite at a sensor. With such information every possible image of whatever is within the field of view of the camera at the moment of image capture can be generated. A single capture from a light-field camera can provide digital data such that focus, exposure and even depth of field are adjustable after the image is captured.

In one embodiment, device 100 can instruct drones 902a-n to position themselves within a three dimensional space in a selected pattern or geometry. The pattern for arranging the drones 902a-n can be selected depending on various factors including but not limited to, the size of the subject being imaged, the nature of the surface/subject being imaged, the kind of image data necessary and the attributes of the drones 902*a-n* and/or pucks 104*a-c*. At least a subset of the plurality of drones 902*a-n* is selected for activation. The pucks 104*a-c* can be programmed to automatically execute tasks such as emitting light and/or collecting image data of the subject or combinations thereof at predetermined time points upon reaching their designated positions within the pattern. In an embodiment, device 100 can activate only some of the pucks 104*a-c* to emit light and/or collect image data at specific time intervals. In an embodiment, a combination of the aforementioned events can occur wherein the pucks 104*a-c* are pre-programmed to execute the tasks related to collecting image data at particular time points when the device 100 can interfere with their functioning to deactivate or activate an otherwise idle drone to emit light and/or collect image data based for example, on user input. Therefore, the selected pucks and drones are activated and the image data is captured.

In some embodiments, a three dimensional model of a selected pattern can be generated/simulated by the device 100 based on user input. In an embodiment, the selected pattern can be simulated by the processor with reference to the location of the subject to be imaged. The positions for the drones 902*a-n* within a selected pattern can either be determined by the device 100 alone or in combination with a human operator in an embodiment. In one embodiment the user can determine where particular drones 902*a-n* should be placed within the pattern, for example, by clicking at the particular points on a 3D model displayed on a puck display screen. The processor can be configured to store the coordinates of the points receiving the user clicks or touches. The positions in the pattern may be defined in terms of various coordinate systems, e.g., Cartesian coordinates or spherical coordinates. In different embodiments, the puck can be configured to suggest drone patterns for user selection or even automatically select certain imaging patterns based on the attributes of the subject such as but not limited to the shape of the subject, nature and the area of surface being imaged. In an embodiment, certain imaging requirements such as the type of puck to be positioned can be associated with the selected positions. For example, a default imaging requirement of having a light source can be associated with each of the selected positions within the pattern. Such imaging requirements of the positions can be further modified based on user input. Thus, a user can specify if a light source, a camera or their combination with a filter should be placed at each position and any particular settings to be associated with such equipment. Upon receiving the imaging requirements for the positions, the identification and attribute data of the drones and/or pucks can be selected by a user for positioning is received. By way of illustration and not limitation, the user can select the drones having appropriate pucks for the formation of the pattern to collect image data. In an embodiment, each drone and/or puck can be uniquely identified via a respective ID which can also indicate its attributes such as the imaging components it has on the puck. The identification data from the drones can be obtained via communication technologies such as but not limited to, Bluetooth or Wi-Fi. For example, the drones or pucks can have their identification and attribute information encoded on respective passive or active RFID (radio frequency identification) tags in order to provide the position and attribute data. The device 100 can determine if the selected drones/pucks and their attributes match the previously received imaging requirements for the positions. For example, if the selected pattern and position requirements include ten drones, two with camera-equipped pucks and eight with light source-equipped pucks, device can determine if there are ten drones that satisfy the specified requirements. In case it is can be determined that the drones selected for pattern formation do not match the specified requirements, a user notification can be generated and the user can be provided an opportunity to rectify the error. If it is determined that the selected drones satisfy the requirements, the position data and imaging requirements are transmitted to the drones. In one embodiment, each drone can receive only data associated with its position and its respective puck imaging settings. In an embodiment, the entire position and imaging data set is transmitted to all the drones/pucks which can recognize or obtain their respective data from the received data set. When the process of obtaining and transmitting the position and imaging data is complete and the subject to be imaged is appropriately positioned, the drones can be activated for positioning or for pattern formation.

When collecting image information, position information or data such as coordinates of a position in a particular pattern and imaging requirements associated with the position are received by a drone. In an embodiment, the position coordinates of the drone can be defined with respect to one or more reference entities based on different factors such as but not limited to, the pattern to be formed or the subject to be imaged, the location at which the subject is being imaged or combinations thereof. In addition, the imaging requirements such as, the settings of the puck including but not limited to, brightness of the light sources, angle and focus of the light sources or cameras, can also be received. An activation signal to form the pattern can be received from device 100. Reference entities with respect to which the coordinates are defined and the pattern is to be formed are identified. In an embodiment, only a single reference plane such as the ground may be sufficient to form the pattern. However, a drone can require more than one reference entity to identify its position. For example, one or many radio sources giving out radio emissions can be placed at the location of the subject so that the drone can employ the ground and the radio source(s) as references to identify its destination point in the three dimensional space. The drone maps the trajectory to its destination position. A computational module can be included in the processor which can receive or identify the position data, reference location data and the current location of the drone as input and map a trajectory from the current location to the destination. Various algorithms now known or to become known can be employed by the drones for independent trajectory planning and tracking. In accordance with one algorithm, to generate dynamically feasible trajectories, an initial plan is generated through the environment which satisfies collision and obstacle avoidance constraints. Such algorithm can further allow for real-time planning in cluttered environments also based on techniques such as visibility graphs. The resulting trajectories are defined in simple geometric terms of lines and connecting curves with accompanying desired velocities along each segment. Then, a feasible set of inputs and travel speeds is computed based on the curvature of the path, given speed and acceleration constraints on the vehicles. A drone can then navigate to and reach its destination. In an embodiment, the progress of a plurality of drones is monitored by device 100 as they navigate to their destinations to provide feedback in case of a deviation or an impending collision. Upon reaching the destination, the drone can levitate at the destination position and await a signal that indicates the commencement of the imaging procedure. In an embodiment, the progress of the drones can be monitored and upon the all the drones reaching their respective destinations and forming the complete pattern, a signal to begin the imaging procedure can be received by a drone as shown at 612. In an embodiment, the instruction set for the entire imaging procedure can be provided to each of the drones and a drone can identify its particular instructions from the received instruction set. Such identification can either occur due to the drone identifier being associated with the instructions or due to the position information associated with the instructions. Accordingly, puck carried by a drone is activated in accordance with the received instructions in order to execute tasks such as illuminating the subject or collecting the image data or combinations thereof.

In general, upon reaching their destinations the drones 902a-n levitate or hover or float in the air over the subject in their respective positions as they execute instructions to collect image data of a subject. In an embodiment, the a plurality of drones 902a-n are used only for illuminating the subject while the image data is collected by other drones 902a-n. Various kinds of image data such as a still image or a video can be collected in accordance with the embodiments disclosed herein.

In some embodiments, drones 902a-n can orbit around an object to be imaged to create a virtual sphere of drones 902a-n executing one or more of the tasks including illuminating the object or collecting image data as they move along their respective trajectories. One drone can hover above the object to be imaged in its position to collect or aid the collection of image data. Thus, a pattern of drones 902a-n can also be formed wherein some of the drones 902a-n move in particular trajectories around the subject to be imaged and some of the drones 902a-n simply levitate or hover above the subject while image data is being collected.

In some embodiments, drones 902a-n can be arranged in a grid pattern formed by a plurality of the drones 902a-n in accordance with one embodiment. The subject to be imaged (not shown) can be situated in front of the pattern and may be imaged via pucks. The planar grid formation can then be moved so that the plane of the grid formation may be oriented at myriad positions relative to a horizontal or vertical reference plane.

In some embodiments, drones 902a-n can be arranged in a spherical arrangement of the drones 902a-n in accordance with one embodiment. The subject being imaged can be situated inside the sphere in one embodiment. Thus, the subject can be initially positioned and the plurality of drones arrange themselves in a plurality of substantially evenly distributed circles to form the spherical pattern around the subject employing one or more reference entities as detailed herein.

In some embodiments, it can be further appreciated that drones 902a-n in a given pattern need not be identical and that different drones of different sizes and various attributes (such as by way of non-limiting example, weight carrying capacity, flight duration capability, inertial characteristics, processor capacity, among other characteristics) can be used at different positions in a single formation.

Figure 10A:
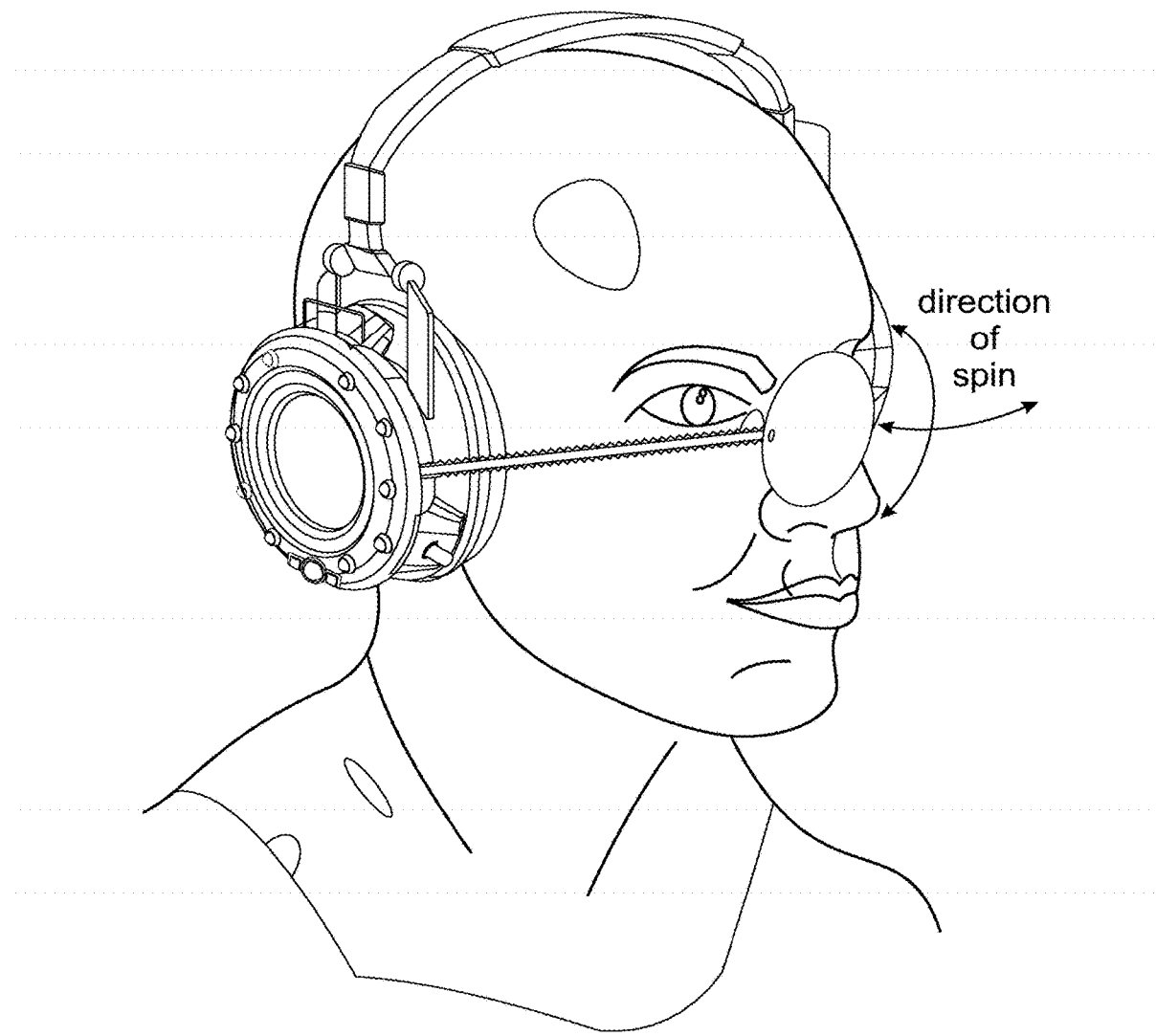
FIGS. 10A-B illustrates a puck with a display configured to act as a holographic, light field display.
Figure 10B:
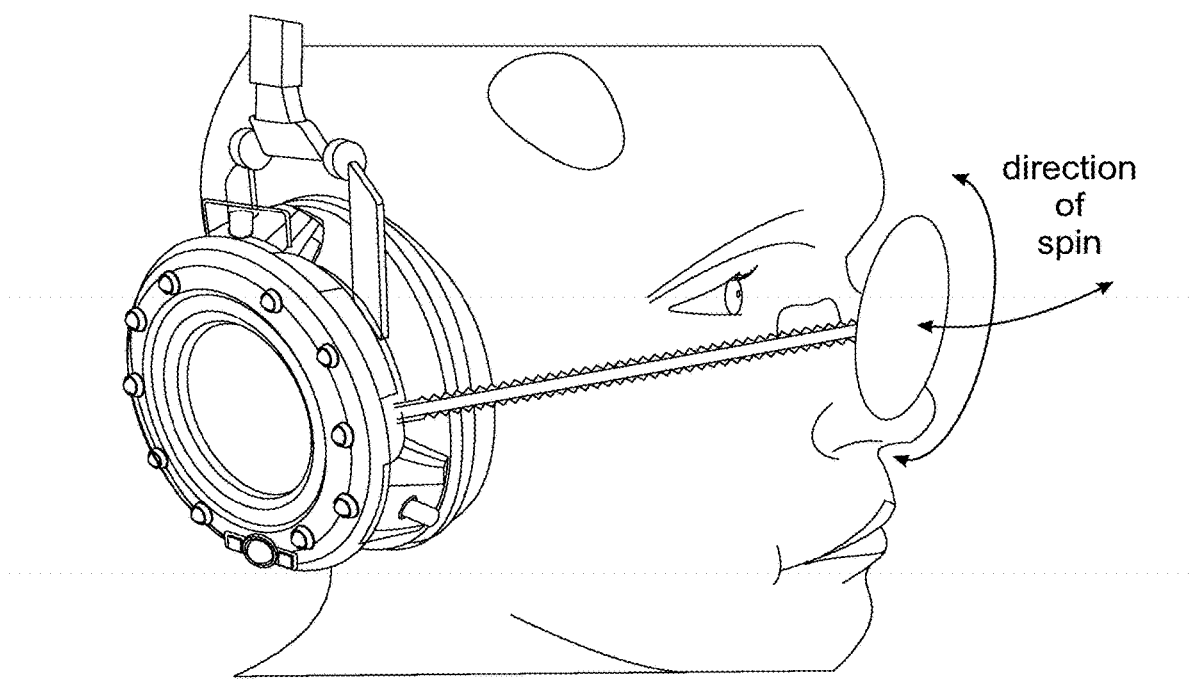

FIGS. 10A-B illustrates a puck with a display configured to act as a holographic, light field display.

As illustrated in FIG. 10, a display 114 (as illustrated in FIGS. 3D through 3R), is connected to puck 104 via a first rotatable connector such as a ball and socket connection. The first rotatable connector is connected to a telescopic member. In some embodiments, telescopic member is connected to display 114 via a second rotatable connector. As discussed previously, display 114 can comprise an OLED display device which can be single sided, transparent, double sided, or have a display side and a mirror side.

In one embodiment, the telescoping member allows for the raising and lowering of display 114 away from puck 104. In some embodiments, the telescoping member can be controlled manually and/or programmatically by puck 104. In some embodiments, the telescoping member can be tilted at either the first rotatable connector or second rotatable connector, or both. Alternatively, or in conjunction with the foregoing, the telescoping member can be flexible. In some embodiments, the rotatable connectors can include one or more copper slip rings to allow for data communications between puck 104 and display 114 or another component that the telescoping member might be connected to.

In some embodiments, display 114 can be rotated via a motor present at or near the point of connection between the display 114 and puck 104 (e.g., proximate the rotatable connector). In other embodiments the motor can be at a distal or intermediate position relative to the OLED and the OLED rotatably driven by a flexible drive shaft that extends through the telescoping or flexible member.

In some embodiments, the motor is configured to spin at up to 18,000 RPM (300 RPS), although the precise number of revolutions is not intended to be limiting. In one embodiment, the speed of the motor is controlled by puck 104 by varying the voltage supplied to the motor. Alternatively, or in conjunction with the foregoing, display 114 can be spun while parallel with the surface of puck 104.

In some embodiments, transparent members or a transparent cage can surround the display 114 to prevent injury to users. In some embodiments, the goggle portion (illustrated and discussed previously) can be utilized to protect a user from the spinning display. In some embodiments, a device 100 equipped with two attached pucks can provide a binocular stereo display when both pucks are providing the spinning display (e.g., both displays are spinning in front of the user's eyes)

While spinning, display 114 can be controlled by one or more processing devices within puck 104 (e.g., a Qualcomm 835 SNAPDRAGON® or NVIDIA TEGRA® X1 processor). Puck 104 (via one or more processing elements) can transmit image data to display 114 and cause display 114 to generate a light field display due to the spinning of the display 114. In some embodiments, puck 104 transfers image data to display 114 at 300 frames per second, although the specific frame rate is not intended to be limiting. In one embodiment, puck 104 is capable controlling raster lines on display 114 in order to generate the light field display. Alternatively, or in conjunction with the foregoing, puck 104 can rapidly turn the display 114 on and off, thus providing a holographic light field display via the spinning OLED display 114.

In some embodiments, the puck 104 can change the contents of the display 114 while spinning based on the position of a user. As discussed above, when the display 114 is rotating in front of a user's eye (e.g., when the puck 104 is connected to the device 100), the display 114 can provide a light field display before a user while the user is in motion. Additionally, in this embodiment, the puck 104 can be configured to track a user's eye movements and adjust the position and/or RPMs of the display 114 as necessary. Additionally, the puck 104 can also track the user's position and update the content of the spinning display 114 based on the position of the user.

Although described in the context of a spinning OLED display, other embodiments exist that can be utilized to provide a similar effect. In one embodiment, display 114 can include a mirror on the underside of display 114. In alternative embodiments, both sides of display 114 can be mirrors. In this embodiment, the puck 104 can utilize one or more projectors to project an image onto the mirror(s) to produce a similar holographic display. In some embodiments, the display 114 can, itself, be utilized as a mirror. In some embodiments, the display 114 can be utilized as a mirror on the OLED portion of the display 114 while a mirror section is present on the opposite side of the display 114. In some embodiments, the display 114 can be double sided wherein both sides are utilized as displays or as mirrors.

Figure 11A:
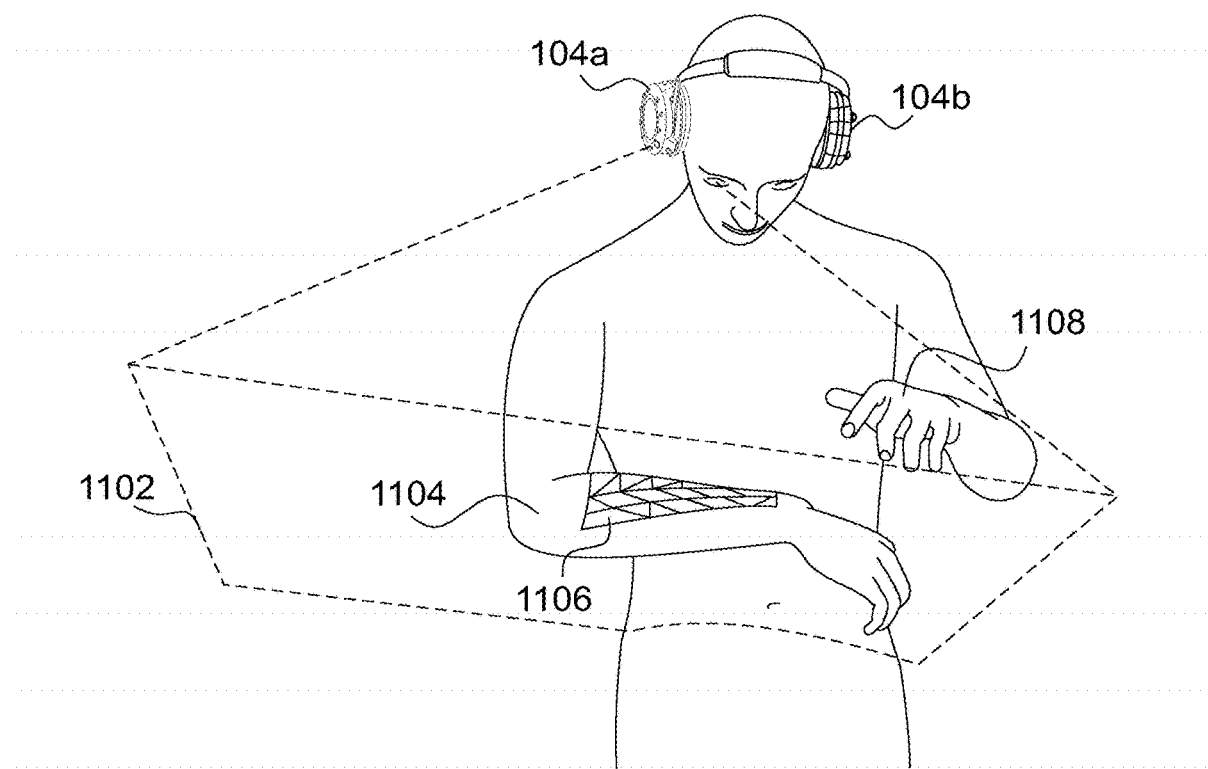
FIGS. 11A-C illustrate a puck with a display configured to display a body- or object-based virtual display, according to some embodiments of the disclosure.
Figure 11B:
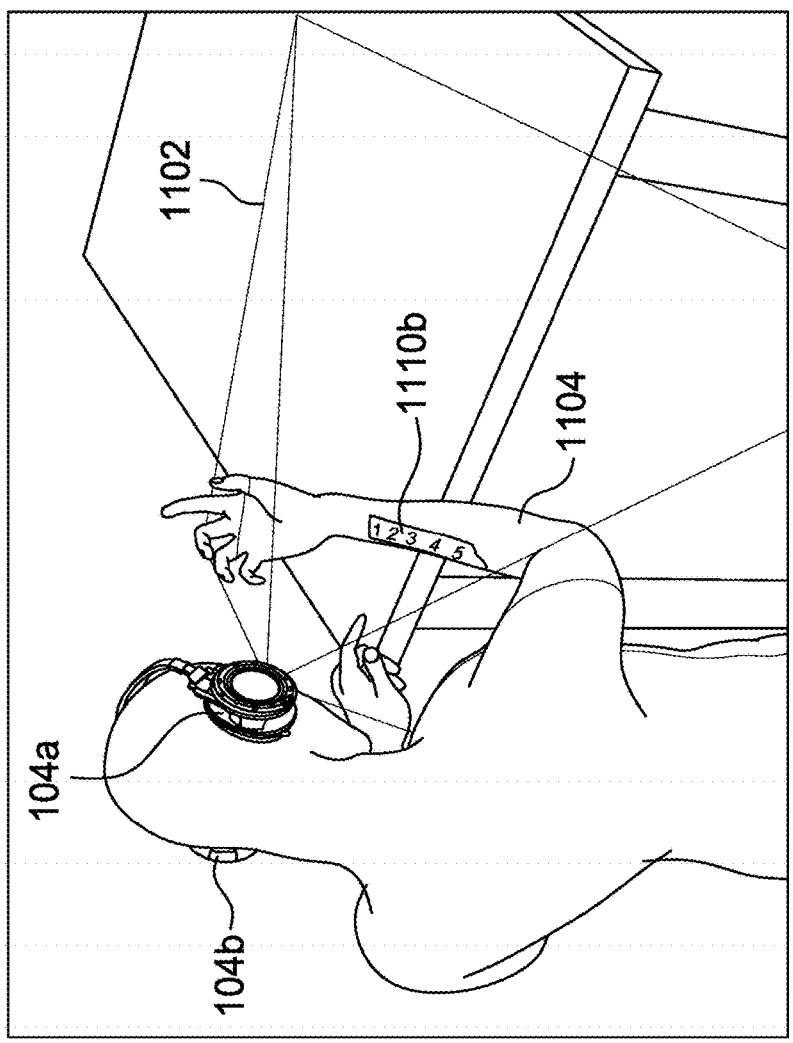
Figure 11C:
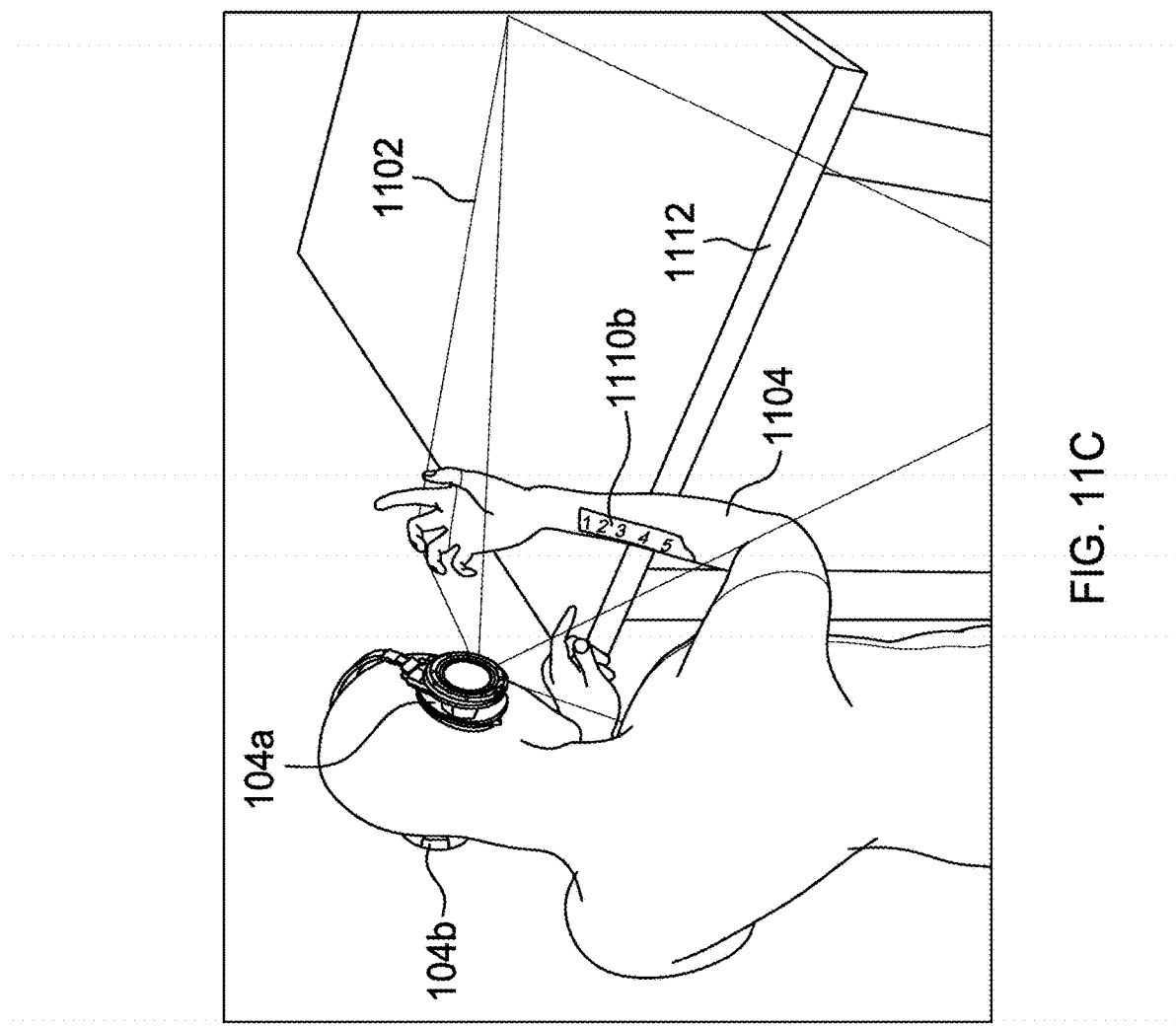

FIGS. 11A-C illustrate a puck with a display configured to display a body- or object-based virtual display, according to some embodiments of the disclosure.

As discussed previously, in some embodiments, pucks 104a and 104b are equipped with one or more depth sensing camera devices. In the embodiment illustrated in FIG. 11A, the one or more depth sensing camera devices are configured to track the position of a body part of the user, such as a hand, thigh or forearm 1104. As discussed previously, the depth sensing cameras allow the puck 104a to identify the precise location of a user's body part (e.g., forearm 1104) or other object with respect to the puck 104a and/or one or more projection devices (discussed previously) present on puck 104a. Although the following disclosure discusses a user's forearm 1104, other body parts can be utilized as a display surface. For example, the fingers of a user on forearm 1104 can be used as a display surface alternatively, or in conjunction with, the forearm 1104 of a user.

In the illustrated embodiment, the puck 104a displays a rectilinear or conical or other beam shaped projection 1102 into a space in front of the user and puck 104a. As discussed previously, the puck 104a is equipped with one or more projection devices to provide such a projection. Although illustrated as rectilinear, other shaped projections can be projected by puck 104a (e.g., a circular projection). Notably, however, projection area 1102 is larger than a user's forearm 1104 and thus allows for a user's arm to move substantially freely while remaining within projection 1102.

In some embodiments, a single projector provides projection 1102. Alternatively, the puck 104a can utilize multiple projectors to provide projection 1102. In one embodiment, projection 1102 can comprise a 1280×1440 pixel projection, although the specific size of projection 1102 is not intended to be limiting. In some embodiments, projectors on puck 104a are stationary while in other embodiments the projectors can move. In some embodiments, projectors on both pucks 104a, 104b can be utilized to increase the size and/or overlap of projection 1102.

As illustrated, the output of the projection devices of puck 104a is configured to display an interactive interface area 1106 on a user's forearm 1104. In some embodiments, the interface area 1106 displays the display of a computing device such as a laptop, mobile phone, tablet, or other device, or the input device for a computer or smart device, such as a touch pad area or projected keyboard or buttons or icons, or a remote control for a puck in set top box mode, or a video game controller. In this embodiment, a computing device is connected to puck 104a via a wireless connection such as a BlueTooth, Wi-Fi, or other connection. The computing device can be configured to transmit its display to puck 104a via the wireless connection. For example, a mobile phone can be configured to "mirror" its display to puck 104a. In response, puck 104a can include the mirrored display in projection 1102. In some embodiments, puck 104a is configured to modify the color, hue, or saturation of a projection 1102 based on the skin color of the user. In some embodiments, projection 1102 can be toggled based on detecting the presence of a body part (such as the user's arm).

In one embodiment, the output of puck 104a (via one or more projectors) can be manipulated such that the desired interface area 1106 only occupies a portion of the viewable projection 1102. In this embodiment, puck 104a receives the location of the user's forearm 1104 (via depth sensing cameras or other motion tracking or sensing elements, e.g. visible or invisible markers) and translates the position of the user's forearm 1104 into a set of coordinates located within projection 1102. These coordinates can be of various forms, but generally define a geometric shape such as a polygon representing a portion of the user's forearm 1104 as a planar portion of projection 1102. After identifying the portion of projection 1102, puck 104a transforms the desired display to fit within the interface area 1106. For example, the puck 104a can scale a mobile device screen to match the dimensions of the area of interface 1106 and a user can dial a phone or call up an app by interacting with the forearm projection.

Although described in the context of mirroring a device, interface area 1106 can display any other type of digital content, including content not transmitted by a user's computing device. For example, the puck 104a can be configured to display a movie or television show in interface area 1106. In this embodiment, the puck 104a can receive the movie or television show or video game from a remote source (e.g., a web site or web service) via a Wi-Fi interface on the puck 104a and transform the video source to fit within interface area 1106.

In some embodiments, projection 1102 is "clipped" to a user's forearm 1104. As discussed previously, the puck 104a is configured to track the position of a user's forearm 1104. Additionally, puck 104a can be configured to detect the rotation of a user's forearm 1104. Upon detecting a rotation, puck 104a transforms the display such that the interface area 1106 continues to display the same projection regardless of the movement of a user's forearm. Alternatively, puck 104a can be configured to update the contents of a display in unison with the user's forearm movement and thus simulate a display that "wraps around" the user's forearm. In some embodiments arm movements can be control signals, such as for example a user rotating one's arm can cause the display to scroll. In some embodiments, the puck 104a can be configured to "pin" interface area 1106 to a particular point on the user's body (e.g., at the user's wrist).

In some embodiments, interface area 1106 is utilized as an input device. As discussed previously, the puck 104a is configured to monitor the position of various body parts of the user. As part of this monitoring, in some embodiments, the puck 104a can be configured to track the position of a user's hand and/or fingers. In this embodiment, the puck 104a monitors the position of a user's fingers 1108 and can detect that one or more of the user's fingers 1108 are interacting with a display projected on interface area 1106. In response, the puck 104a can detect where on interface area 1106 a user has touch and can generate a simulated input signal. For example, if interface area 1106 is displaying a "home" screen of a mobile device, puck 104a can detect that one of user's fingers 1108 is attempting to "touch" an icon based on the position of the user's finger. In this example, puck 104a transforms positional coordinates of the user's finger to a Cartesian coordinate within the display projected in interface area 1106. Next, puck 104a transmits this coordinate to a user's computing device to instruct the computing device to "touch" at the calculated coordinate, thus simulating a "touch" even on the mobile device. Other device examples are television remotes, video game controllers, calculators, tablets, e-readers and the like.

FIGS. 11B and 11C illustrate a puck configured to operate in an "x-ray" mode of operation according to some embodiments of the disclosure.

As illustrated in FIG. 11B, puck 104a displays projection 1102 which includes an interface area 1110a projected onto a user's forearm 1104. As discussed previously, and as illustrated in FIG. 11B, interface area 1110a comprises an interactive simulated touchscreen display (represented by numerals 1, 2, 3 4). For example, each number in interface area 1110a can comprise an input element (e.g., an icon or similar element). In the embodiment illustrated in FIG. 11B, interface area 1110a is projected onto user's forearm 1104. Thus, to the user, interface area 1110a appears to be displayed on the user's forearm 1104, while the forearm is still visible to the user.

FIG. 11C illustrates a projection operating in a translucent or transparent mode according to some embodiments.

In the embodiment illustrated in FIG. 11C, the projection 1102 can be generated based on images recorded by puck 104b. Specifically, in the illustrated embodiment, puck 104b (and/or 104A) is configured to capture live images of table 1112 and transmit these images to puck 104a. In response, puck 104a generates a projection 1102 based on the captured images. In the illustrated embodiment, projection 1102 comprises a rectilinear projection that corresponds to the scene in front of the user from the user's perspective. As discussed above, pucks 104a, 104b are configured to track the user's position and eye movements and thus can update the recorded images to match the scene in front of the user (e.g., by adjusting the angle of cameras on pucks 104a, 104b).

As illustrated in FIG. 11C, when a user's forearm 1104 is moved into the projection 1102, the user's forearm 1104 is projected upon by puck 104a with the images recorded by puck 104b. Thus, in one embodiment, the projection on the user's forearm 1104 corresponds to the scene in front of the user's forearm 1104 (e.g., table 1112). Thus, from the perspective of the user, the user's forearm 1104 appears transparent (e.g., in "x-ray" mode) or translucent since the portion of the table otherwise obscured by the user's forearm is "seen around" by the cameras and projected on the forearm to give the impression that the forearm is not there.

In some embodiments, the projection 1102 results in the users forearm 1104 being "translucent" from the perspective of the user. Specifically, as illustrated in FIG. 11C, interface area 1110b includes the same contents of the displayed interface area 1110a. Notably, however, interface area 1110b is translucent, allowing for the display of table 1112 instead of the user's forearm 1104. As discussed previously, puck 104b is configured to capture, for example, images of table 1112. Thus, when operating in the mode illustrated in FIG. 11C, the projection 1102 can "erase" the user's forearm 1104 by projecting the images of the table 1112 upon the user's forearm 1104.

FIGS. 12A-H illustrate a puck with a wand-mounted display configured to act as a holographic, light field display, according to some embodiments of the disclosure. As illustrated in FIGS. 12A-F, puck 104 is configured to be used in a "tabletop" mode wherein legs 208a, 208b, and 208c are placed on a flat surface such as a table or the palm of a user's hand.

As discussed previously in connection with FIGS. 10A-B, a puck 104 includes a wand 1208 connected to puck 104. In some embodiments, wand 1208 is bendable and/or rotatable. In some embodiments, wand 1208 can be telescopic (as discussed previously in connection with FIGS. 10A-B). In some embodiments, wand 1208 is detachable from puck 104 as illustrated in FIG. 12G. In some embodiments, wand 1208 is detachable from puck 104 via a physical connection and/or electrical connection. In one embodiment, an electrical connection between wand 1208 and puck 104 comprises a USB-C® interface. In some embodiments, wand 1208 includes an internal drive shaft that is connected to a motor in puck 104 (via one or more interlocking gears) and to connection point 1204 via casing 1206. In some embodiments, casing 1206 houses additional electrical components as discussed more fully in connection with FIG. 12G.

In one embodiment, one or more slip rings or slip ring platters electrically couple a rotating output portion of the motor drive in puck 104 to an output of one or more processing elements in puck 104. Likewise, a second set of slip rings connect the rotating end in casing 1206 to an electrical output connected to connection point 1204. Thus, one or more processing devices in puck 104 can transmit data signals to display 1202 while the drive shaft in wand 1208 is in motion, which in turn rotates OLED 1202. In alternative embodiments, the drive shaft in wand 1208 can include one or more copper collars that isolate electrical data paths from the mechanically moving portions of the drive shaft.

In some embodiments, wand 1208 is additionally configured to be connected to a VR/AR device (as discussed previously) without utilizing a puck 104. In this embodiment, wand 1208 is connected to the VR/AR device via a USB-C® interface or slip rings as discussed. Specifically, in some embodiments, the wand 1208 can be connected to the VR/AR device in place of goggle portion 110. Notably, as discussed previously, in some embodiments, goggle portion 110 is connected to the VR/AR device via a USB-C® interface which allows for the transfer of data (e.g., three-dimensional scenes) from a puck (or headband portion) to goggle portion 110. In one embodiment, the goggle portion 110 is removed from ear piece portion 120 and display 1202 (via wand 1208) is connected to ear piece portion 120 in place of goggle portion 110. In this embodiment, the VR/AR device transmits image data to display 1202 (via wand 1208) using a USB-C® interface. Thus, in some embodiments, a VR/AR device (as depicted previously) does not include a puck 104 or a goggle portion 110 and drives display 1202 via wand 1208 without further components.

As illustrated, wand 1208 is connected to display 1202 via casing 1206 and connection point 1204. In some embodiments, connection point 1204 comprises a ball and socket connector. In this embodiment, connection point 1204 allows display 1202 to be tilted or otherwise moved in relation to casing 1206 and wand 1208. In some embodiments, connection point 1204 can be configured to "snap" into one or more positions. For example, when snapped into a 0 degree position, display 1202 will spin as depicted in FIG. 12B. Alternatively, when snapped into a 90 degree position, display 1202 will spin as depicted in FIG. 12D. Alternatively, when snapped into a 45 degree position, display 1202 will spin as depicted in FIG. 12F. Alternatively, or in conjunction with the foregoing, casing 1206 can be connected to wand 1208 via a similar connection (e.g., a ball and socket connection). In the illustrated embodiment, connection point 1204 is connected to the underside of display 1202. In some embodiments, casing 1206 includes one or more slip rings, slip ring platters, or copper collars as discussed previously to allow for data communications between display 1202 and puck 104. Alternatively elements 1202, 1204 and 1206 can be removably mountable as an assembly to wand 1208 and different angled OLED assemblies can be placed on wand 1208 as desired to achieve the different rotation angles depicted in FIGS. 12B, 12D and 12F. Each angled assembly will connect to the drive shaft and be electrically connected to conductors in the wand via slip rings or other rotating electrical connections as described herein or otherwise known in the art.

As discussed previously, a motor in puck 104 can be configured to spin at up to 18,000 RPM (300 RPS), although the precise number of revolutions is not intended to be limiting. In one embodiment, the speed of the motor is controlled by puck 104 by varying the voltage supplied to the motor. As discussed previously, the extension, rotation, and/or tilt of wand 1208 and/or display 1202 can be controlled manually by a user or programmatically by puck 104. Details of the motor in puck 104 are described more fully in connection with FIG. 12H.

Figure 12A:
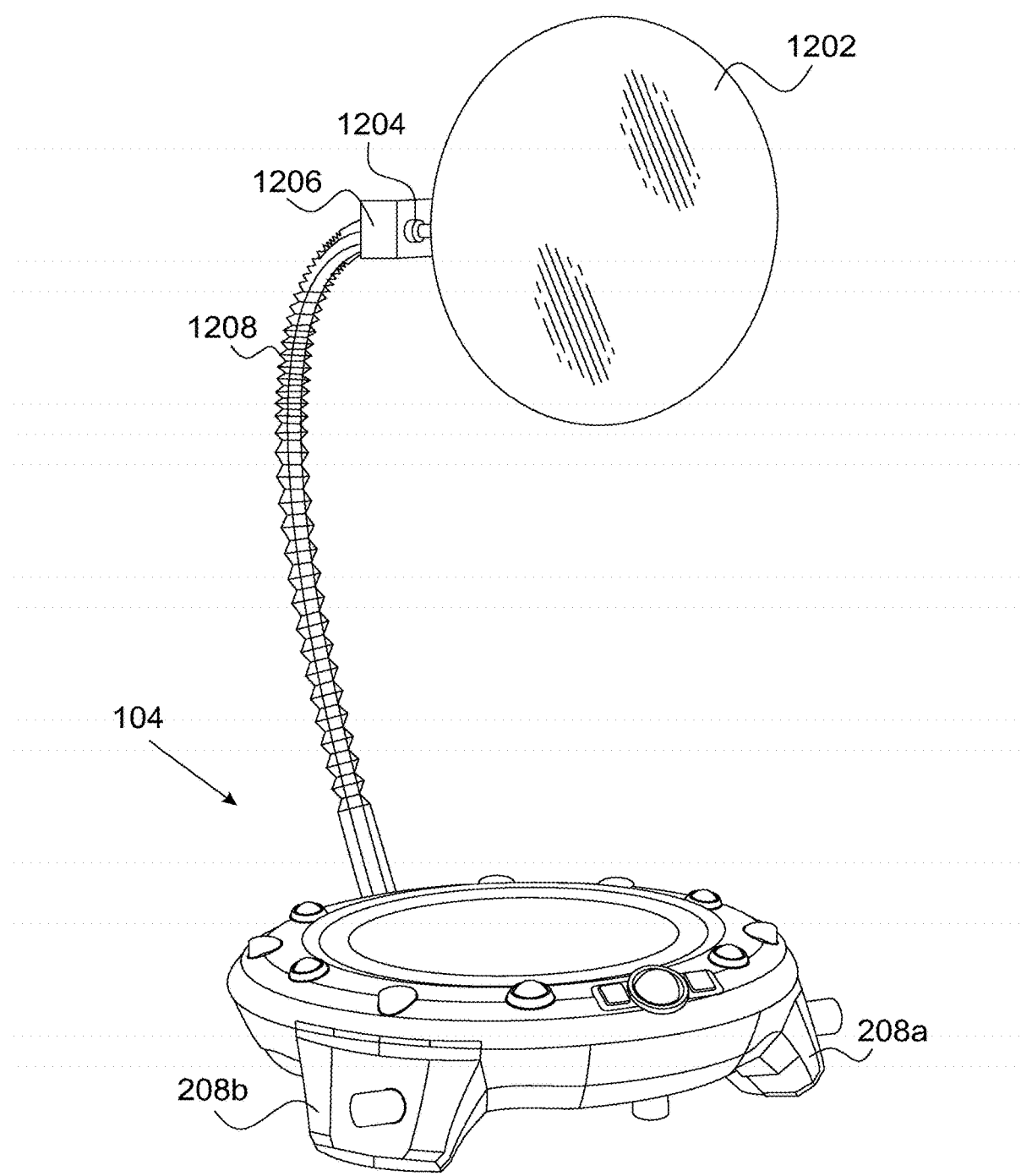
Figure 12B:
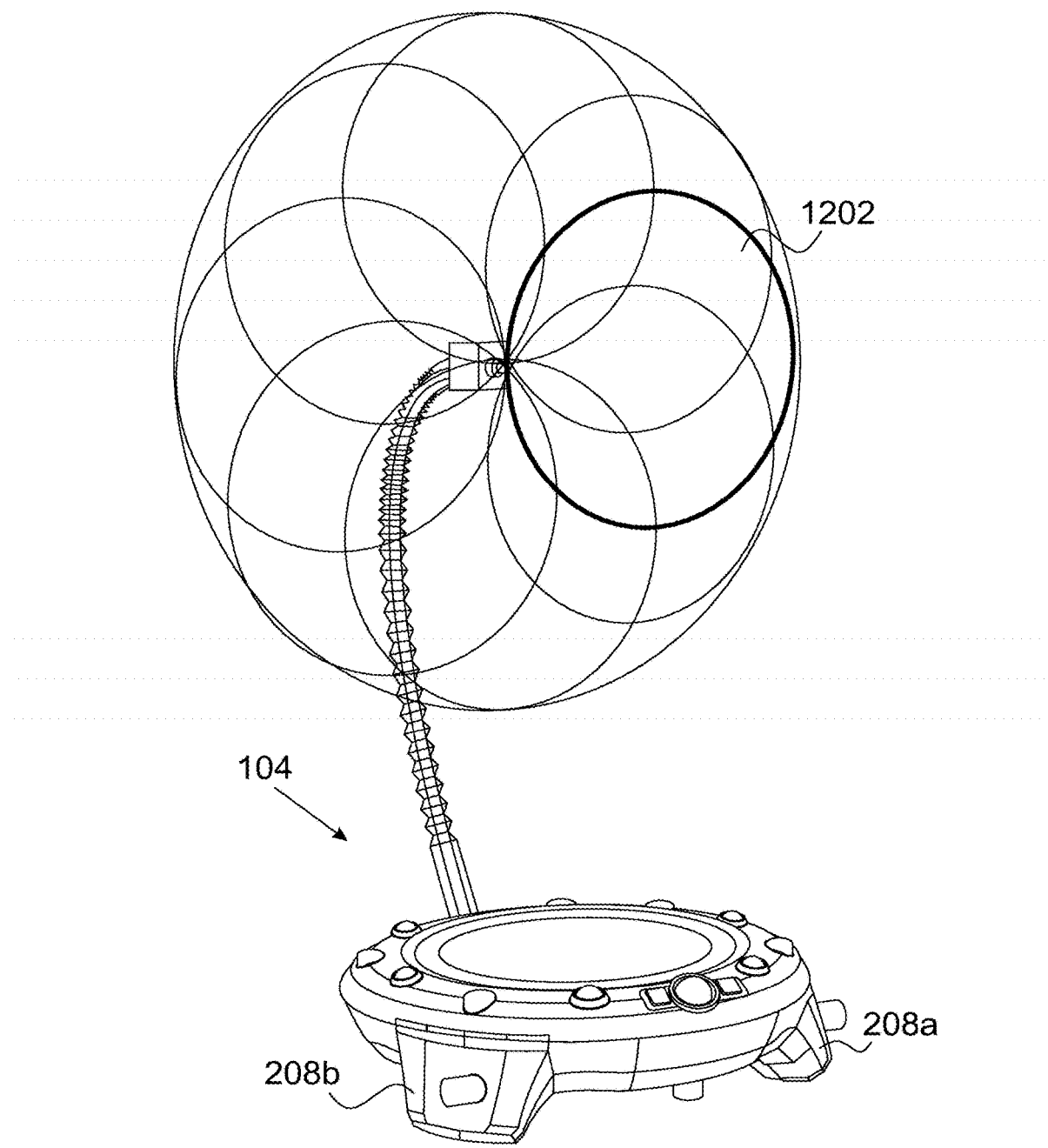

As illustrated more fully in FIG. 12A and B, display 1202 rotates via connection point 1204. In the illustrated embodiment, display 1202 rotates around an axis orthogonal to the display 1202. That is, as illustrated, display 1202 rotates about an axis parallel to the surface of puck 104, orthogonal to display 1202, and extending out from connection point 1204. In alternative embodiments, display 1202 can be tilted such that display 1202 rotates about an axis orthogonal to the surface of puck 104 and of the display 1202. That is, in this embodiment, display 1202 is positioned parallel to the upper surface of puck 104. In alternative embodiments, since display 1202 is connected to wand 1208 via connector 1204 (e.g., a ball and socket connector), display 1202 can be tilted or otherwise moved such that display 1202 rotates about axes at varying degrees with respect to the surface of puck 104 as illustrated in FIG. 12F.

In some embodiments, display 1202 has a resolution of 720×720 pixels, thus when spinning rapidly, a spinning display doubles the resolution using a single display 1202. In this embodiment, the puck 104 controls the output on display 1202 based on an identified position of the display 1202. As described in more detail herein, a grey encoder can be connected to the motor in puck 104 to identify the position of the display 1202. Given that the display 1202 is rotating rapidly, the output of display 1202 can be timed such that a single image is displayed visually to a user wherein the single image occupies a circular area having a diameter twice the diameter of display 1202.

Figure 12C:
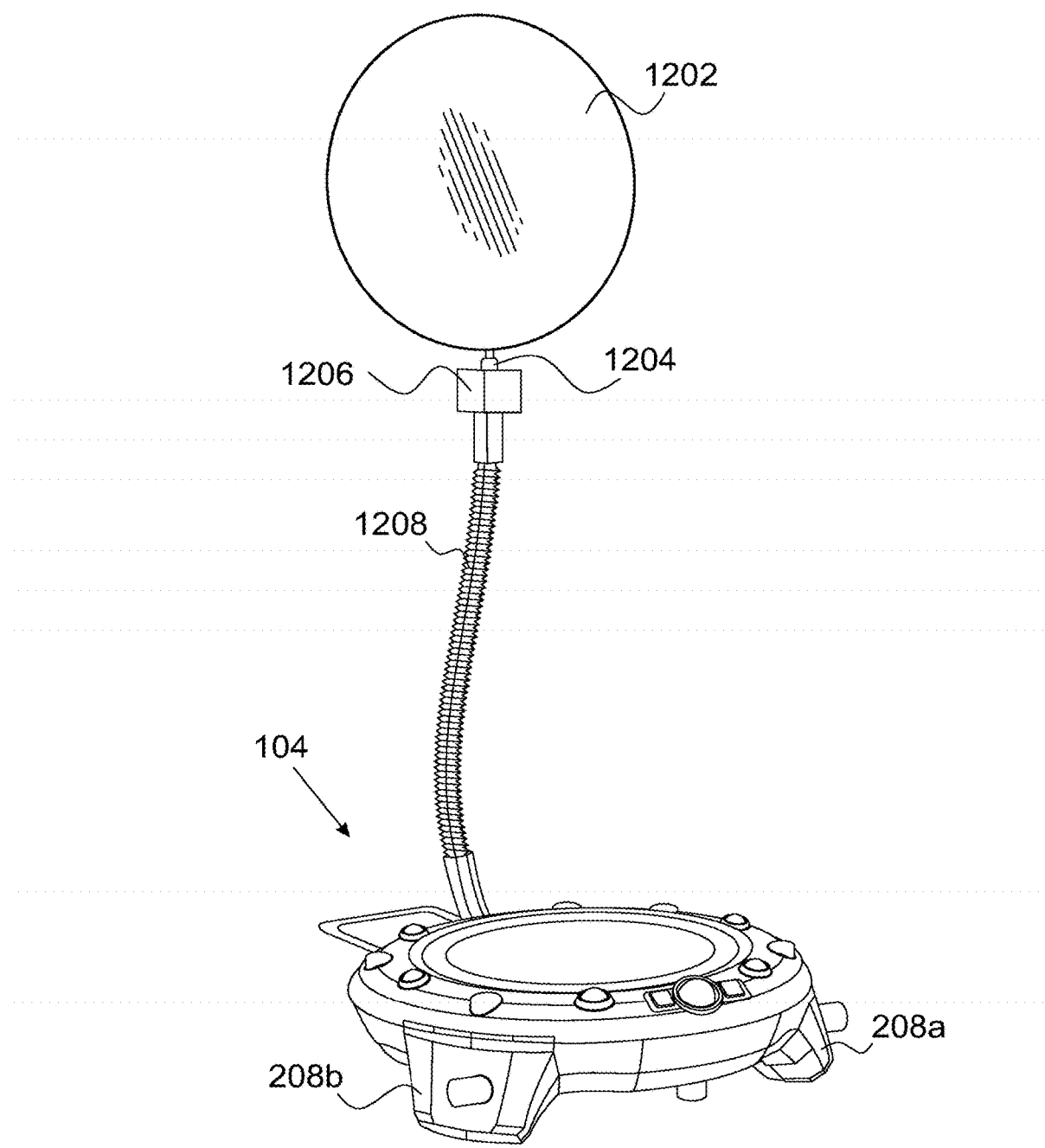
Figure 12D:
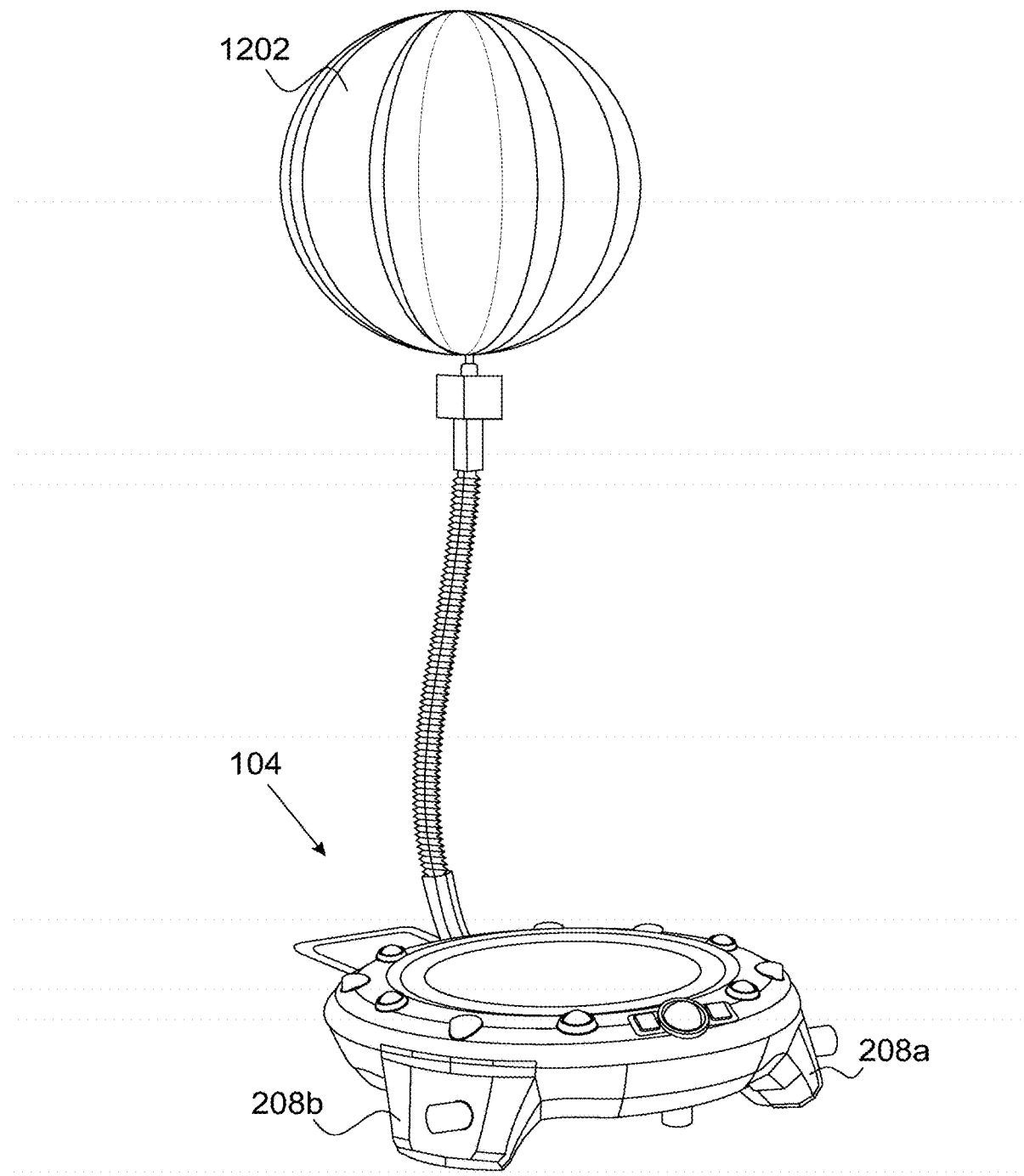

FIGS. 12C-D illustrate a puck with a display configured to act as a holographic, light field display, according to some embodiments of the disclosure.

As illustrated, a puck 104 is equipped with a wand 1208, casing 1206, connection point 1204, and display 1202. Details of wand 1208, casing 1206, connection point 1204, and display 1202 were discussed previously in connection with FIGS. 12A-B and are incorporated herein by reference.

FIGS. 12C-D illustrate an alternative connection point 1204 between wand 1208 and display 1202. In the illustrated embodiment, display 1202 comprises a two-sided OLED display. In alternative embodiments, display 1202 comprises a single-sided OLED display.

Display 1202 is connected to casing 1206 via connection point 1204. In the illustrated embodiment, connection point 1204 is connected at the edge of display 1202. In alternative embodiments, connection point 1204 includes an arm attached to one side of display 1202 and extending from a point on the edge of display 1202 toward the center of display 1202 along a radius of display 1202. In this embodiment, connection point 1204 allows for the rotation of display about an axis extending outwardly from connection point 1204, extending across the diameter of display 1202, and orthogonal to the surface of puck 104.

In the embodiments illustrated in FIGS. 12A-F, while spinning, display 1202 can be controlled by one or more processing devices within puck 104 (e.g., a Qualcomm 835 SNAPDRAGON® or NVIDIA TEGRA® X1 processor). Puck 104 (via one or more processing elements) can transmit image data to display 1202 and cause display 1202 to generate a light field display due to the spinning of the display 1202. In some embodiments, puck 104 transfers image data to display 1202 at 300 frames per second, although the specific frame rate is not intended to be limiting. In one embodiment, puck 104 is capable of controlling raster lines on display 1202 in order to generate the light field display. Alternatively, or in conjunction with the foregoing, puck 104 can rapidly turn the display 1202 on and off, thus providing a holographic light field display via the spinning OLED display 1202.

In some embodiments, the puck 104 can change the contents of the display 1202 while spinning based on the position of a user. As discussed above, when the display 124 is rotating or spinning, the display 1202 can provide a light field display before a user while placed upon a flat surface. Additionally, in this embodiment, the puck 104 can be configured to track a user's eye movements and adjust the position and/or RPMs of the display 1202 as necessary. Additionally, the puck 104 can also track the user's position and update the content of the spinning display 1202 based on the position of the user.

Figure 12E:
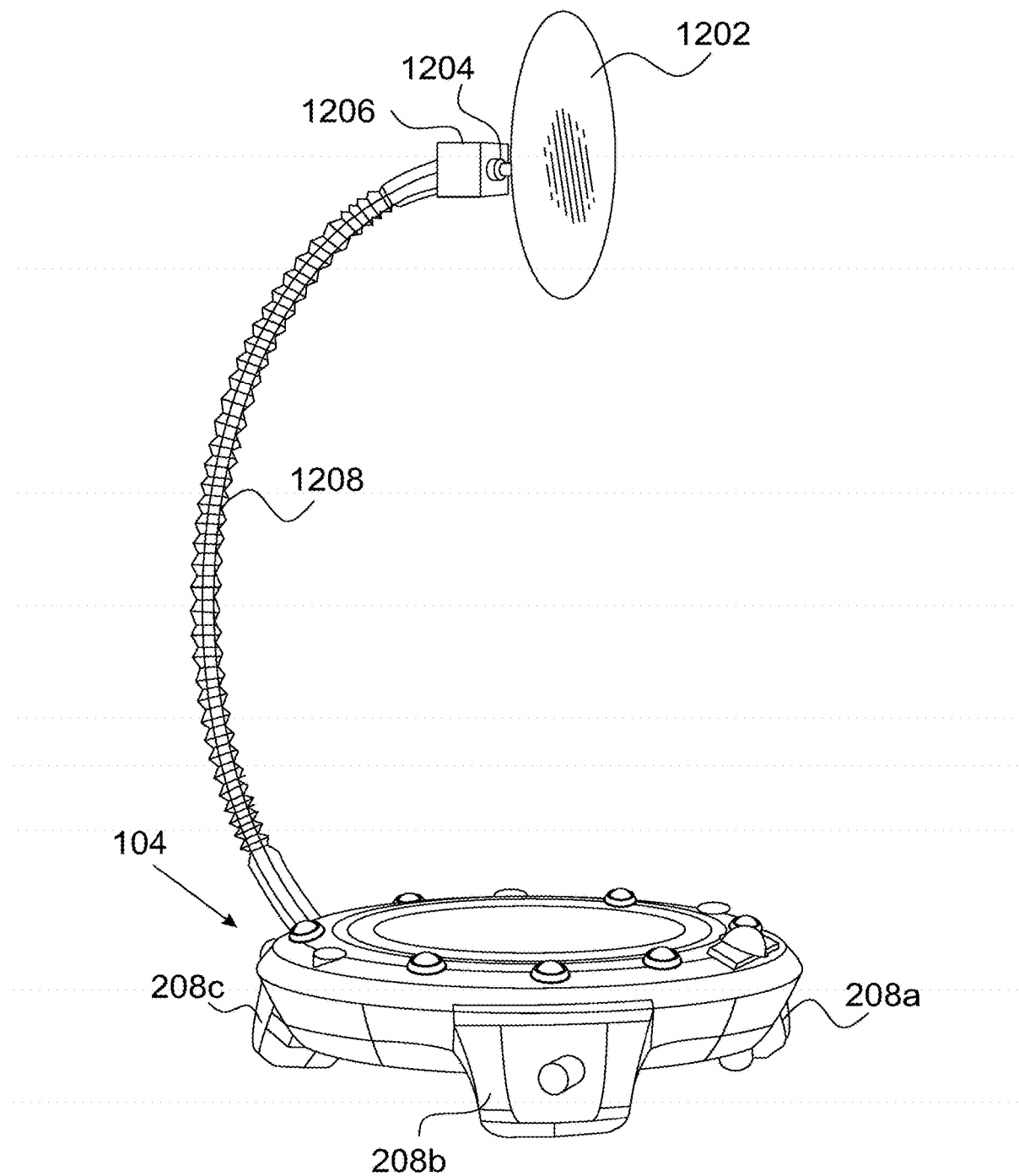
Figure 12F:
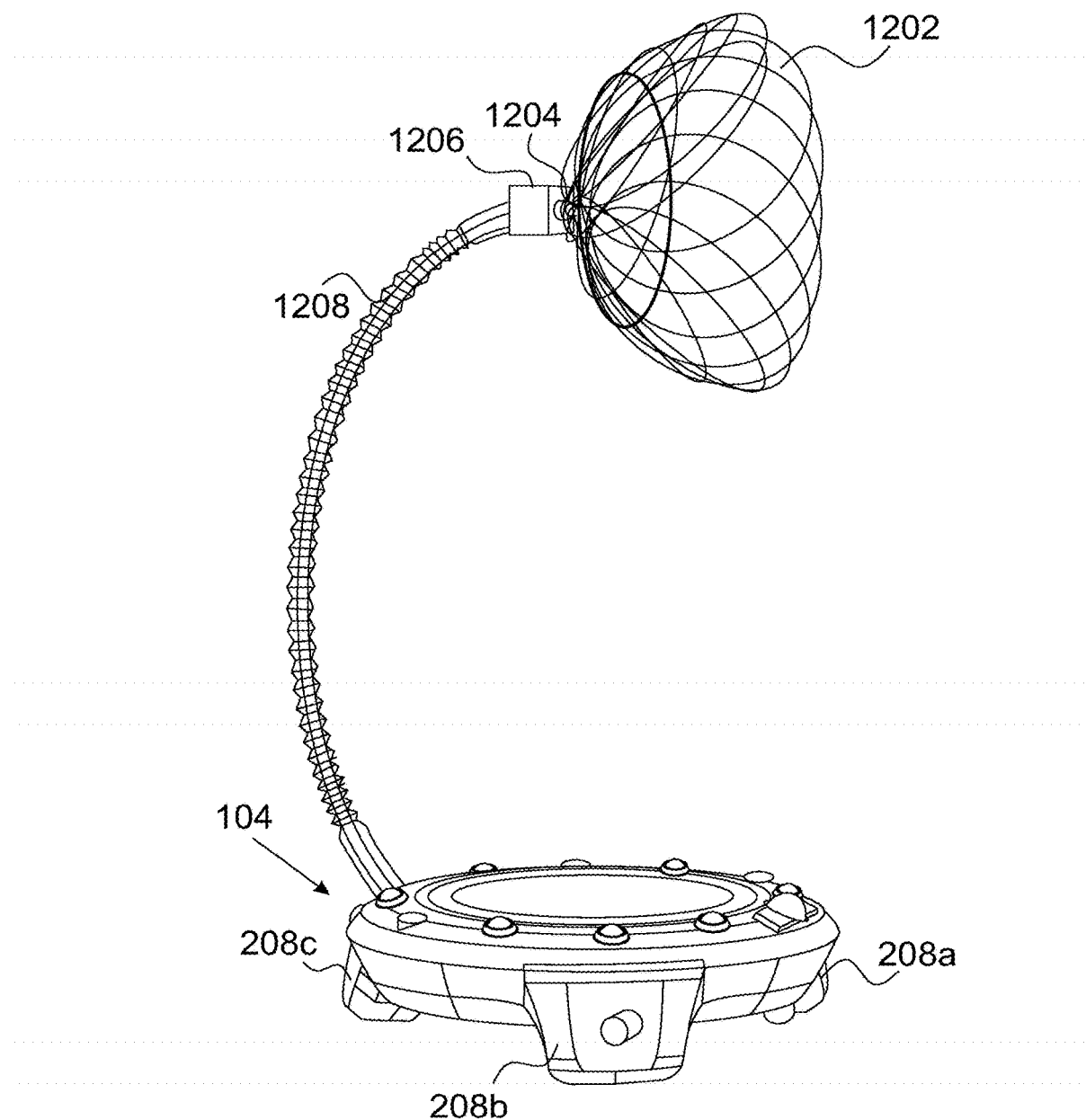
Figure 12G:
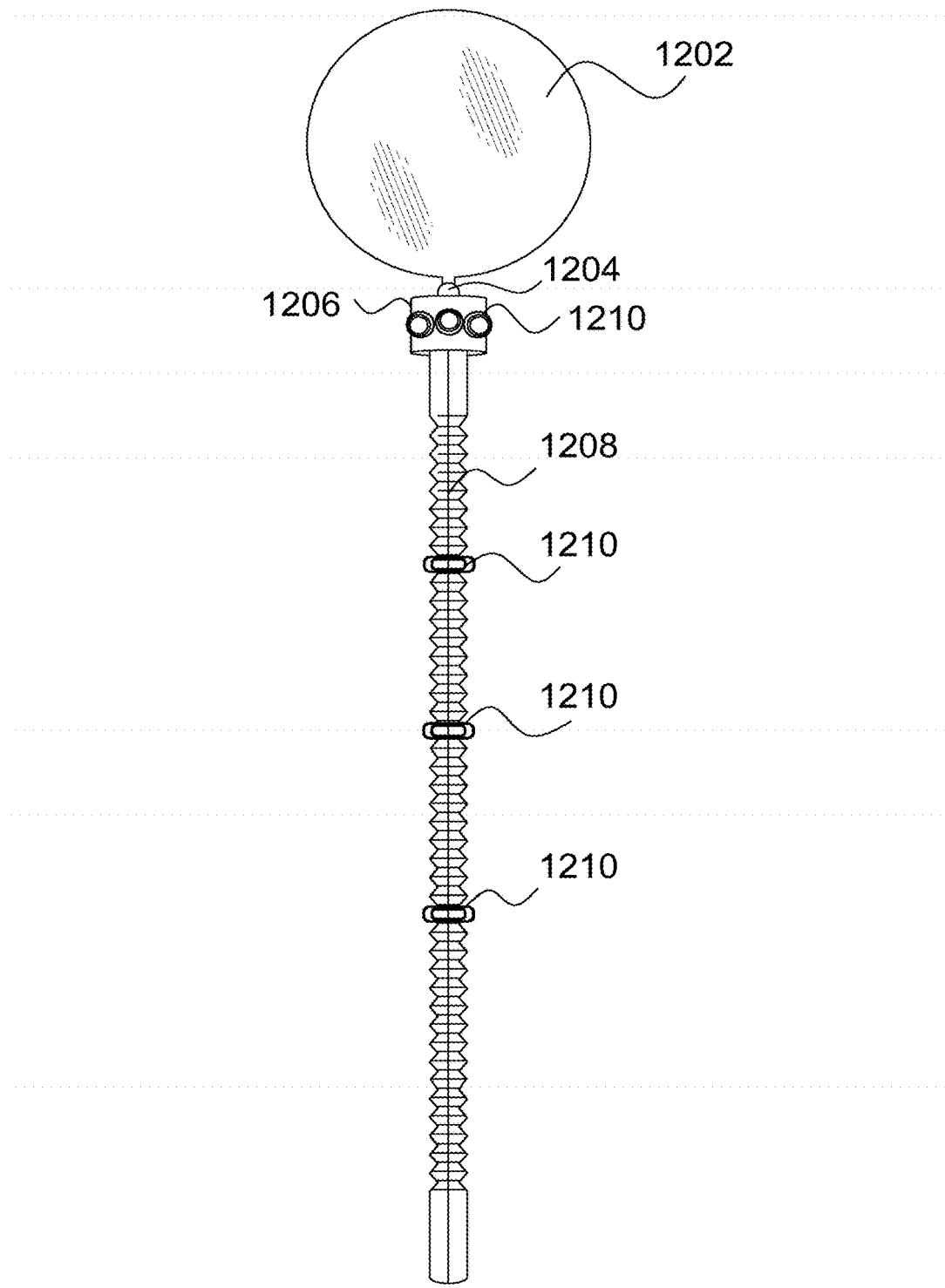

FIGS. 12E and 12F illustrate alternative embodiments of a puck with a wand-mounted display configured to act as a holographic, light field display, according to some embodiments of the disclosure.

As illustrated in FIG. 12E, display 1202 is connected to puck 104 via connection point 1204, casing 1206, and wand 1208 as discussed previously. In the illustrated embodiment, connection point 1204 can comprise a ball and socket connection point. In alternative embodiments, connection point 1204 can additionally include a hinged arm extending inward toward the center of display 1202 along a radius of display 1202. In this embodiment, the connection point 1204 can be configured to act as a hinge allowing the display 1202 to rotate in a circular motion as depicted in FIG. 12B as well as in a hinging motion depicted in FIG. 12F.

As illustrated in FIG. 12F, connection point 1204 allows for the movement of display 1202 inward and outward from an axis orthogonal to casing 1206. In the embodiment illustrated in FIG. 12F, display 1202 can be configured to move about both axes simultaneously, resulting in a funnel or bowl-shaped movement (appearing like a parabolic radar dish shape for example).

In some embodiments, wand 1208 includes various other components such as LED markers, OLED displays, QR codes, or reflective portions. As illustrated in FIG. 12G, wand 1208 can include LED or OLED markers 1210 at various positions of the wand 1208 including within the casing 1206 and at various points along the longitudinal axis of the wand 1208. In these embodiments, the various other components allow for puck 104 to track the wand 1208 (via camera devices on puck 104, as discussed previously). Specifically, puck 104 tracks the position and movements of wand 1208 via these various other components (e.g., LED markers). In these embodiments, wand 1208 can be utilized by a user as a laser pointer, "magic wand," drumstick, "lightsaber," or other handheld input mechanism. In some embodiments, when puck 104 tracks the position of wand 1208, the position of wand 1208 can be utilized to update a three-dimensional display. In some embodiments, the position of wand 1208 can be utilized to generate a digital representation of wand 1208 in a three-dimensional scene. For example, a three-dimensional game (e.g., a "wizard"-oriented game) can be displayed by the VR/AR device (e.g., via goggle portion 110 or a display 1202) while the wand 1208 can be tracked and utilized as a "magic wand" which can be displayed before the user in the game as an controllable input (e.g., in a first-person shooter mode). In some embodiments, wand 1208 can be given to other users and tracked in similar manners. In some embodiments, since a VR/AR device is equipped with pucks (and thus, two wands), one user can utilize a first wand while another utilizes a second wand. In this embodiment, a wand 1208 manipulated by a second user can be tracked and represented in a three-dimensional display.

FIG. 12H is a system diagram illustrating a system for controlling a movable wand according to some embodiments of the disclosure.

As illustrated in FIG. 12H, SoC 1212 is connected to motor controller 1214. In some embodiments, SoC 1212 can comprise a Qualcomm 835 SNAPDRAGON®, or the NVIDIA TEGRA® X1 processor as discussed previously. In embodiments, SoC 1212 is located within a puck as discussed previously.

As described above, SoC 1212 is communicatively coupled to motor controller 1214. In one embodiment, motor controller 1214 can comprise a microcontroller, microprocessor, programmable logic controller or other suitable electronic device configured to operate motor 1216. In the illustrated embodiment, SoC 1212 transmits data to motor controller 1214 to control the speed (e.g., RPMs) of the motor 1216 via motor controller 1214. In one embodiment, motor 1216 may comprise any suitable electric motor.

A grey code wheel 1218 is connected to one or more of the gears on motor 1216. Use of a grey code wheel 1218 allows the system to monitor the precise position (e.g., rotational position) of the external gear of motor 1216. Encoder 1220 is configured to read the grey code wheel 1218 and generate a digital representation of the position of the gear of motor 1216. Encoder 1220 transmits this position to motor controller 1214 which transmits the positional information to SoC 1212.

As illustrated above, the SoC 1212 controls the speed of the motor 1216 and is informed by motor controller 1214 (via encoder 1220) of the precise rotational position of the motor 1216. As discussed previously, a gear of motor 1216 is connected to an OLED display via a driveshaft or similar apparatus. Thus, SoC 1212 (through encoder 1220) is constantly updated with the precise angle of the OLED display 1222, enabling the SoC or other controller to send video data to the rotating OLED appropriate to its location to create holographic or other light field or video display effects.

SoC 1212 is additionally communicatively coupled to OLED display 1222 via a MIPI, SIPI or similar connection. In the illustrated embodiment, SoC 1212 drives the display on OLED display 1222 via this connection. Since SoC 1212 know the precise position and angle of OLED display 1222, SoC 1212 updates the display of OLED display 1222 based on this position information in order to generate a holographic display as discussed previously. Additionally, SoC 1212 receives other inputs that may be used to adjust the display of OLED display 1222 such as the position of a user, the eye position of a user, ambient lighting conditions, and other inputs as discussed previously.

FIGS. 13A-F illustrate a puck with a display configured to act as a vapor-based holographic, light field display, according to some embodiments of the disclosure.

Figure 13A:
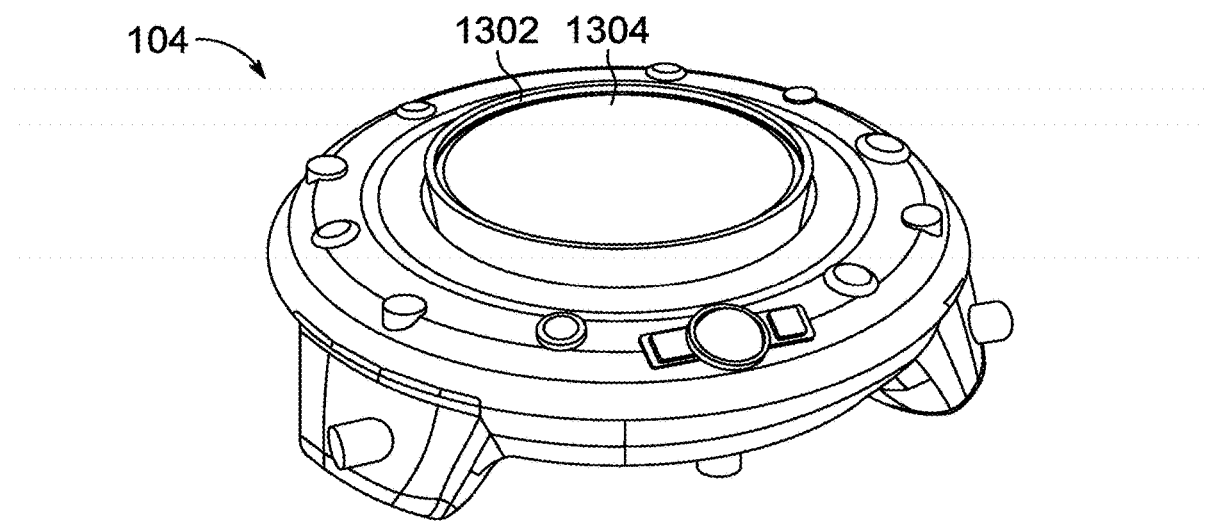
FIGS. 13A-F illustrate a puck with a display configured to act as a vapor-based holographic, light field display, according to some embodiments of the disclosure.

FIG. 13A illustrates a vapor projection component 1302 nested in a cavity of puck 104. In this embodiment, vapor projection component 1302 can be detached and attached to cavity of puck 104. In one embodiment, vapor projection component 1302 connects to puck 104 via a USB-C® or other wired connection on the bottom of vapor projection component 1302 and on the outer surface of the inner cavity of puck 104.

As illustrated in FIG. 13A, vapor projection component 1302 includes a surface 1304 capable of emitting one or more jets of vaporized water or heated air. Operation of the vapor projection component 1302 via surface 1304 is described more fully in connection with FIGS. 14A-E.

Figure 13B:
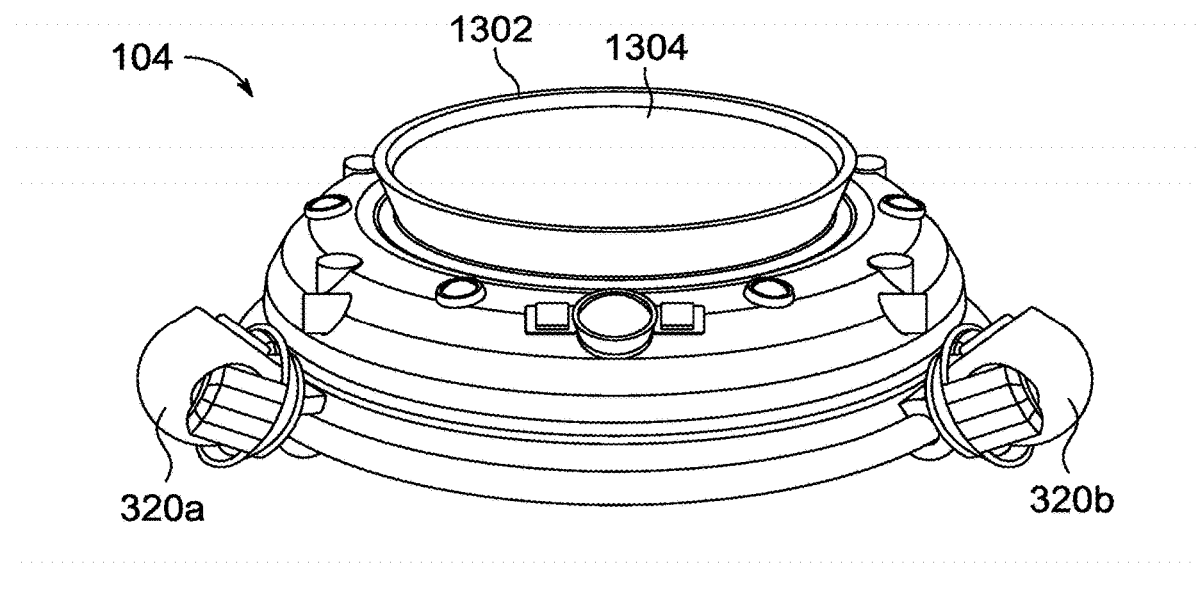
Figure 13C:
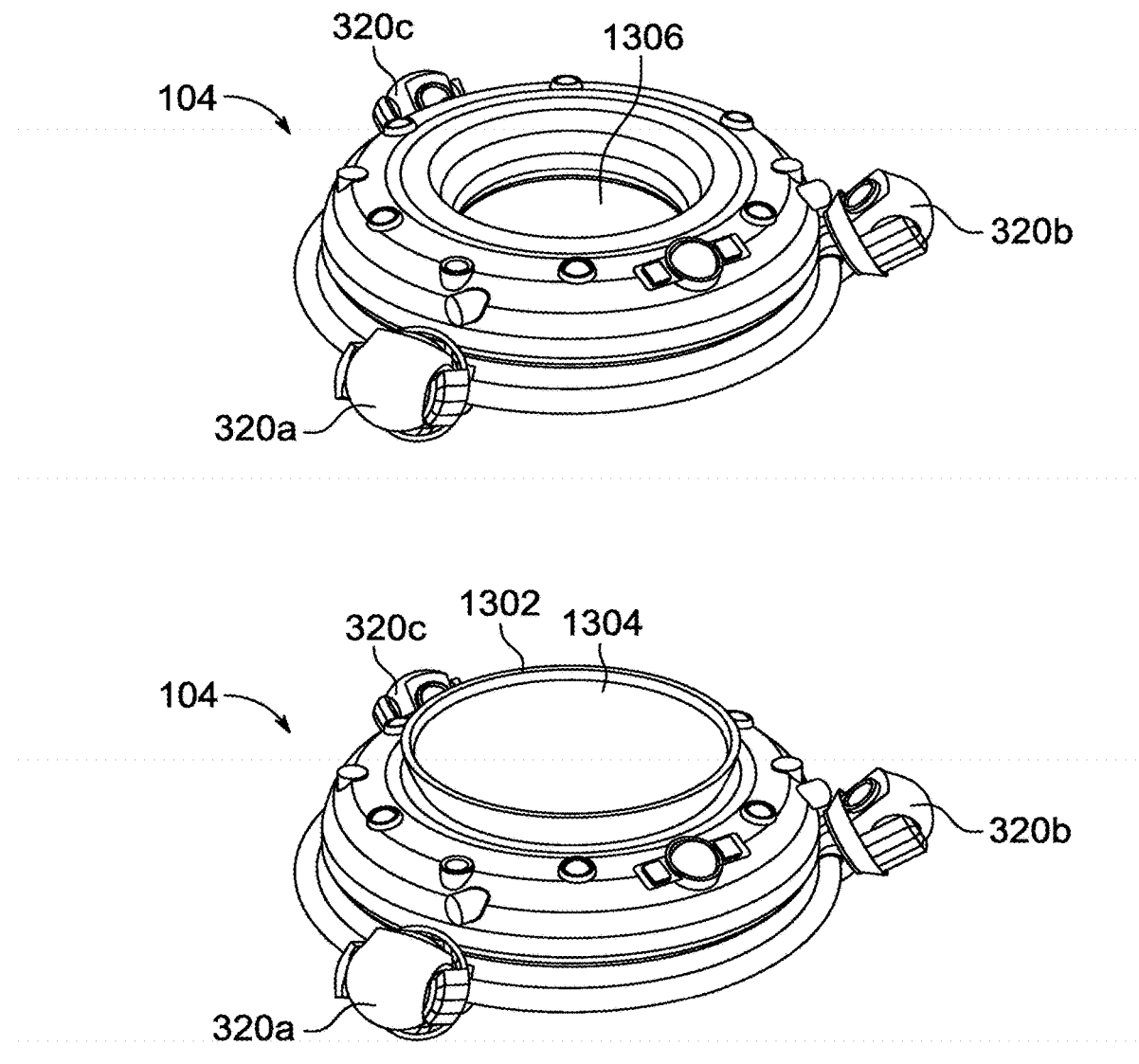

FIG. 13B illustrates an alternative configuration of a vapor-based holographic, light field display. In the illustrated embodiment, vapor projection component 1302 is inserted into a cavity of puck 104. During operation, one or more jets of vaporized water or heated air are expelled outwardly from the surface 1304 of vapor projection component 1302 and into the air above the puck 104. In some embodiments, as discussed more fully herein, the jets of vaporized water (or heated air) may form various shapes such as a line, cylinder, column or other solid.

During the operation of the vapor jets, the puck 104 displays images via projectors 320*a-c*. By projecting appropriately controlled light beams onto a stream of vapor jets, puck 104 can display a holographic projection into the air above it containing the vaporized water as illustrated in more detail in FIGS. 13D-F. In some embodiments, projectors 320*a-c* are movable and may adjust their angle based on tracking the user, the vapor pattern or other needs. In one embodiment, projectors 320*a-c* are under the control of one or more processing elements in puck 104. In this embodiment, puck 104 may coordinate the display projected by projectors 320*a-c* with the active vapor jets as discussed more fully in connection with FIGS. 14A-E.

FIG. 3C illustrates the insertion of vapor projection component 1302 according to some embodiments of the disclosure. In the illustrated embodiment, vapor projection component 1302 can be removed from puck 104 resulting in a cavity 1306 being present in puck 104. In some embodiments, cavity 1306 can be configured as a universal receptacle (e.g., via a USB-C® interface) to receive vapor projection component 1302 and other components fitted to the dimensions of the cavity 1306. In some embodiments, vapor projection component 1302 can be configured to rotate as needed when placed in cavity 1306. In this embodiment, processing elements in puck 104 coordinate the display from projectors 320*a-c* to enable a rotating display on the vapor jets expelled from surface 1304.

Figure 13D:
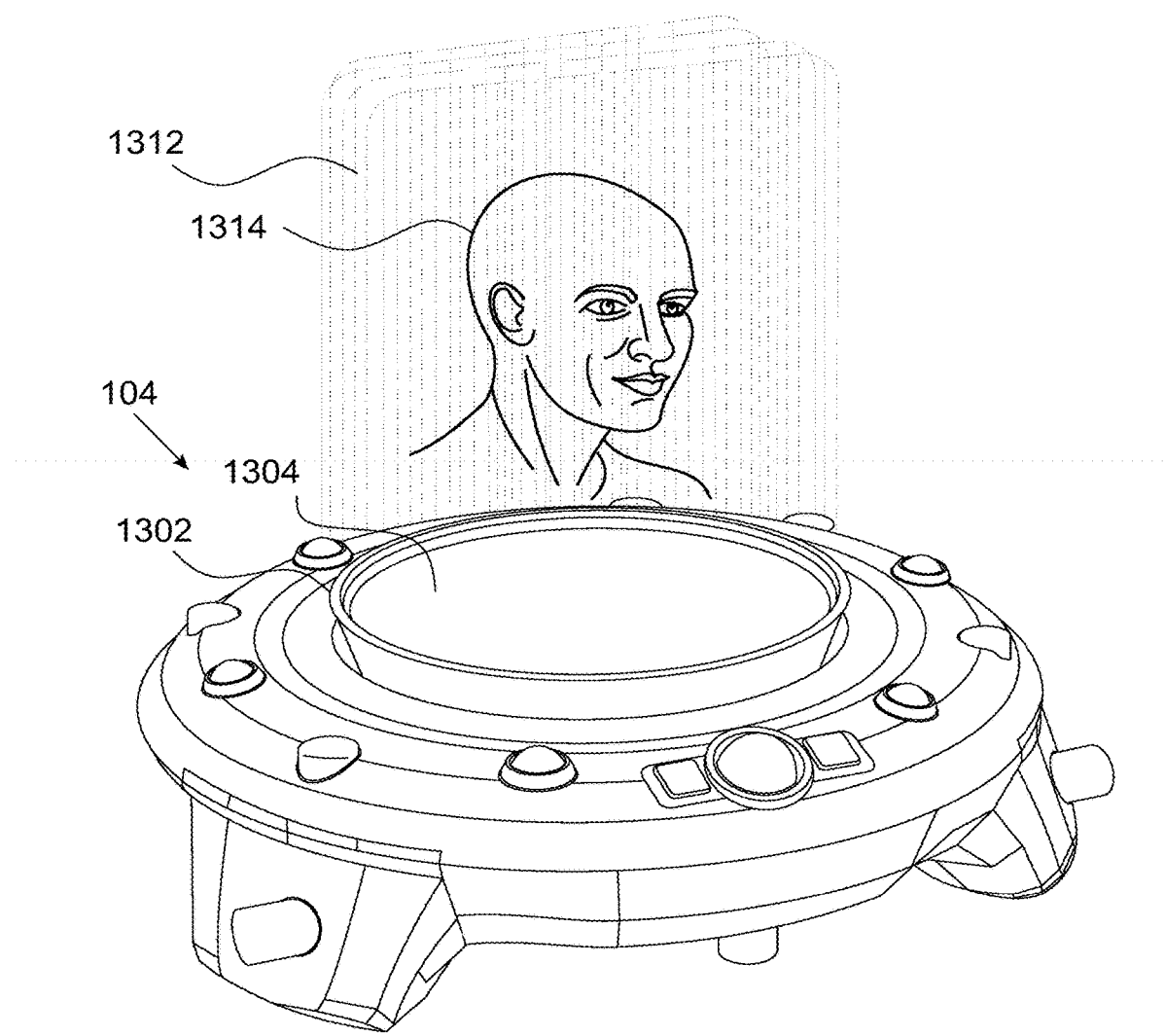
Figure 13E:
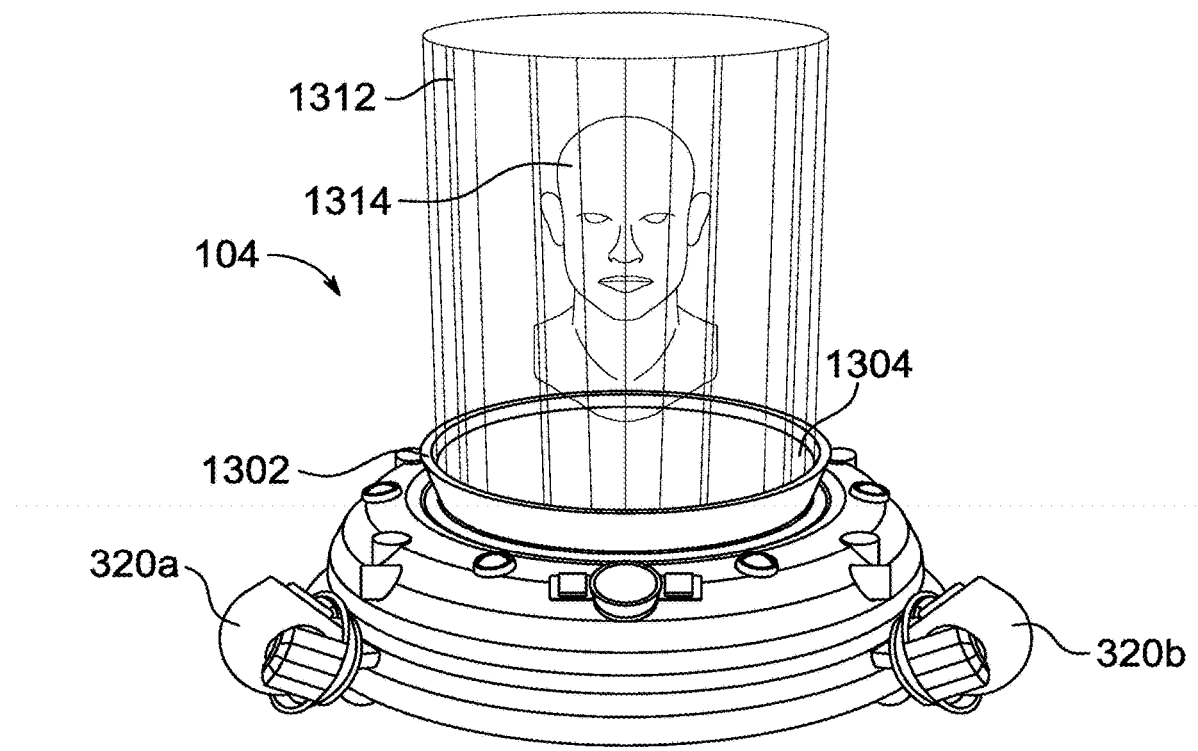
Figure 13F:
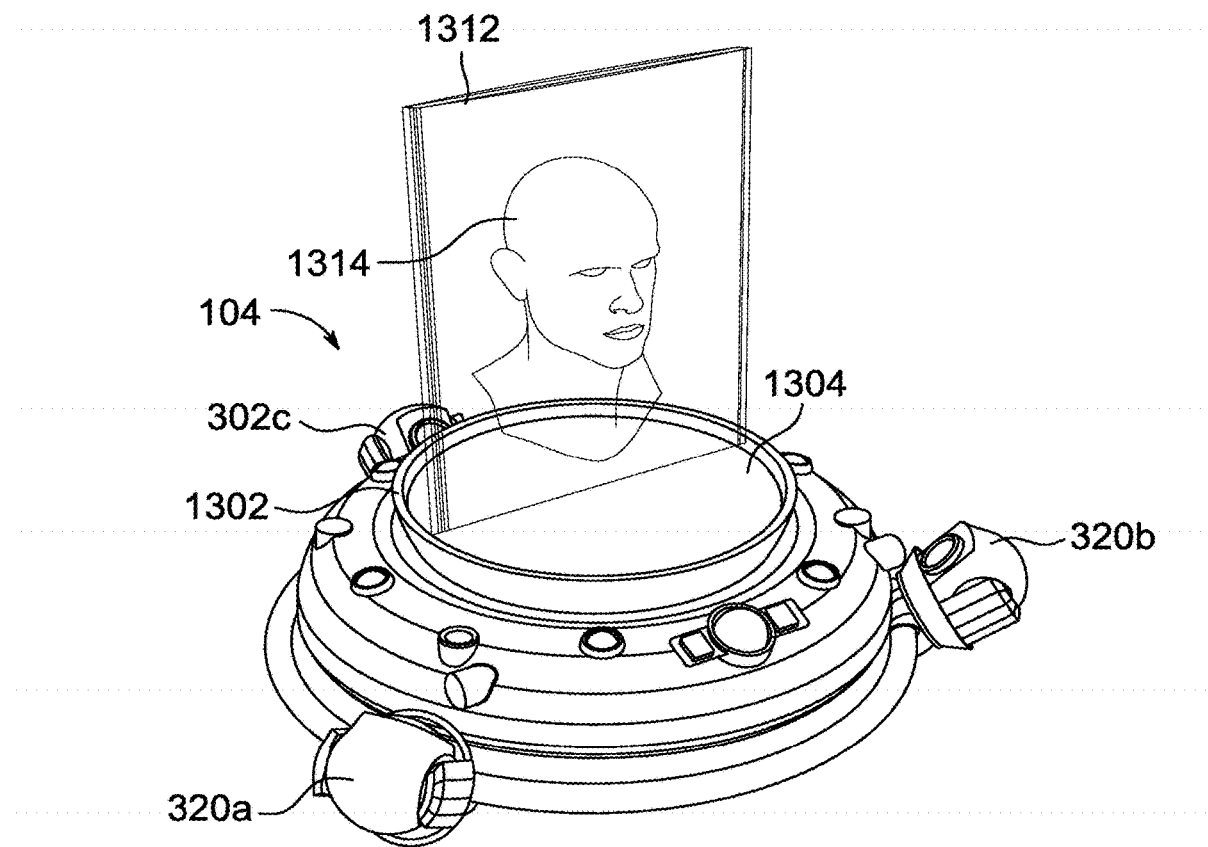

FIGS. 13D-F illustrate various vapor-based projections from a puck according to some embodiments of the disclosure.

FIGS. 13D and 13E illustrate a cylindrical or columnar projection of vapor jets 1312 from surface 1304. In some embodiments, surface 1304 may include multiple apertures for allowing streams of vapor to be emitted from vapor projection component 1302. In some embodiments, the streams of vapor may be emitted in a timed fashion. As illustrated, a projection 1314 can be displayed by one or more projectors present on puck 104. In one embodiment, streams of vapor may be staggered rapidly to simulate a single projection of vapor. That is, certain subsets of the apertures in surface 1304 may be activated via a mask or screen in a timed and coordinate fashion. In this manner, the projection may likewise be timed such that the projection is coordinate with the apertures being activated at any given moment.

FIG. 13F illustrates an alternative vapor-based projection from a puck according to some embodiments of the disclosure.

As illustrated in FIG. 13F, a vapor projection component 1302 is configured to expel vapor from surface 1304 in a single line of jets resulting in a planar jet "sheet." 1312. In one embodiment, surface 1304 contains a matrix of apertures while a movable belt drags a mask across the surface 1304 enabling only a single row of apertures at a time. Operations of a belt-based jet system are described more fully in connection with FIGS. 14A-E. As illustrated, projectors 320*a-c* are configured to project one or more images on a sheet 1312 of vapor jets. In one embodiment, the images projected by projectors 320*a-c* can be appropriately timed based on which row of surface 1304 is activated.

FIGS. 14A-E illustrate a vapor-based projection puck according to some embodiments of the disclosure.

Figure 14A:
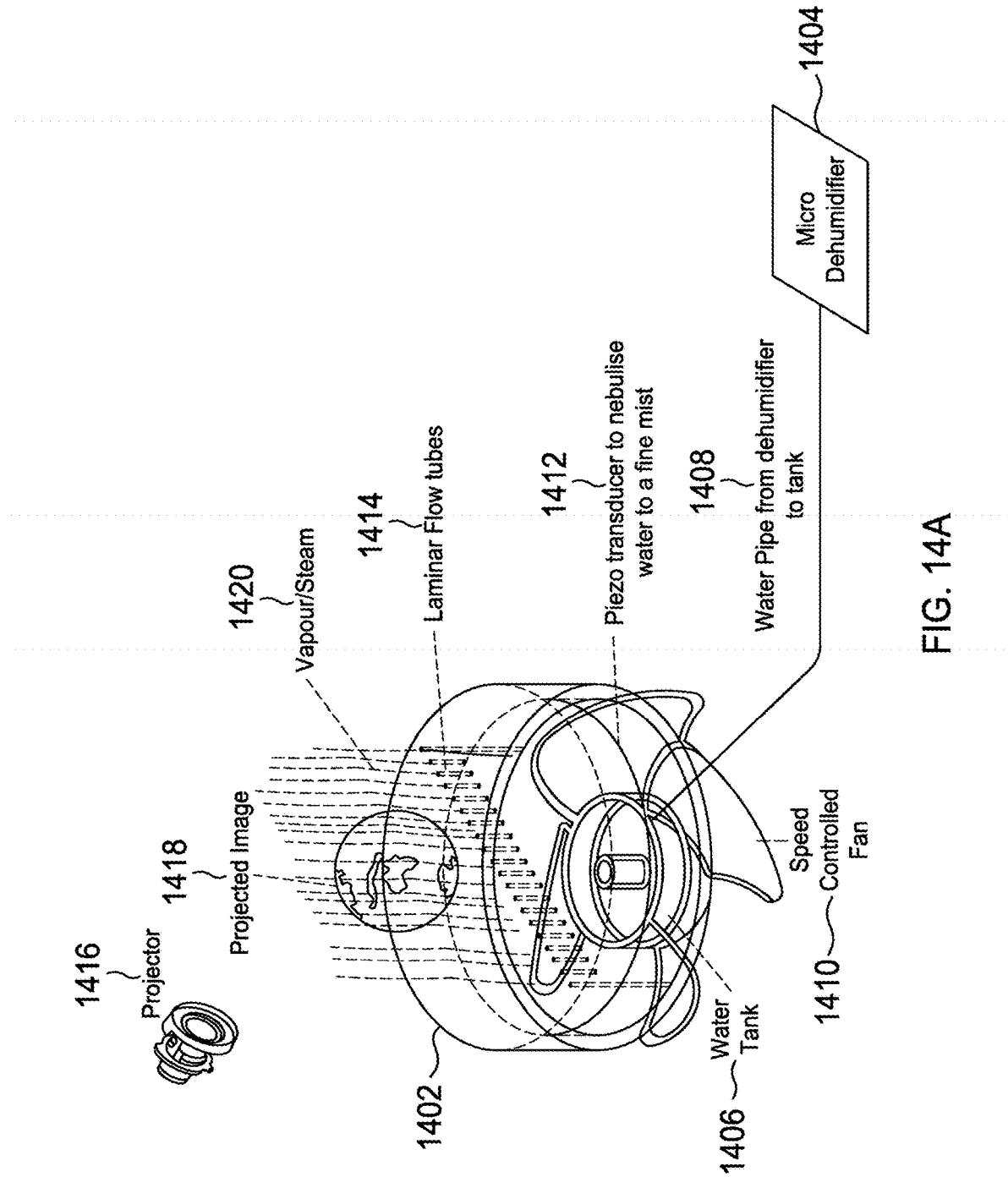
FIGS. 14A-E illustrate a vapor-based projection puck according to some embodiments of the disclosure.

FIG. 14A illustrates a fixed planar vapor-based projection puck according to some embodiments of the disclosure.

As illustrated in FIG. 14A, a vapor projection module 1402 is configured to project vapor (or steam) upward to allow for the projection of an image. As discussed previously, vapor projection module 1402 is centered within a cavity of a puck and can be inserted and removed as needed.

In the illustrated embodiment, a micro dehumidifier 1404 is used to extract water vapor from the air. In some embodiments, micro dehumidifier 1404 comprises a solid-state micro dehumidifier. In one embodiment, micro dehumidifier 1404 is placed within a puck. In alternative embodiments, micro dehumidifier 1404 is placed within or on other components of a VR/AR device such as the headband. In some embodiments, micro dehumidifier 1404 is capable of being controller by a processor (or other device) within a puck or within a VR/AR device. For example, micro dehumidifier 1404 can be turn on or off based on the water level of water tank 1406. In alternative embodiments, micro dehumidifier 1404 can be coupled to a reservoir connected to pipe 1408 and situated between fan 1410 and dehumidifier 1404. In this embodiment, the reservoir can store water and be controlled by a processing element to refill tank 1406 as needed. In some embodiments, the reservoir is located in other portions of a VR/AR device such as headband portion discussed previously.

Micro dehumidifier 1404 is connected to water tank 1406 via water pipe or tube 1408. In one embodiment, water pipe 1408 comprises a flexible tube that is capable of routing water from micro dehumidifier 1404 to water tank 1406. In some embodiments, water pipe 1408 can be routed from a headband portion of a VR/AR device to water tank 1406. In the illustrated embodiment, water tank 1406 is located within a puck device. As discussed previously, water tank 1406 can include one or more sensors that monitor the water level in the tank 1406. In some embodiments, a processing device within the puck can monitor the water level of tank 1406 and/or can control the operation of micro dehumidifier 1404 based on the detected water level.

Piezo transducer 1412 atomizes the water and rapidly converts the liquid water into liquid vapor or steam. In some embodiments, transducer 1412 can be submerged and fixedly connected to the edges of tank 1406. In some embodiments, transducer 1412 may be fixed to the bottom of tank 1406. In some embodiments, transducer 1412 is not connected to tank 1406 and rests within tank 1406. As illustrated, vapor projection module 1402 may be partially covered with the exception of a single row of laminar flow tubes 1414.

Fan 1410 is located beneath water tank 1406. In the illustrated embodiment, fan 1410 comprises a speed-controlled fan. In some embodiments, fan 1410 is controlled by a processor in a puck or in other components of the VR/AR device. In some embodiments, processor monitors the operation of fan and utilizes the operational status of the fan to control the projection from projector 1416. For example, a processing device in a puck can toggle projections on or off based on detecting whether the fan is operating or not operating, respectively. Although illustrated as an external device, projector 1416 can comprise projection devices (e.g., 320*a-c*) on the puck itself as discussed previously or on a wand or arm that connects to the puck. In this embodiment, the projection devices (e.g., 320*a-c* or 1416 as shown) are capable of being directed inward such that projector(s) are pointed toward the sheet 1420 of vapor. Operational aspects of projection devices 320*a-c* are discussed previously and the disclosure of the operation of projection devices is incorporated herein in its entirety.

Fan 1410 is controlled by one or more processors and blows air upward and outward away from the fan and towards top surface of vapor projection module 1402. As described previously, transducer 1412 atomizes the water and rapidly converts the liquid water into liquid vapor or steam. While transducer 1412 is atomizing the water and generating vapor or steam, fan 1410 can be operated to blow the vapor or steam upward and out of vapor projection module 1402 via the laminar flow tubes 1414 due to the positive pressure exerted by the air flow generated by fan 1410.

As described further herein, various other openings may be utilized. In the embodiments, where vapor projection module 1402 is partially covered, all vapor is blown from the tank 1406 to the laminar flow tubes 1414. Thus, at each row of tubes 1414, jets of vapor 1420 are expelled outward from the upper surface of vapor projection module 1402. Thus, when fan 1406 is operating, a row of vapor jets 1420 is expelled forming a "sheet" of jets.

While fan 1406 is blowing the sheet of vapor jets 1420 through tubes 1414, a projector 1416 can be configured to project an image 1418 on the vapor sheet. In the illustrated embodiment, due to the surface area and change in the refractive index of each droplet of water vapor, a projected image can be displayed on the sheet of jets 1420. Since the droplets are likewise transparent or substantially translucent, the resulting projection 1418 appears as a "floating" hologram above puck 104.

Figure 14B:
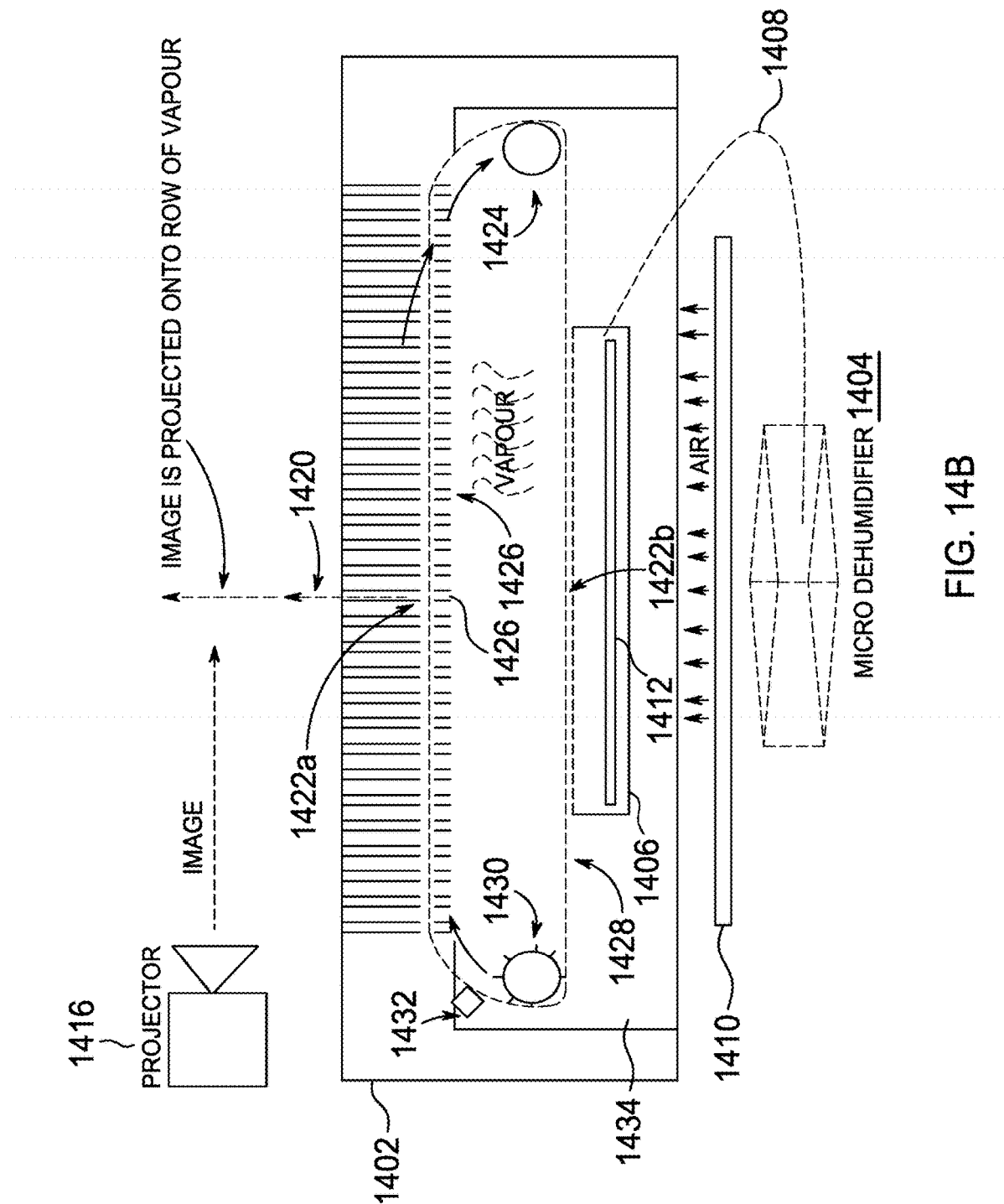

FIG. 14B illustrates an alternative embodiment of a vapor projection system according to some embodiments of the disclosure.

As illustrated in FIG. 14B, a micro dehumidifier 1404 supplies water to tank 1406. Transducer 1412 can be activated (e.g., powered by a processing element in a puck) to nebulize the water and rapidly convert the liquid water into liquid vapor or steam such that the vapor or steam begins to fill chamber 1434. A variable speed fan 1410 blows air into chamber 1434 which projects the vapor upward via positive pressure exerted by the fan's air flow. A sheet of vapor 1420 is expelled upward from the surface of the module wherein an image is projected by a projector 1416 on the sheet 1420. The operation of the aforementioned components is described more fully in connection with FIG. 14A and the detailed disclosure of these components is included herein by reference.

Notably, FIG. 14B illustrates the use of a motor-based conveyor belt to selectively choose a row of jets (e.g., row 1426) to activate (provide fluid communication to expel vapor) at any given time. As will be described herein, apertures 1422a, 1422b act as a "mask" wherein vapor is selectively emitted from the surface of vapor projection module 1402 only on a row of tubes aligned with the apertured mask.

Figure 14C:
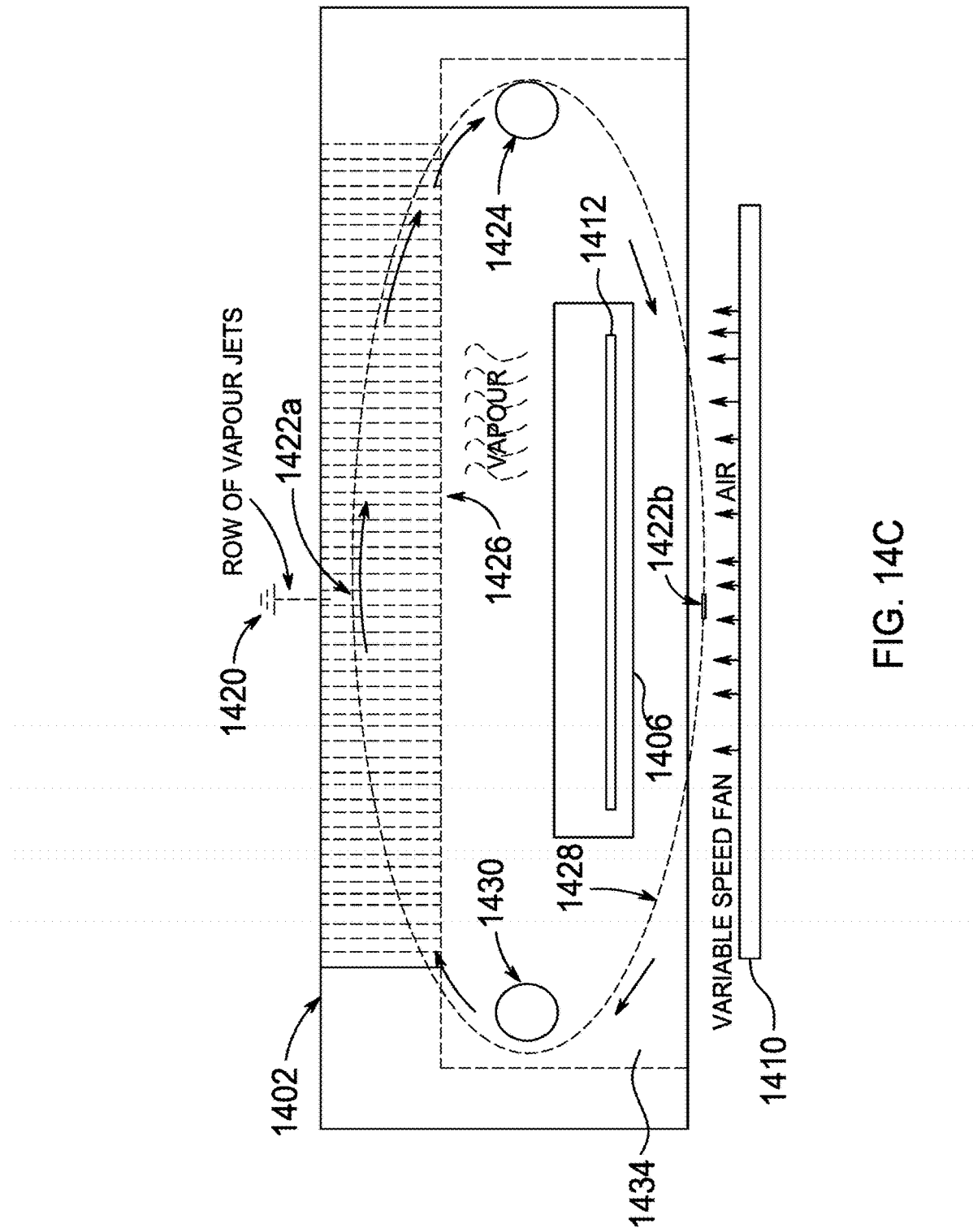

As illustrated in FIG. 14B, a conveyor belt assembly includes a motor 1430 and a roller 1424 that holds a belt 1428. Belt 1428 can be comprised of a low friction flexible material such as for example PTFE, as can belt guides to guide the belt as it traverses the interior of the puck. FIG. 14B illustrates an encoder 1432 which can be utilized to monitor the position of the belt and in turn identify which row of vapor jets is active at a given moment. In some embodiments, encoder 1432 transmits this information to a processing device within a puck to coordinate the display of images on the sheet of vapor as discussed previously. FIG. 14C illustrates a belt 1428 with multiple apertures (e.g., 1422a) which may be utilized to project multiple streams of vapor simultaneously.

On belt 1428 are at least two apertures 1422a, 1422b. In the illustrated embodiment, the width of apertures 1422a, 1422b are sized to match the width of each of the laminar flow tubes such as the row of tubes 1426. As discussed in connection with FIG. 14A (and illustrated in more detail in FIGS. 14D and 14E), vapor projection module 1402 can include a grid of identically sized flow tubes that provide a matrix-like outlet for vapor jets as described herein. As illustrated, the belt 1428 includes two apertures on opposite sides of belt 1428. By positioning the apertures 1422a-b in this manner, one aperture 1422a or 1422b is positioned below a tube at any given moment.

During operation, tank 1406 is filled (either partially or fully) from micro dehumidifier 1404. Once the tank 1406 is suitably filled, a user of a device (e.g., a puck) may initiate operation of the vapor projection module 1402. In some embodiments, the vapor projection module 1402 may be started programmatically. Once initiated, the transducer 1412 is activated and begins nebulizing the water to generate steam or vapor within chamber 1434. Simultaneously, the motor 1430 begins to rotate, thus moving the apertures 1422a, 1422b across the tubes. While moving, encoder 1432 notes the belt position and records the active row of tubes and transmits this information to a processing device. As the apertures 1422a-b move across the tubes, fan 1410 is started and air fills chamber 1434 and exert positive pressure on the steam in chamber 1434. The positive pressure causes the vapor/steam to be pushed outward away from transducer 1412 and tank 1406 toward the matrix of tubes. Due to the aperture 1422a, the expelled vapor is forced to row of tubes 1426 and exerted as a single row of vapor, thus forming a vapor sheet (as depicted in FIG. 13F). Since the belt 1428 is in motion, the sheets of vapor are initially expelled from the far left side of vapor projection module 1402 and proceed in a time series of sheets until reaching the right side of vapor projection module 1402 until restarting from the left side again. In some embodiments, belt 1428 can be configured to move backward and forward versus in a circular motion. As illustrated, the process "restarts" when aperture 1422a reaches the rightmost row of tubes. On the next rotation, aperture 1422b is thus placed at the left most row of tubes. The process repeats until stopped by the vapor projection module 1402 (e.g., manually or until tank 1406 is empty). In some embodiments, vapor projection module 1402 can be equipped with additional air vents to selectively project air from fan 1410 upward and away from the surface of the vapor projection module 1402 in order to clear vapor or steam from above the vapor projection module 1402.

Figure 14D:
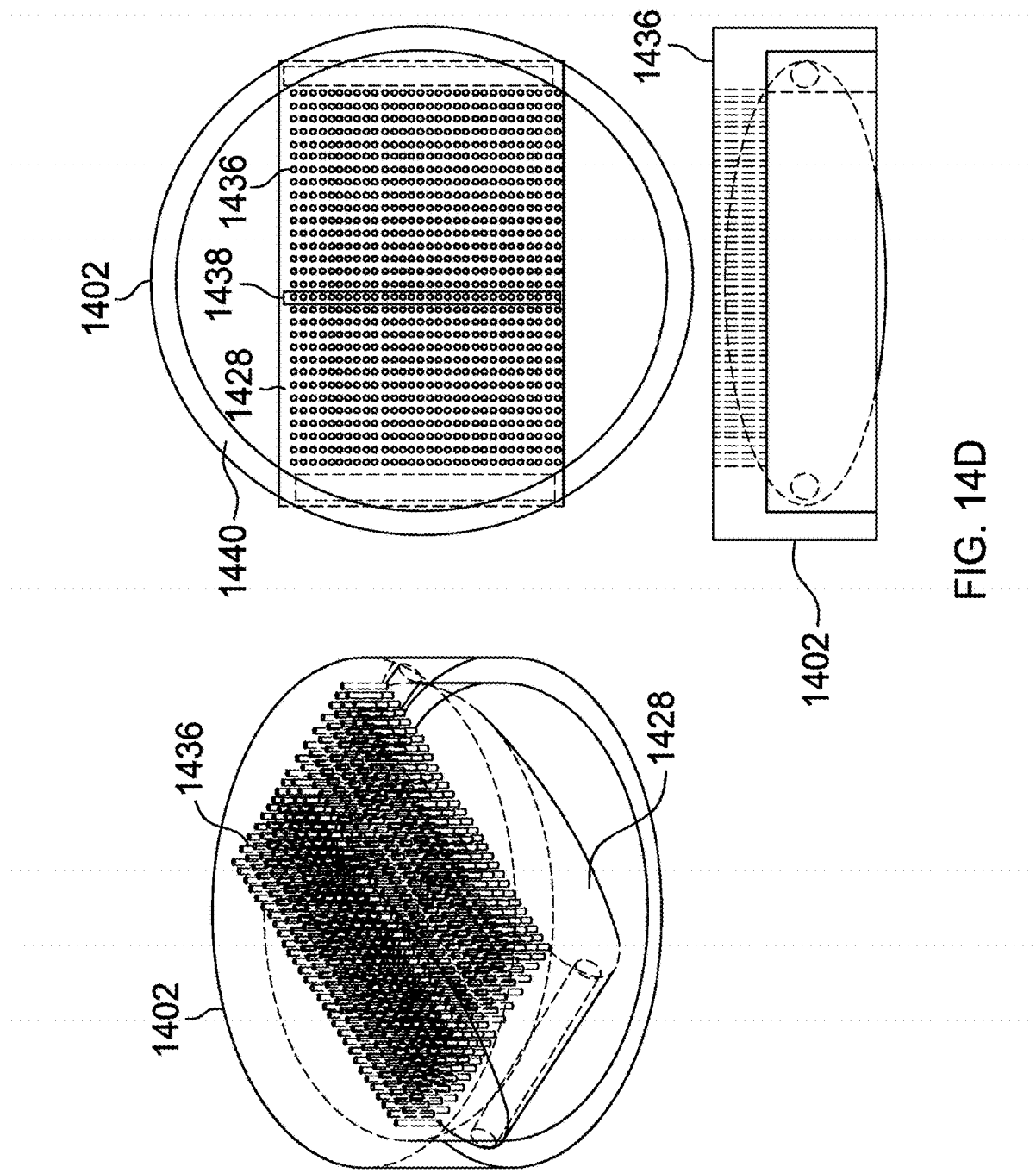
Figure 14E:
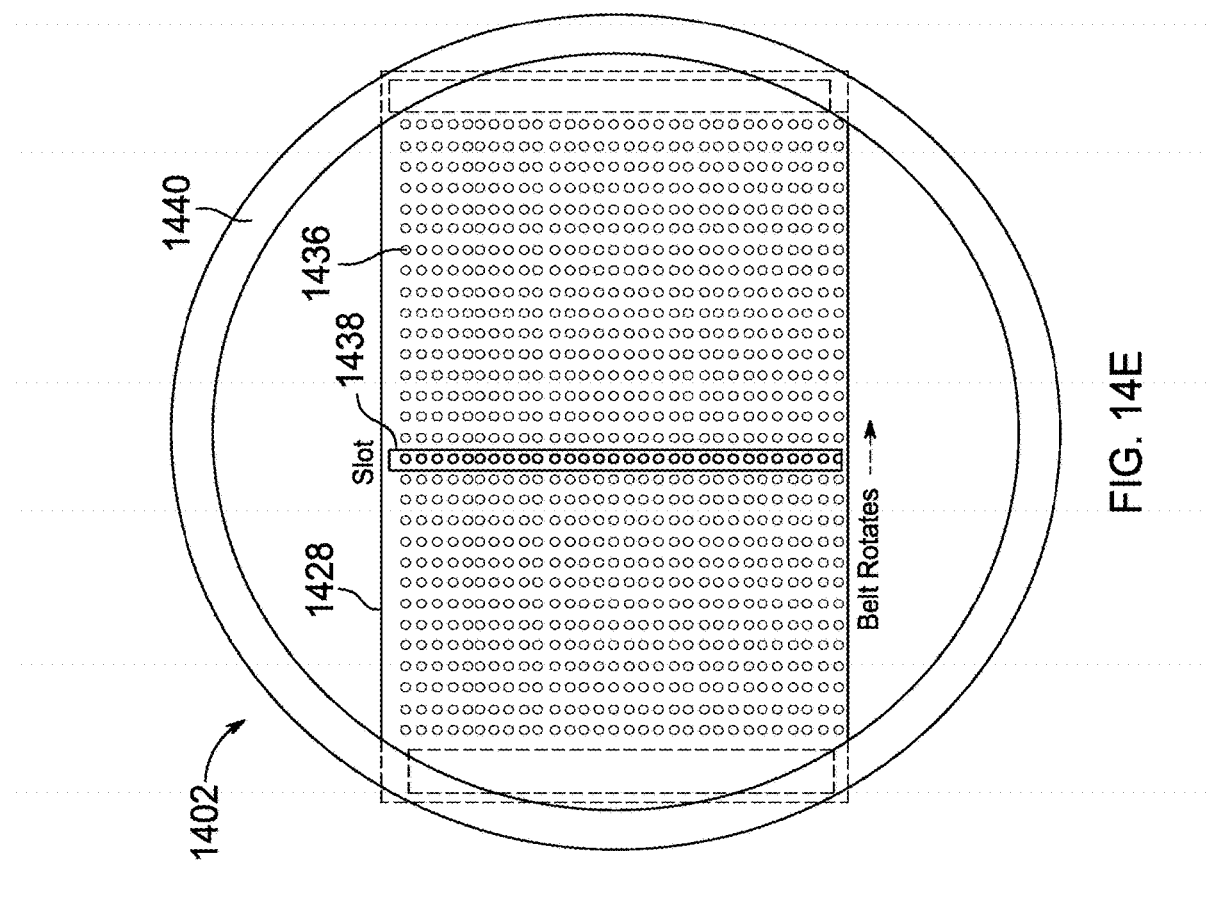

FIGS. 14D and 14E illustrate a matrix of laminar tubes used by a vapor-based projection puck according to some embodiments of the disclosure.

As illustrated in FIGS. 14D and 14E, a matrix of tubing 1436 is placed above a conveyer belt apparatus including belt 1428. In the illustrated embodiment, the conveyer belt apparatus is similar to that described in connection with FIGS. 14B and 14C. As discussed previously, an aperture 1422a, 1422b is moved across matrix of tubing 1436.

FIGS. 14D and 14E illustrate a row or slot of active tubes 1438 corresponding to the aperture at a given moment. Notably, row 1438 is intended to highlight the active row and does not constitute a physical structure. In contrast, the remainder of belt 1428 (the portion excluding row 1438) acts as a cover to the remainder of the matrix of tubes 1436. As illustrated in FIG. 14B and D, in one embodiment, the belt 1428 can be configured to bisect the matrix 1436. In alternative embodiments, the belt 1428 can be situated beneath the matrix of tubes 1436.

Additionally, as illustrated in FIGS. 14D and 14E, the matrix 1436 can be situated beneath a rim 1440 of the external opening of vapor projection module 1402. In the illustrated embodiment, the matrix 1436 is partially occluded by the rim 1440, forming a letterbox shape.

In another embodiment (not shown) instead of a belt a circular disk with a slot formed therein along a diameter thereof may be caused to rotate over the tube matrix 1436 to create a rotating plane of vapor to be projected on. A motor can drive the disk via a gear configured along the circumferential edge of the disk, and a controller can track the location of the slot as it rotates to in turn direct the appropriate projection on the rotating sheet of vapor in like manner to other embodiments described herein.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A device comprising:
   a housing comprising a processor disposed within the housing;
   a vapor projection component disposed within a center of the housing and communicatively coupled to the processor, the vapor projection component comprising:
   a water tank situated on the interior side of the vapor projection component,
   a set of tubes position on the exterior side of the vapor projection component,
   a transducer configured to nebulize water in the water tank,
   a movable belt comprising a plurality of apertures movable respective to the set of tubes,
   a variable speed fan configured to exert positive pressure on the nebulized water while the transducer nebulizes the water in the water tank and force the nebulized water through the apertures and the set of tubes so as to generate a set of nebulized vapor jets extending outward from the surface of the vapor projection component; and
   a projection device configured to display an image on the nebulized vapor jets.

2. The device of claim 1, the vapor projection component comprising a component detachable from the housing.

3. The device of claim 1, the vapor projection component connected to the housing via a USB-C connection.

4. The device of claim 1, the projection device movable with respect to the housing and the processor configured to move the projection device based upon tracking a position of a user.

5. The device of claim 1, the vapor projection component rotatable while disposed within the housing.

6. The device of claim 1, the set of nebulized vapor jets comprising a generally columnar formation of nebulized vapor jets.

7. The device of claim 1, the processor further configured to adjust the speed of the movable belt according to a timed pattern.

8. The device of claim 7, the processor further configured to stagger the exertion of the nebulized vapor jets, the staggering comprising selectively activating the apertures via a mask or screen.

9. The device of claim 1, the vapor projection component further comprising a micro dehumidifier, the micro dehumidifier configured to extract water vapor from air surrounding the device and deposit the water vapor into the water tank.

10. The device of claim 9, the micro dehumidifier comprising a solid state micro dehumidifier.

11. The device of claim 1, the transducer being submerged within the water tank.

12. The device of claim 1, the set of tubes comprising laminar flow tubes.

13. The device of claim 1, the movable belt at least partially surrounding the water tank.

14. The device of claim 1, the movable belt situated in spaced apart relation to the water tank.

15. The device of claim 1, the vapor projection component further comprising an encoder configured to monitor a position of the movable belt and identify which of the apertures to activate at a given time point.

16. The device of claim 1, the set of tubes comprising a two-dimensional matrix of tubes on a side of the vapor projection component.

17. A method comprising:
   nebulizing, by a transducer of a vapor projection component, water stored in a water tank of the vapor projection component;
   moving, by the vapor projection component, a movable belt comprising a plurality of apertures movable respective to a set of tubes on a side of the vapor projection component;
   exerting, by a variable speed fan of the vapor projection component, positive pressure on the nebulized water;
   generating, by the vapor projection component, a set of nebulized vapor jets extending outward from the surface of the vapor projection component; and
   displaying, by the vapor projection component, an image on the nebulized vapor jets.

18. The method of claim 17, further comprising adjusting the speed of the movable belt according to a timed pattern.

19. The method of claim 18, further comprising staggering the exertion of the nebulized vapor jets, the staggering comprising selectively activating the apertures via a mask or screen.

20. The method of claim 17, further comprising extracting, via a micro dehumidifier in the vapor projection component, water vapor from air surrounding the vapor projection component and depositing the water vapor into the water tank.

21. The method of claim 17, further comprising monitoring, by an encoder in the vapor projection component, a position of the movable belt and identifying which of the apertures to activate at a given time point.

* * * * *